US008628222B2

(12) United States Patent
Kelley

(10) Patent No.: US 8,628,222 B2
(45) Date of Patent: Jan. 14, 2014

(54) LIGHT DIRECTING APPARATUS

(75) Inventor: Ryan Kelley, Denver, CO (US)

(73) Assignee: Lighting Science Group Corporation, Satellite Beach, FL (US)

(*) Notice: Subject to any disclaimer, the term of this patent is extended or adjusted under 35 U.S.C. 154(b) by 360 days.

(21) Appl. No.: 13/107,388

(22) Filed: May 13, 2011

(65) Prior Publication Data

US 2012/0287649 A1 Nov. 15, 2012

(51) Int. Cl.
*F21V 5/04* (2006.01)
(52) U.S. Cl.
USPC .............. 362/335; 362/311.06; 362/311.12; 362/327
(58) Field of Classification Search
USPC ............ 362/311.01, 311.02, 311.06, 311.09, 362/311.1, 311.12, 311.14, 311.15, 327, 362/329, 334, 335, 336, 307, 308, 309
See application file for complete search history.

(56) References Cited

U.S. PATENT DOCUMENTS

| 7,572,036 | B2* | 8/2009 | Yoon et al. ................... 362/334 |
| 7,618,163 | B2 | 11/2009 | Wilcox |
| 7,674,018 | B2 | 3/2010 | Holder et al. |
| 7,766,509 | B1* | 8/2010 | Laporte ................... 362/311.02 |
| 2010/0014290 | A1* | 1/2010 | Wilcox ................... 362/311.09 |
| 2010/0135043 | A1* | 6/2010 | Wang et al. ............. 362/311.06 |

* cited by examiner

*Primary Examiner* — Y My Quach Lee
(74) *Attorney, Agent, or Firm* — Cantor Colburn LLP

(57) ABSTRACT

A light directing apparatus includes an optical substrate having a first side and a second side, a compound lens outer surface on a first portion of the first side of the optical substrate, the compound lens outer surface disposed in optical communication with the second side of the optical substrate, a first protrusion on a second portion of the first side of the optical substrate, the first protrusion disposed proximate the compound lens outer surface, and disposed in optical communication with the second side of the optical substrate, and a second protrusion on the second portion of the first side of the optical substrate, the second protrusion disposed proximate the first protrusion, and disposed in optical communication with the second side of the optical substrate.

14 Claims, 110 Drawing Sheets

LIGHT DIRECTING APPARATUS

BACKGROUND OF THE INVENTION

Embodiments of the invention relate generally to lighting apparatuses, and more particularly light emitting diode (LED) lighting apparatuses including light directing apparatuses.

Conventionally, LEDs emit light in a particular profile which may be undesirable for different lighting applications. For example, in applications where it is desirable to have an increased intensity of light shed on one area while simultaneously having a reduced intensity shed on a separate area, it may be necessary to direct light emitted from a light source. However, given the particular profile of LED light emission, complex lenses are necessary which may not give the desired profile.

Accordingly, there exists a need in the art for a light directing apparatuses to overcome these drawbacks.

BRIEF DESCRIPTION OF THE INVENTION

According to an example embodiment of the present invention, a light directing apparatus includes an optical substrate having a first side and a second side, a compound lens outer surface on a first portion of the first side of the optical substrate, the compound lens outer surface disposed in optical communication with the second side of the optical substrate, a first protrusion on a second portion of the first side of the optical substrate, the first protrusion disposed proximate the compound lens outer surface, and disposed in optical communication with the second side of the optical substrate, and a second protrusion on the second portion of the first side of the optical substrate, the second protrusion disposed proximate the first protrusion, and disposed in optical communication with the second side of the optical substrate.

According to an additional example embodiment of the present invention, a light directing apparatus includes an optical substrate having a first side and a second side, a compound lens outer surface on a first portion of the first side of the optical substrate, the compound lens outer surface disposed in optical communication with the second side of the optical substrate, a first protrusion on a second portion of the first side of the optical substrate, the first protrusion disposed proximate the compound lens outer surface, and disposed in optical communication with the second side of the optical substrate, and a light-receiving portion on the second side of the optical substrate, the light-receiving portion disposed in relative alignment with the first protrusion.

According to yet another example embodiment of the present invention, a light directing system include an optical substrate having a first side and a second side and a plurality of light directing apparatuses arranged on the optical substrate. According to the example embodiment, each light directing apparatus includes a compound lens outer surface on the first side of the optical substrate, the compound lens outer surface disposed in optical communication with the second side of the optical substrate, a first protrusion on the first side of the optical substrate, the first protrusion disposed proximate the compound lens outer surface, and disposed in optical communication with the second side of the optical substrate, and a light-receiving portion on the second side of the optical substrate, the light-receiving portion disposed in relative alignment with the first protrusion.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

An embodiment of the invention provides a light directing apparatus which directs light from an LED to form a desired lighting profile. The apparatus includes a lens portion serving to redirect light from the LED. The LED emits light through the lens portion, which redirects the light through internal reflection and refraction to form the desired profile. While embodiments disclosed herein may be described in terms of relative positions of one feature with respect to another, such as an LED being above a lens portion, it will be appreciated that this is for discussion purposes only and is not limiting in any way. For example, for street lighting where the light source is overhead, the LED may indeed be disposed above a lens portion. However, for lighting where the light source may or may not be overhead, the LED may be disposed below or to a side of a lens portion, or even completely surrounded by a lens portion. Any and all such relative positions of one feature with respect to another are contemplated and considered within the scope of the invention disclosed herein. Similarly, discussion below relating to a specific view, such as top view, bottom view, front view or back view, are intended only to provide relative perspectives of the features discussed, and are not intended to be limiting in scope.

In some lighting applications it is desirable to increase lighting in one direction, while reducing lighting in another direction. Such lighting applications may include illuminating streets, sidewalks, highways, or illuminating other similar locations. In these example lighting applications, it may be desirable to redirect light emitted from a light source (e.g., solid state light source) such that relatively increased illumination is achieved at a street side. This may decrease otherwise wasted light which would conventionally be directed away from a street side. Thus, example embodiments including desired lighting profiles are provided herein, and are discussed in detail below.

Figure 1:
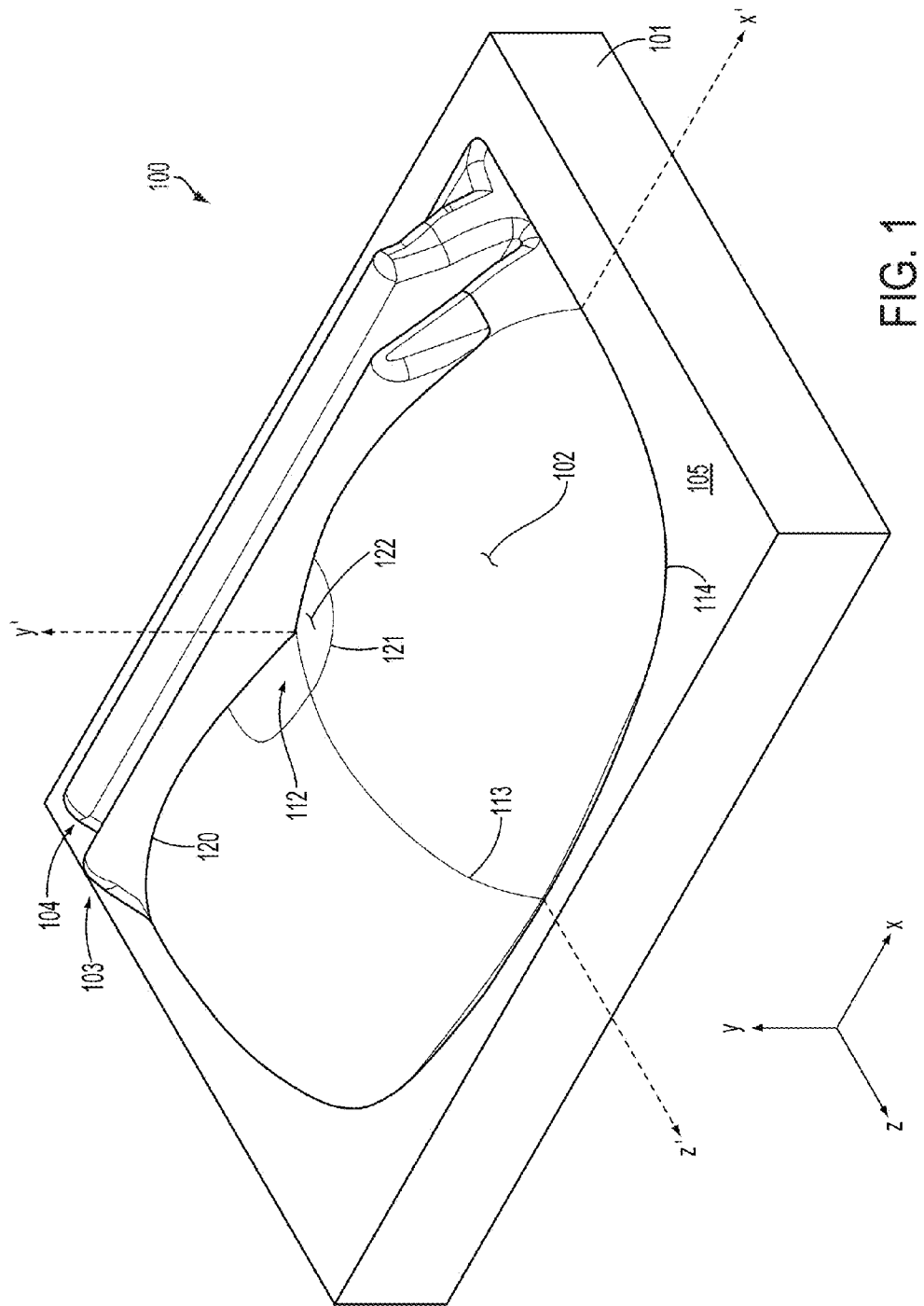
FIG. 1 depicts a perspective view of a light directing apparatus, according to an example embodiment.
Figure 2:
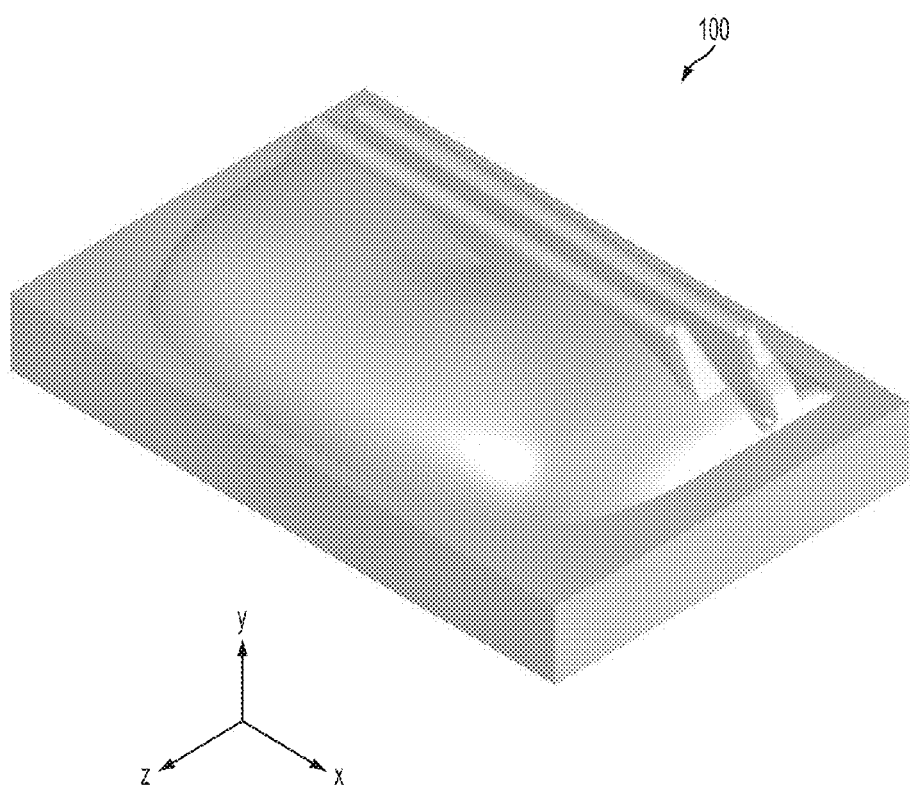
FIG. 2 depicts a perspective view of a light directing apparatus, according to an example embodiment.

Turning to FIG. 1 a perspective view of a light directing apparatus 100 is depicted. The light directing apparatus 100 may be formed of a material suitable for light transmission, for example, optically clear acrylic, silicone, or other suitable material. As illustrated, the light directing apparatus 100 includes a base or optical substrate 101. The light directing apparatus 100 further includes a compound lens outer surface 102 on a first side 105 of the optical substrate 101, the first side 105 of the optical substrate 101 defining a main plane X'-Z'. The compound lens outer surface 102 may be relatively smooth or may include at least a textured portion or textured region thereon, for example through sand-blasting, etching, coating, or otherwise texturizing a portion or portions of the compound lens surface 102. For example, texturizing may be defined as giving a desired texture and/or forming/promoting surface protuberances/deformities to result in a texture applied directly on a surface. The textured surface or portion of the surface may reduce color separation and may be configured to blend or mix light for a more uniform color output profile. For example, a grain or coarseness of the texture may be adjusted to promote a desired color-blending profile for any desired application.

The light directing apparatus 100 may further include a first protrusion 103 on the first side of the optical substrate 101, and a second protrusion 104 on the first side of the optical substrate 101. The first protrusion 103 is proximate to both the second protrusion 104 and the compound lens outer surface 102, and is disposed between the second protrusion 104 and the compound lens outer surface 102.

As shown, a centerline or valley 113 extends from a first edge 114 of the compound lens outer surface 102, to a point 112 on a second edge 120 of the compound lens outer surface 102. The compound lens outer surface has mirror image symmetry about the Y'-Z' plane (medial plane) containing the centerline 113. A region 122 which partially surrounds point 112 is defined by line 121 and is concave, or substantially concave in comparison to the rest of the compound lens outer surface 102 and may be termed a concave region or inner concave region. The concavity of region 112 has mirror image symmetry about the medial Y'-Z' plane. The reference axis Y' is orthogonal to the main plane X'-Z', and may be central to the body of the apparatus 100.

Figure 3:
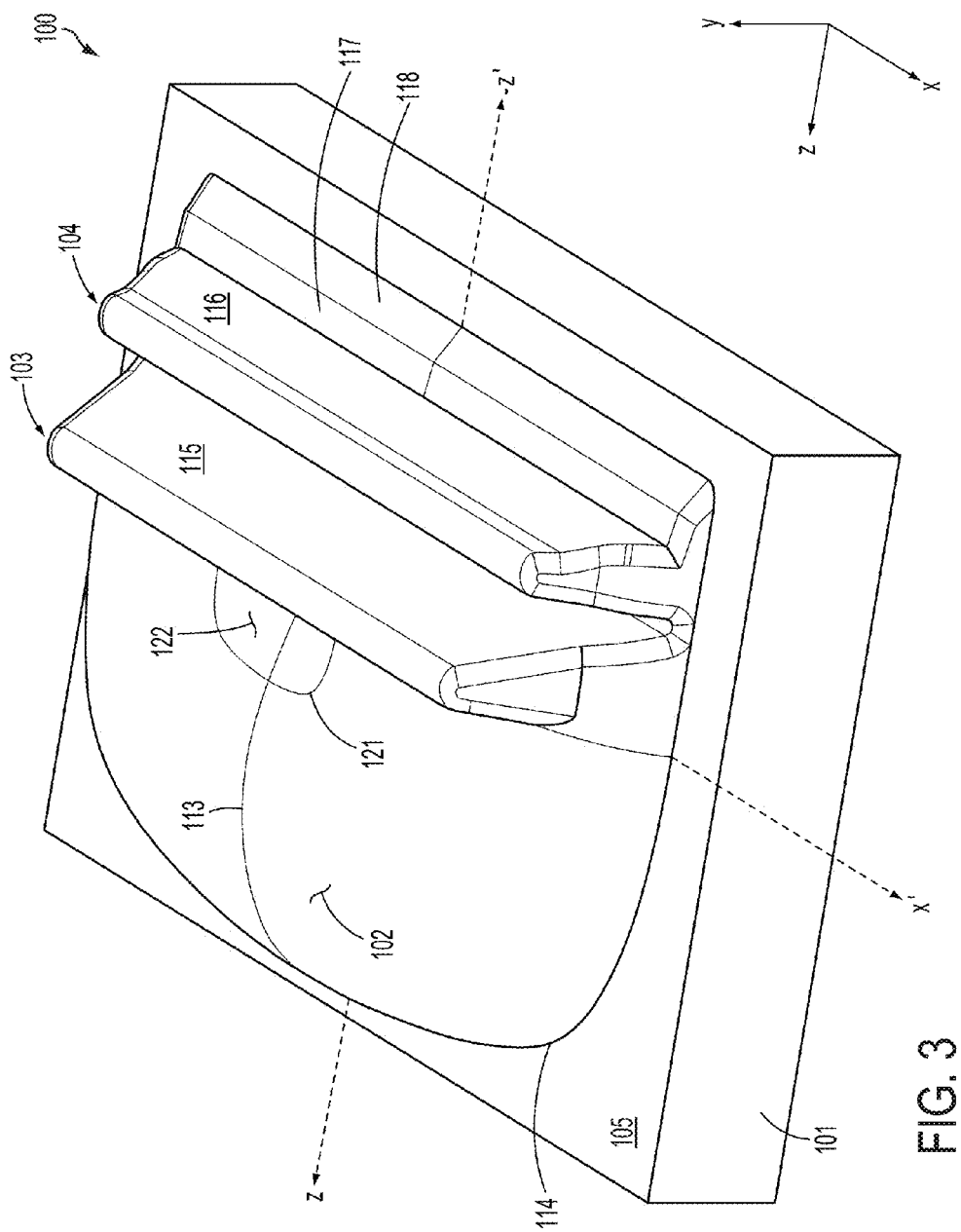
FIG. 3 depicts a perspective view of a light directing apparatus, according to an example embodiment.
Figure 4:
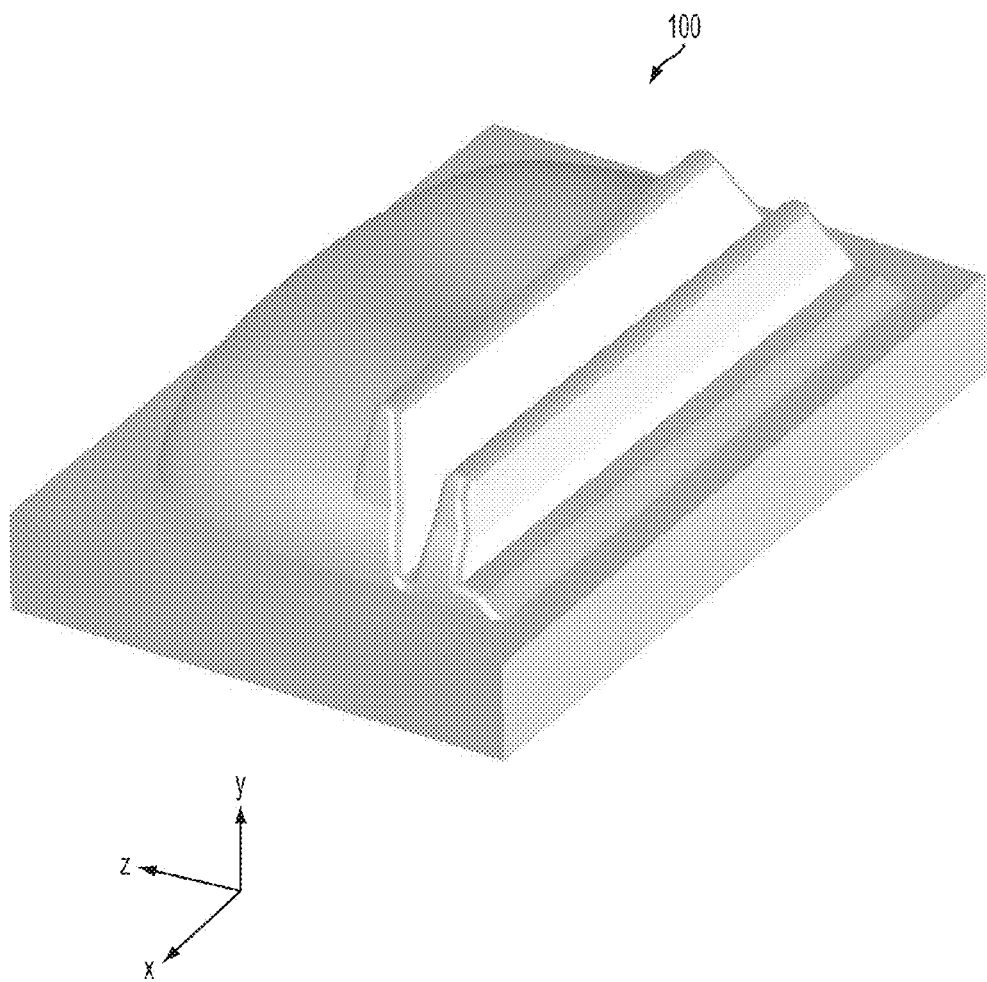
FIG. 4 depicts a perspective view of a light directing apparatus, according to an example embodiment.

FIGS. 3-4 depict an alternate perspective view of light directing apparatus 100. As illustrated, the first protrusion 103 includes a generally flat surface 115, which is proximate an apex or "tip" of the first protrusion 103 and the first side 105 of the optical substrate 101. As further illustrated, the second protrusion includes a compound angular surface comprising at least three portions, a first portion 116, a second portion 117, and a third portion 118. The first portion 116 may be relatively flat, or may be slightly curved, angled, or similarly arranged depending upon any desired lighting profile. As particularly illustrated, the first portion 116 is slightly curved and is proximate to an apex or "tip" of the second protrusion 104 and the second portion 117. The second portion 117 may be relatively flat, and is proximate both the first portion 116 and the third portion 118. The third portion 118 may be relatively flat, and is proximate both the second portion 117 and the first side 115 of the optical substrate 101.

According to an example embodiment, one or more of surface 115 and/or portions 116, 117, and 118 may be textured, for example, to aid in increasing light dispersion uniformity through sand-blasting, etching, coating, or otherwise texturizing respective surfaces. Furthermore, a grain or coarseness of the texture may be adjusted to promote a desired lighting profile for any desired application.

Figure 5:
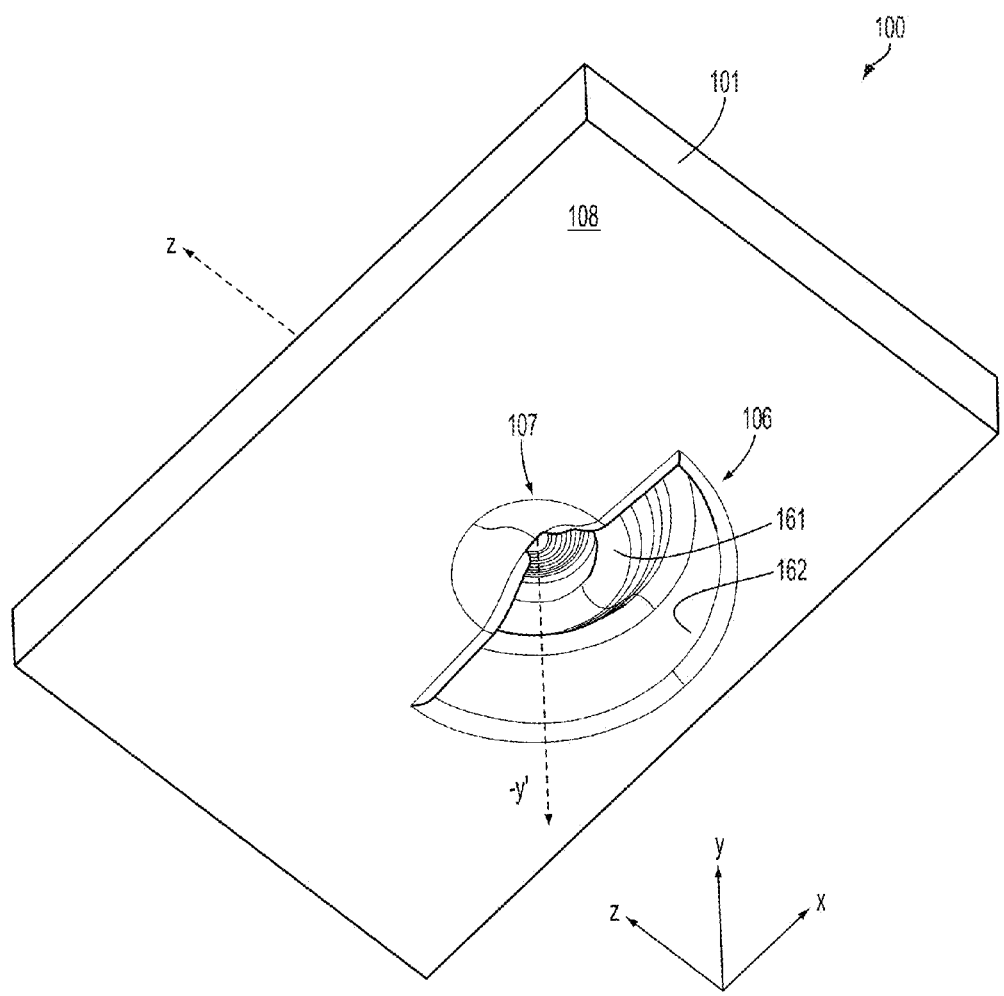
FIG. 5 depicts a perspective view of a light directing apparatus, according to an example embodiment.

FIG. 5 depicts an alternate perspective view of light directing apparatus 100. As shown, the light directing apparatus 100 includes a collimator 106 arranged on a second side 108 of the optical substrate 101. The collimator 106 includes at least two reflective indentations 161 and 162. The reflective indentations are generally circular and rotationally symmetric, or at least partially circular and partially rotationally symmetric, about the central axis Y'. The apparatus 100 further includes an LED light-receiving portion 107 arranged on the second side 108 of the optical substrate 101 and proximate to the collimator 106. In an embodiment, the light-receiving portion 107 forms a recess in the second side of the optical substrate that receives an LED 109, thereby forming a mating portion for the LED 109 (best seen by referring to FIG. 18). The light-receiving portion 107 may be generally or substantially hemispherical and rotationally symmetric about the central axis Y'. The light-receiving portion 107 may be disposed to receive an LED or other solid state light source. A surface of the light-receiving portion 107 may be textured (e.g., through sand-blasting, acid-etching, or any other means of texturing) to reduce an interior halo of light emitted from a light source. For example, the light source is an LED or a semiconductor light source, and the surface of the light-receiving portion 107 is textured to reduce an interior halo of the LED. Furthermore, another portion or portions of the second side 108 may additionally/alternatively be textured to aid in reducing halo and/or promote better color-blending.

As described above with reference to FIG. 1-5, according to at least one example embodiment, a light directing apparatus 100 includes an optical substrate 101, a compound lens outer surface 102 on a first side of the optical substrate, a first protrusion 103 on a second portion of the first side of the optical substrate proximate the compound lens outer surface, and a second protrusion 104 on the second portion of the optical substrate proximate the first protrusion.

To better understand these and other features and functions of the light directing apparatus 100, detailed illustrations are provided in FIGS. 6-18. All illustrations are presented with coordinate axes matched with the particular orientation of the apparatus 100 illustrated in each figure.

Figure 6:
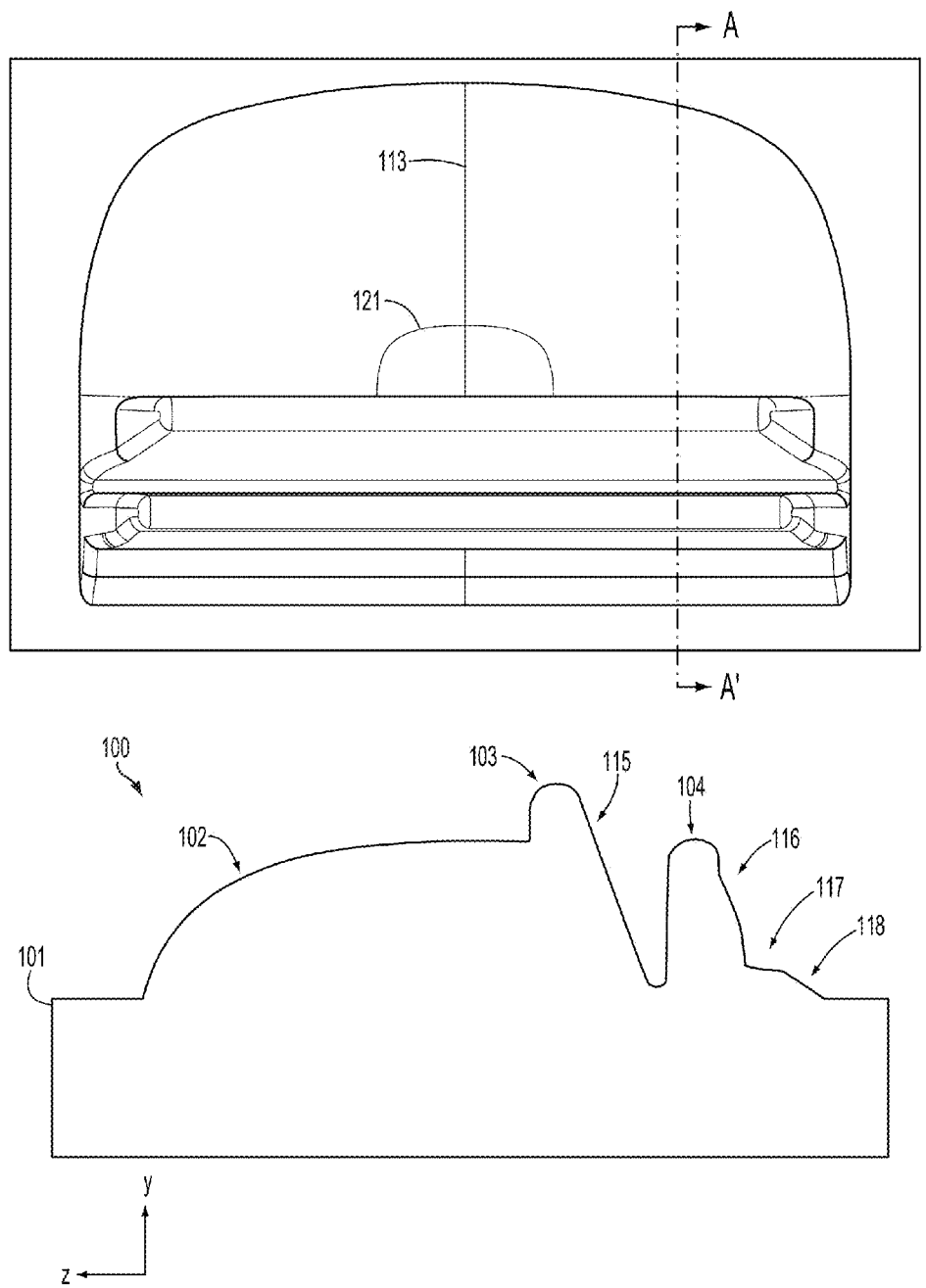
FIG. 6 depicts a planar section of a light directing apparatus, according to an example embodiment.

FIG. 6 depicts a planar section of light directing apparatus 100, taken along line A-A'. The line A-A' is parallel to centerline 113. As illustrated, the compound lens outer surface is relatively convex along line A-A'.

Figure 7:
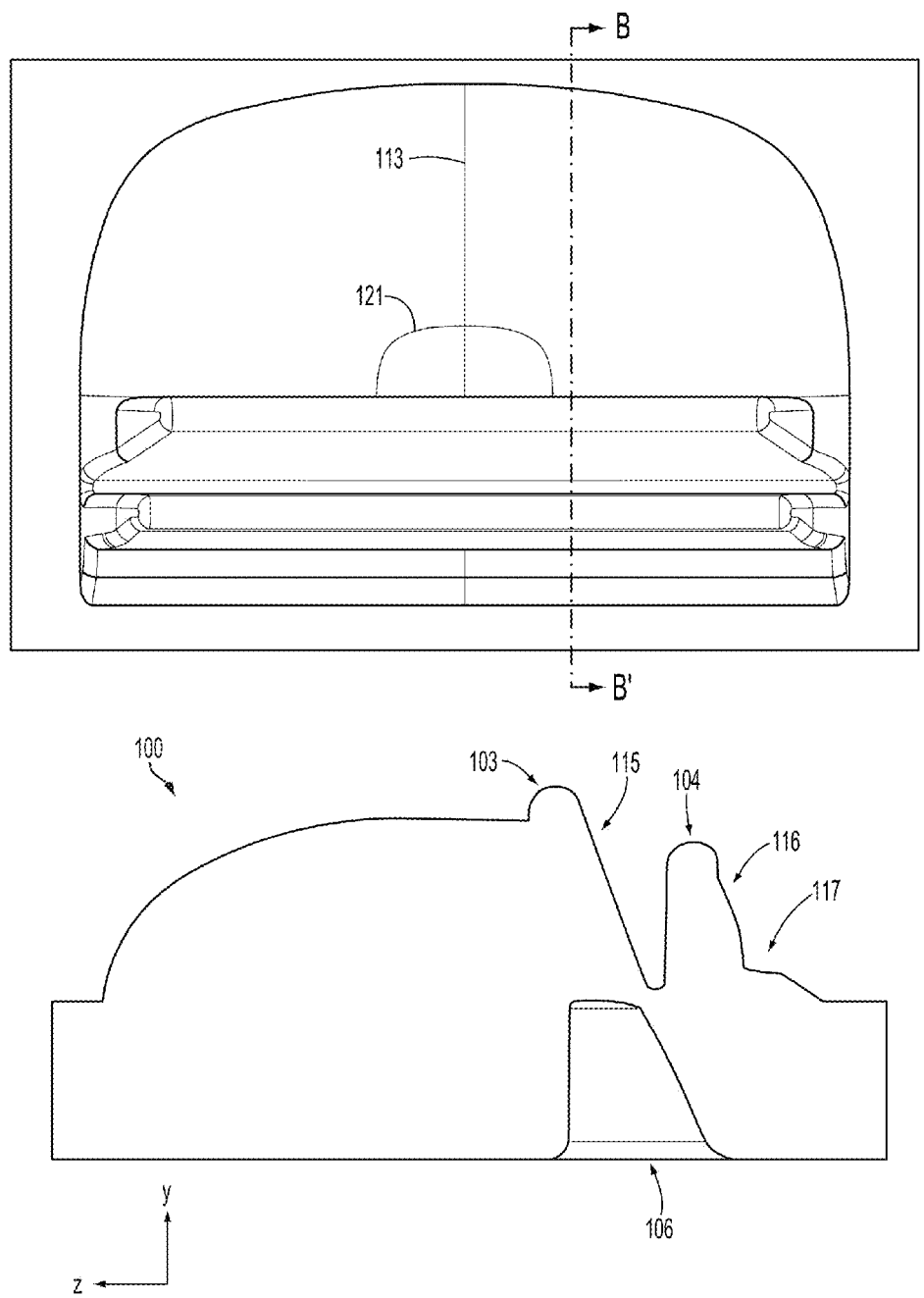
FIG. 7 depicts a planar section of a light directing apparatus, according to an example embodiment.

FIG. 7 depicts an additional planar section of light directing apparatus 100, taken along line B-B'. The line B-B' is parallel centerline 113. As illustrated, the compound lens outer surface is relatively convex along line B-B'. Furthermore, an outer edge of reflective indentation 162 of collimator 106 is present along line B-B'.

Figure 8:
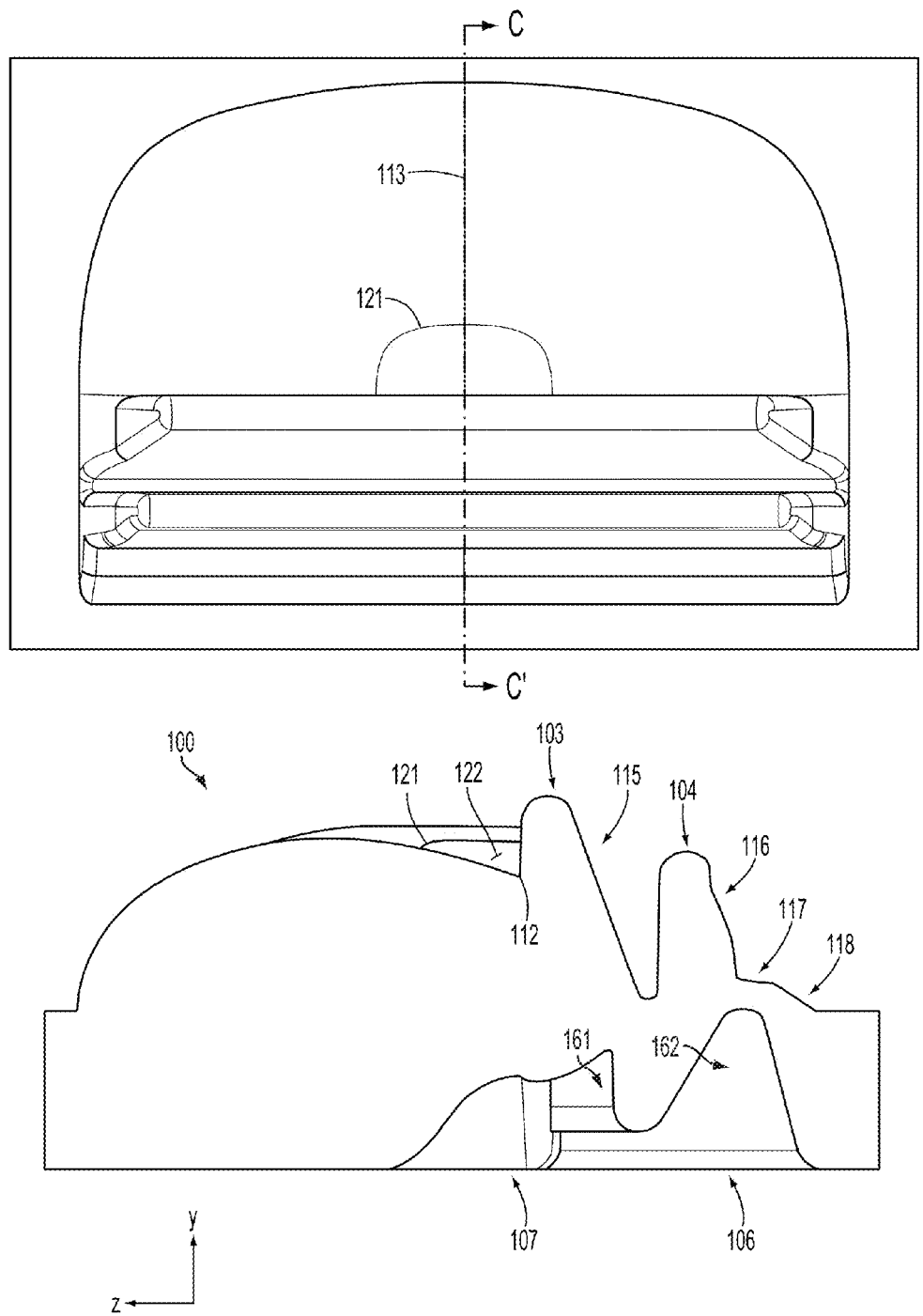
FIG. 8 depicts a planar section of a light directing apparatus, according to an example embodiment.

FIG. 8 depicts a planar section of light directing apparatus 100, taken along line C-C'. Line C-C' is collinear with centerline 113. As illustrated, portion 122 is generally concave. Furthermore, reflective indentations 161 and 162 have a generally triangular profile.

Figure 9:
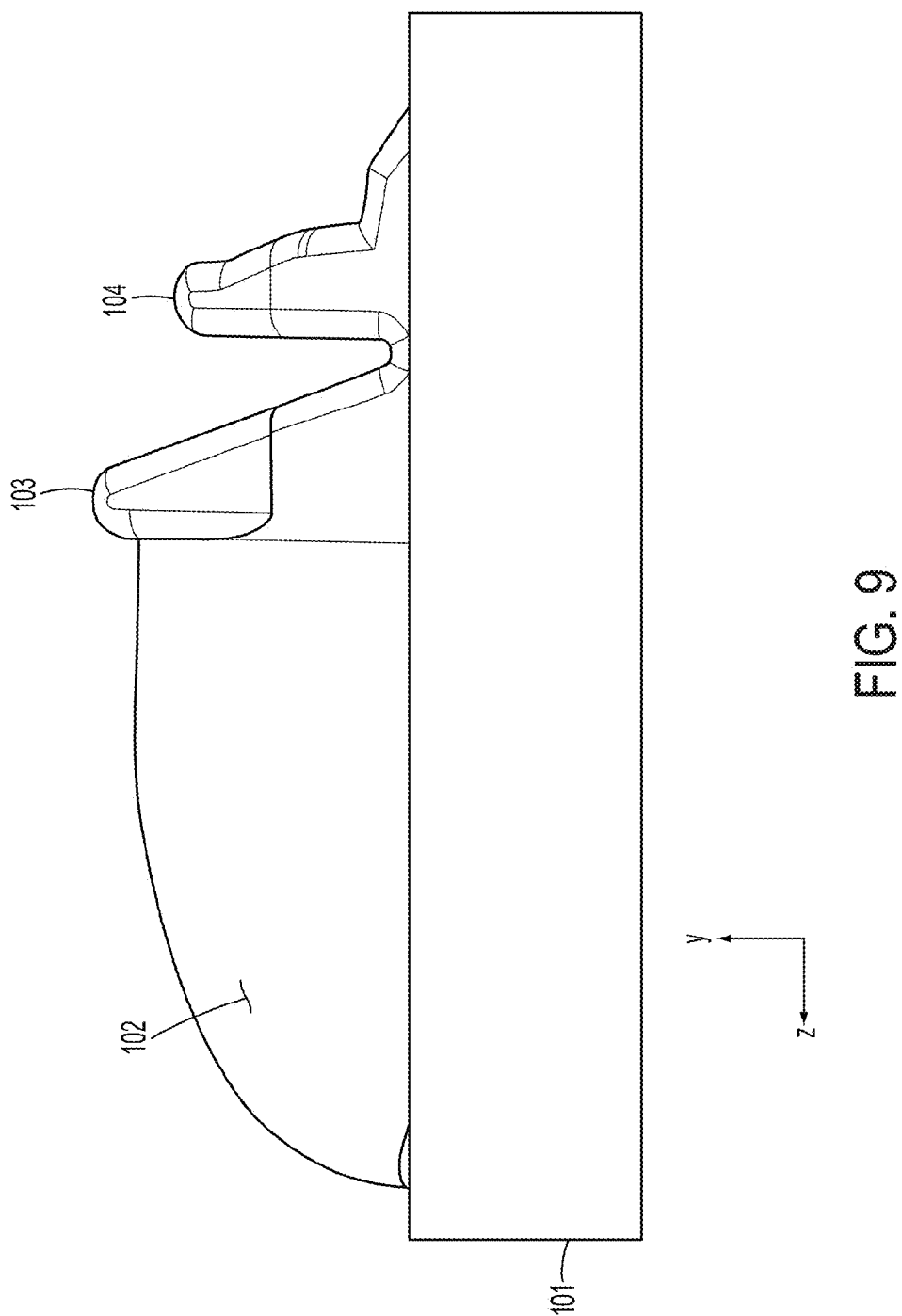
FIG. 9 depicts a planar section of a light directing apparatus, according to an example embodiment.

FIG. 9 depicts a side view of light directing apparatus 100.

Figure 10:
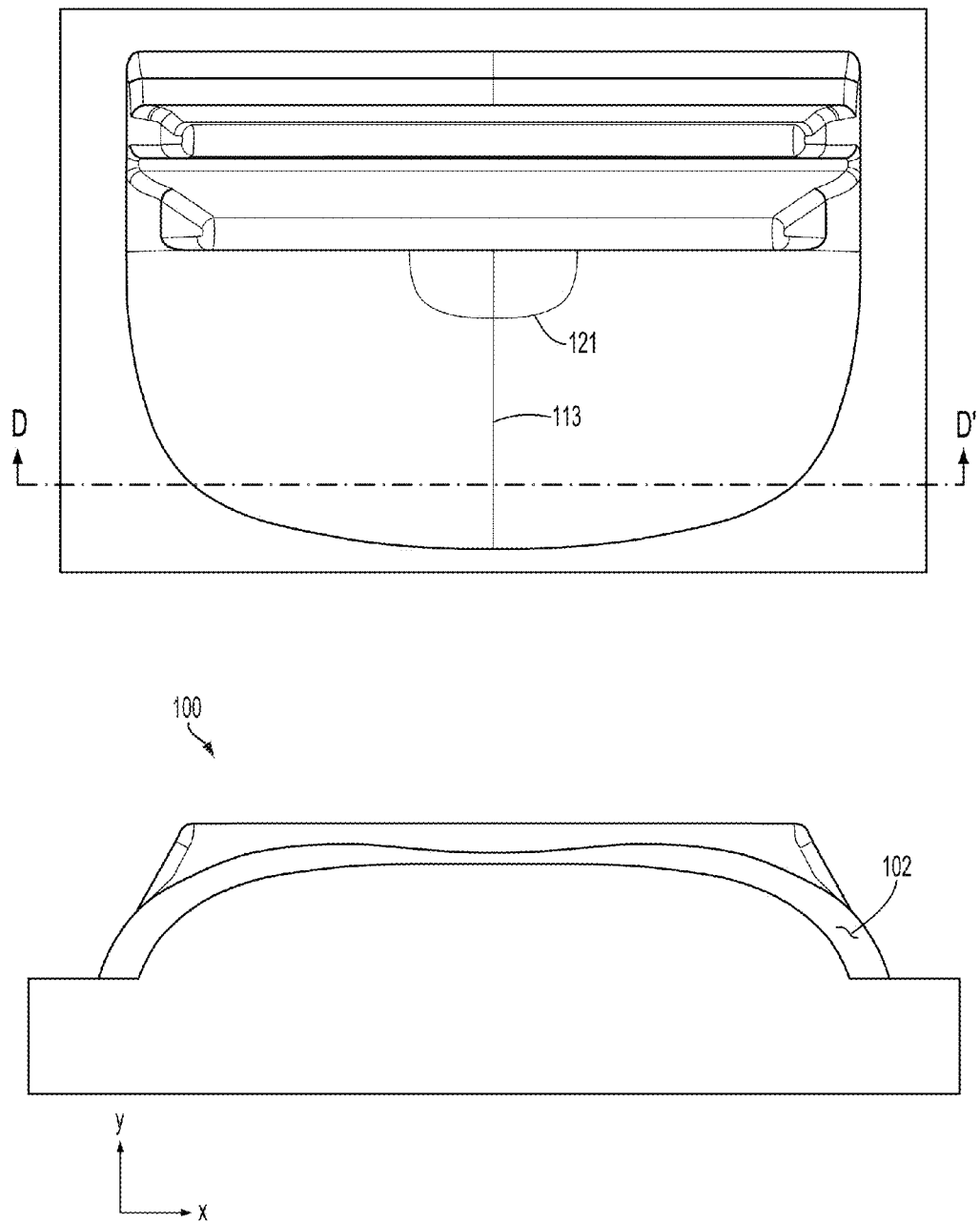
FIG. 10 depicts a planar section of a light directing apparatus, according to an example embodiment.

FIG. 10 depicts an additional planar section of light directing apparatus 100, taken along line D-D'. Line D-D' is perpendicular to centerline 113. As shown, the compound lens outer surface is generally convex at line D-D'.

Figure 11:
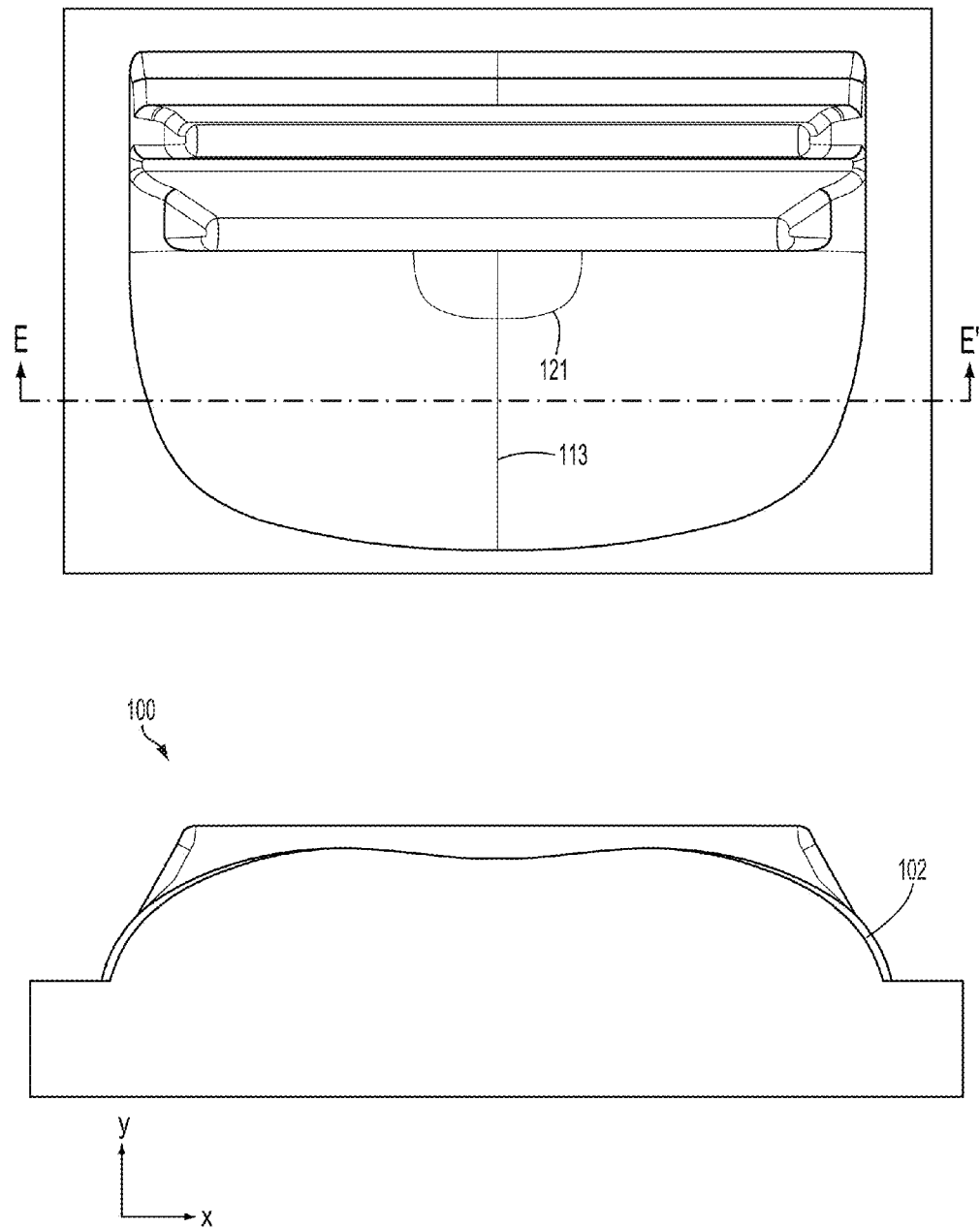
FIG. 11 depicts a planar section of a light directing apparatus, according to an example embodiment.

FIG. 11 depicts an additional planar section of light directing apparatus 100, taken along line E-E'. Line E-E' is perpendicular to centerline 113, and closer to the central axis Y' than is line D-D'. As shown, the compound lens outer surface 102 is substantially symmetrical about centerline 113.

Figure 12:
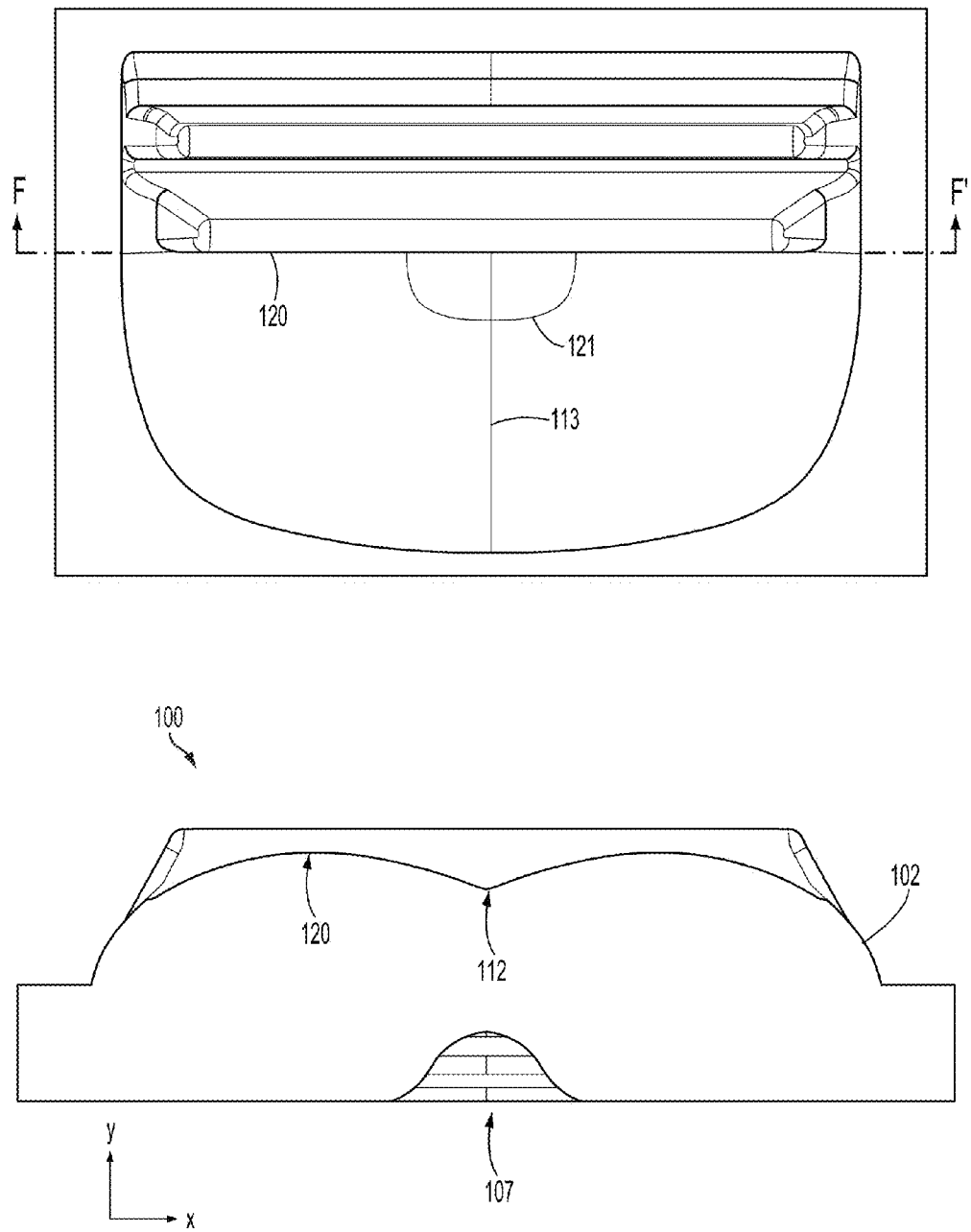
FIG. 12 depicts a planar section of a light directing apparatus, according to an example embodiment.

FIG. 12 depicts an additional planar section of light directing apparatus 100, taken along line F-F'. Line F-F' is perpendicular to centerline 113, and intersects the central axis Y'. As shown, the second edge 120 of the compound lens outer surface 102 forms a point 112 at centerline 113.

Figure 13:
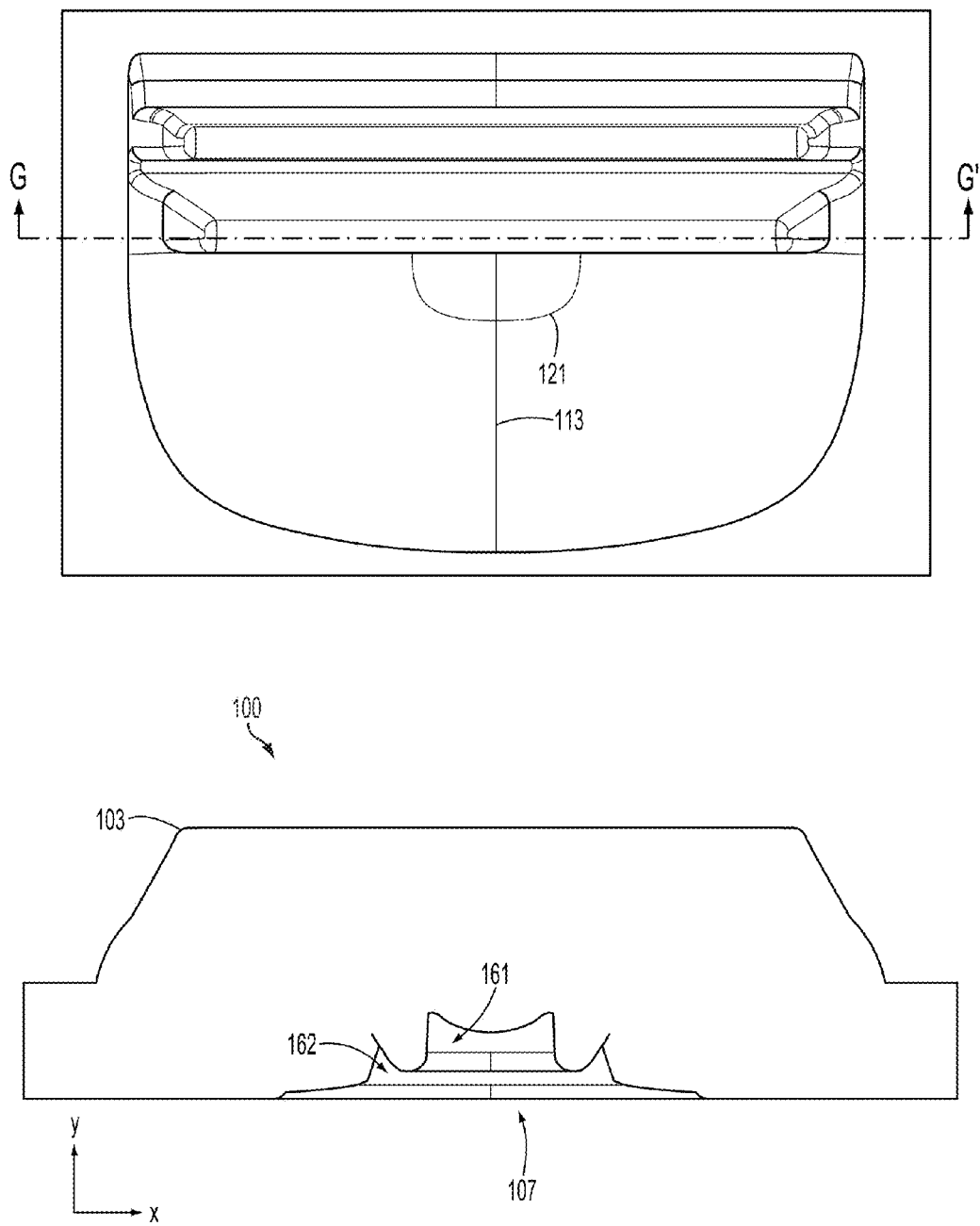
FIG. 13 depicts a planar section of a light directing apparatus, according to an example embodiment.

FIG. 13 depicts an additional planar section of light directing apparatus 100, taken along line G-G'. The line G-G' is perpendicular to centerline 113, and passes through the first protrusion 103.

Figure 14:
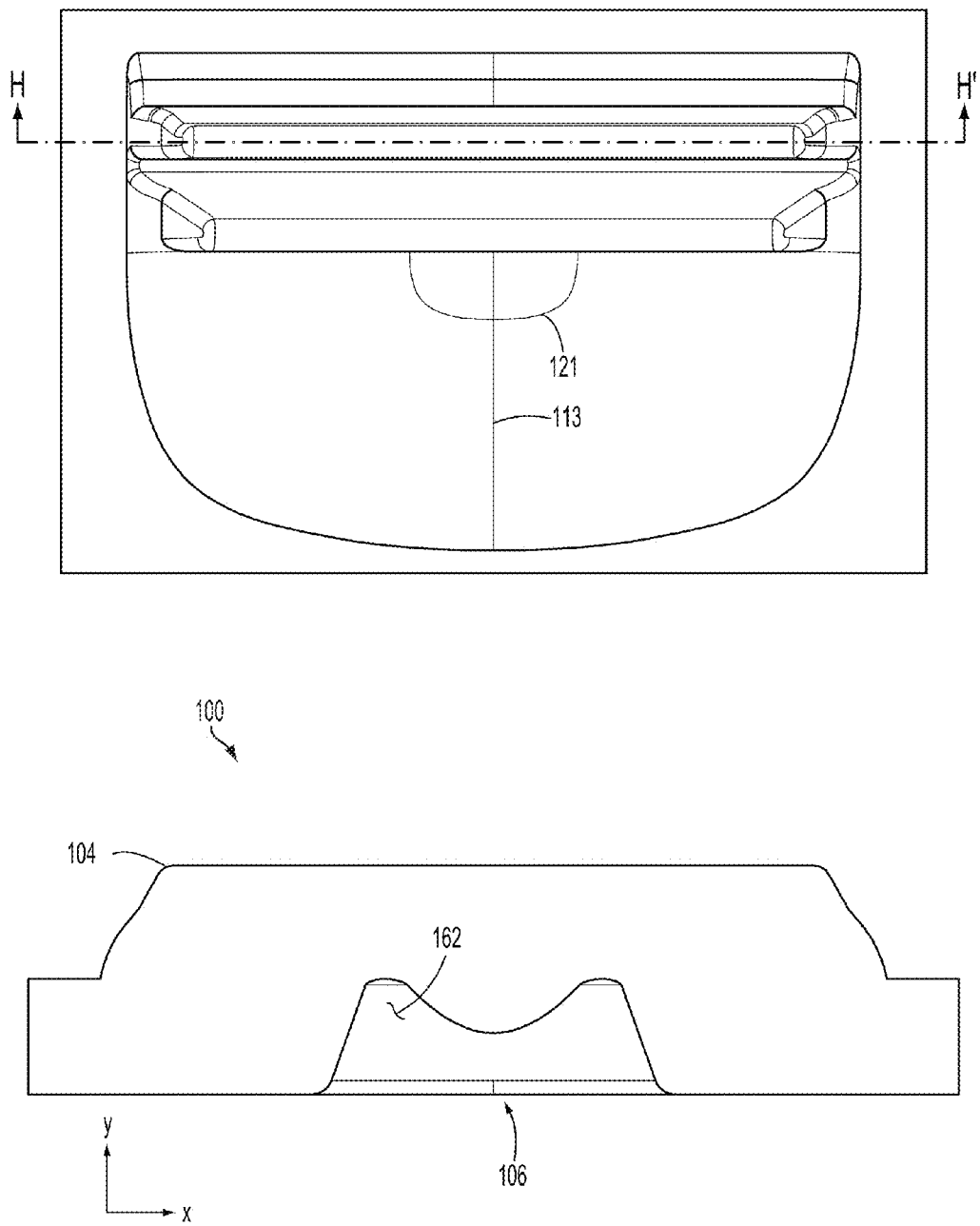
FIG. 14 depicts a planar section of a light directing apparatus, according to an example embodiment.

FIG. 14 depicts an additional planar section of light directing apparatus 100, taken along line H-H'. The line H-H' is perpendicular to centerline 113, and passes through the second protrusion 104.

Figure 15:
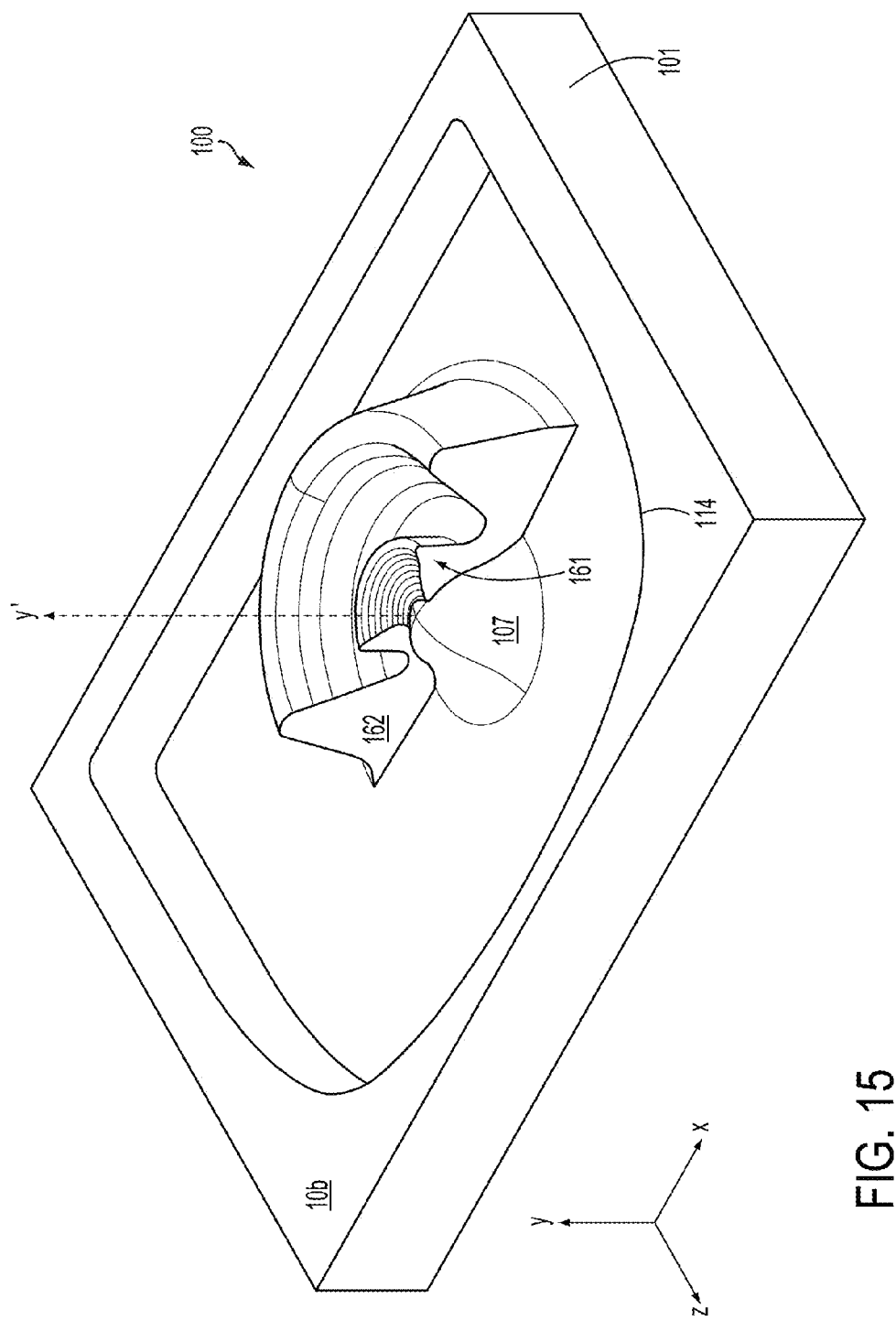
FIG. 15 depicts a perspective view of an interior of a light directing apparatus, according to an example embodiment.

FIG. 15 depicts a perspective view of an interior of light directing apparatus 100. As shown, the collimator 106 is partially rotationally symmetrical about central axis Y'. Furthermore, the light-receiving portion 107 is partially rotationally symmetrical about central axis Y'.

Figure 16:
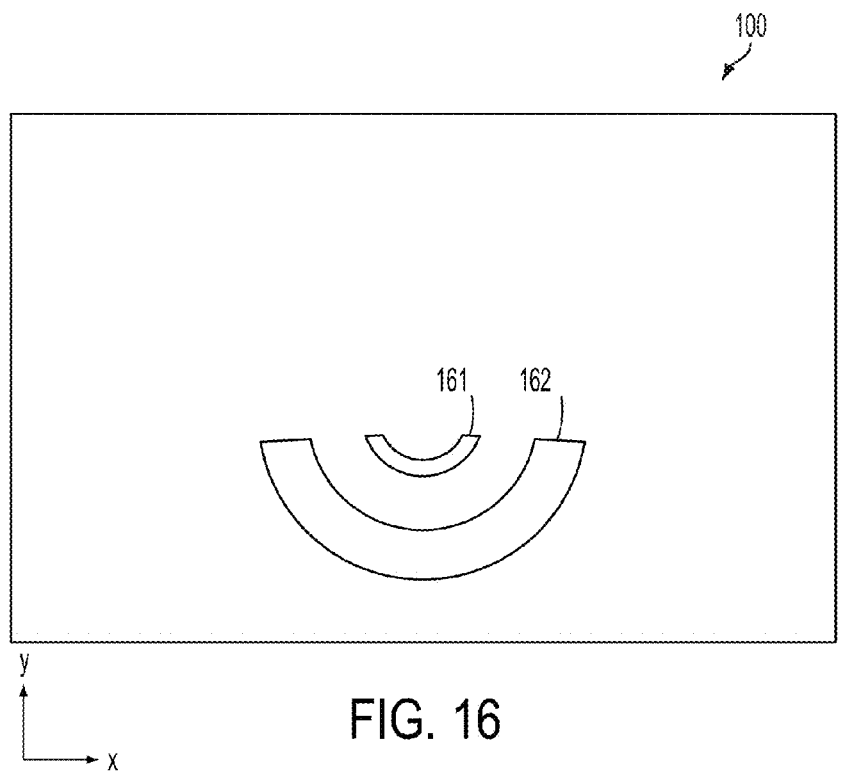
FIG. 16 depicts a planar section of a light directing apparatus, according to an example embodiment.
Figure 17:
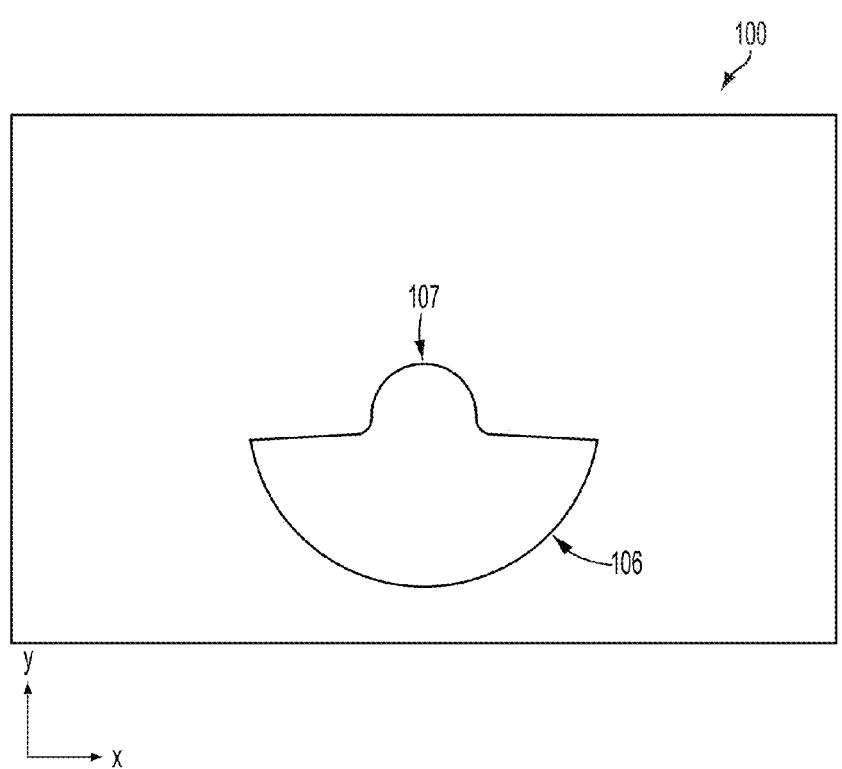
FIG. 17 depicts a bottom view of a light directing apparatus, according to an example embodiment.

FIG. 16 depicts a planar section of light directing apparatus 100, taken across main plane X'-Z'; and FIG. 17 depicts a bottom view of a light directing apparatus, which further illustrate the features of collimator 106.

Hereinafter, FIGS. 18-21 are presented to describe the light directing properties of light directing apparatus 100.

Figure 18:
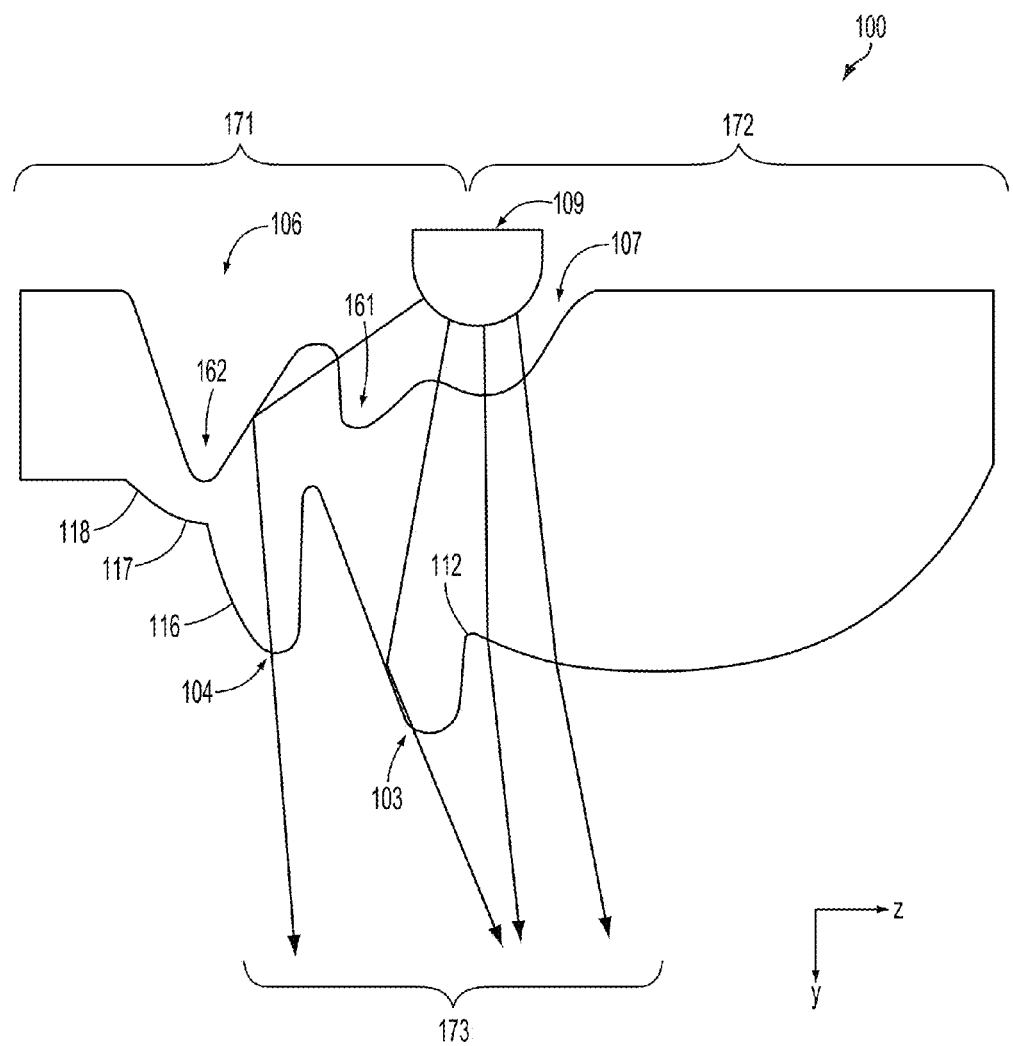
FIG. 18 depicts a ray-trace diagram of a light directing apparatus, according to an example embodiment.

FIG. 18 generally depicts a ray-trace diagram of the light directing apparatus 100, according to an example embodiment. For simplicity and discussion purposes, FIG. 18 depicts refracted light rays on a first portion 172 of the lens 100, and reflected light rays on a second portion 171 of the lens 100. The view presented is a planar section of the apparatus 100 taken at medial plane Y'-Z'. As illustrated, the compound lens outer surface 102 is on the first portion 172 of the apparatus 100. Furthermore, the first protrusion 103 and the second protrusion 104 are on the second portion 171 of the apparatus 100. The first portion 172 of the apparatus 100 may be the street side of the apparatus, or the side to which light is redirected. Rays 173 represent at least a portion of light emitted from the light source 109. As illustrated, the protrusions 103 and 104 redirect light emitted from the light source 109 generally towards the street side 172 of the apparatus 100.

With regard to light-redirection, rays 173 are reflected internally (i.e., on surfaces internal to the lens 100) towards the first portion 172. For example, as a ray of incident light reacts with an air-surface interface, this ray of incident light is reflected towards the first portion 172 of the lens 100 (i.e., the street side) through substantially total internal reflection achieved through a combination of the collimator 106 and the first and second protrusions 103, 104.

As illustrated, light entering the second portion of the lens 100 is reflected internally by surfaces of the collimator 106. More clearly, reflective indentations 161 and 162 reflect internal, incident light to one or both of the first and second protrusions 103, 104. This reflected light is further reflected towards the street side (i.e., first portion 172) by internal surfaces of the first and second protrusions 103, 104. In this manner, the combination of internal reflections of incident light redirects light emitted from the light source 109 towards the street side of lens 100.

Further, although not illustrated for the sake of clarity, it is appreciated that light not internally reflected on the surfaces of the collimator 106 tend to be refracted towards the street side as well. For example, the particular arrangement of the reflective indentations 161 and 162 permits light to refract (e.g., "bend") towards one or both of the first and second protrusions 103, 104. This refracted light may further be reflected by inner surfaces of the first and second protrusions 103, 104 towards the street side of the lens 100.

Moreover, although not illustrated for the sake of clarity, it is appreciated that light not internally reflected by inner surfaces of the first and second surfaces 103, 104 may also be refracted towards the street side of the lens 100.

Therefore, as described above, it is apparent that light emitted from a light source substantially coupled to the lens 100 interacts with both the collimator 106 and the first and second protrusions 103, 104 such that this light is redirected towards a street side of the lens 100 through substantially total internal reflection, and partially through refraction.

Additionally, it should be appreciated that refraction of light at the compound lens outer surface 102 on the first portion of the lens 100 also occurs such that this light is redirected towards the street side of the lens 100. As illustrated, at least a portion of the rays 173 reaching an air-surface interface of the compound lens outer surface 102 are refracted (e.g., "bent") towards the street side of the lens 100.

In this manner, a substantial portion of light rays 173 are redirected towards a street side of the lens 100.

Figure 19:
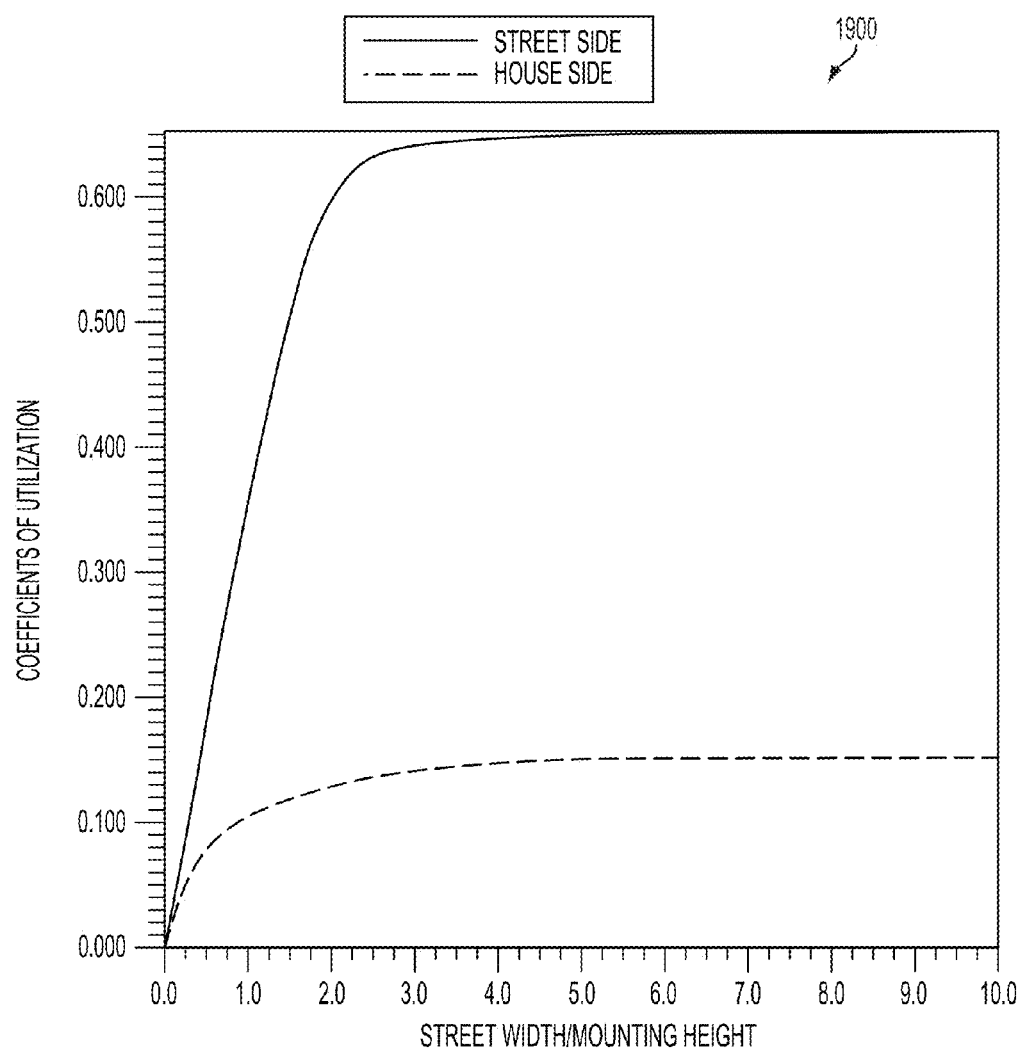
FIG. 19 depicts a graph of light distribution of a light directing apparatus, according to an example embodiment.

FIG. 19 depicts a graph of light distribution of the light directing apparatus 100, according to an example embodiment. As shown in the graph 1900 utilization of light emitted from a light source in communication with the apparatus 100 is relatively greater on the street side of the apparatus 100 compared to an opposite side.

Figure 20:
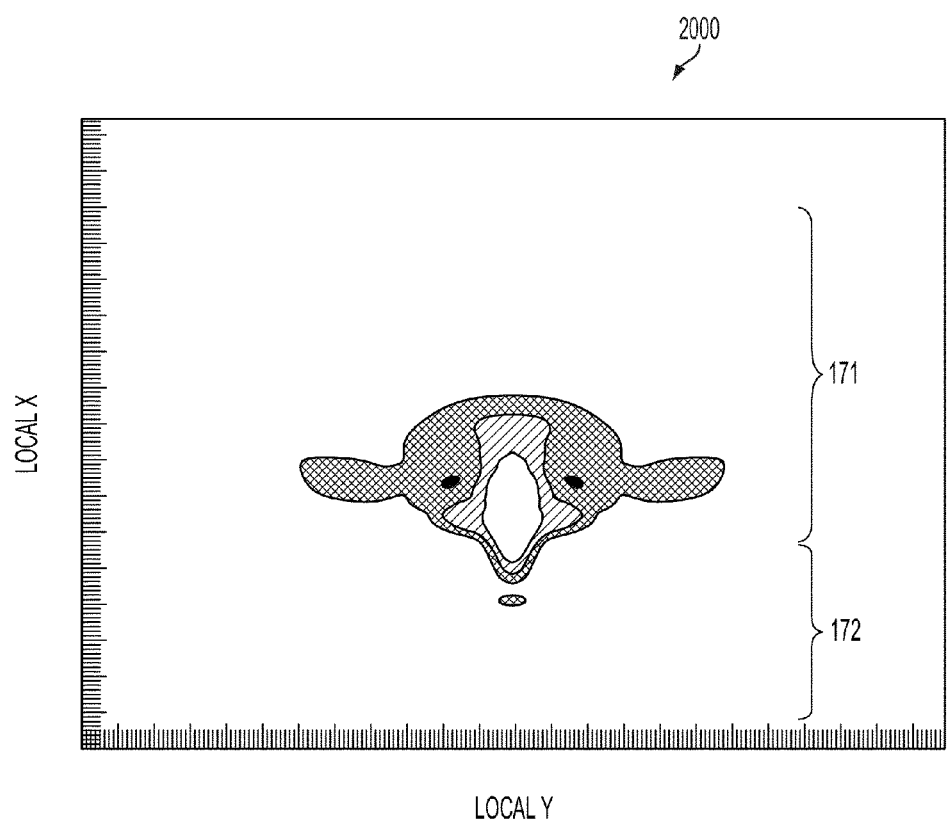
FIG. 20 depicts a distribution profile diagram of a light directing apparatus, according to an example embodiment.

FIG. 20 depicts a distribution profile diagram 2000 of the light directing apparatus 100, according to an example embodiment.

Figure 21:
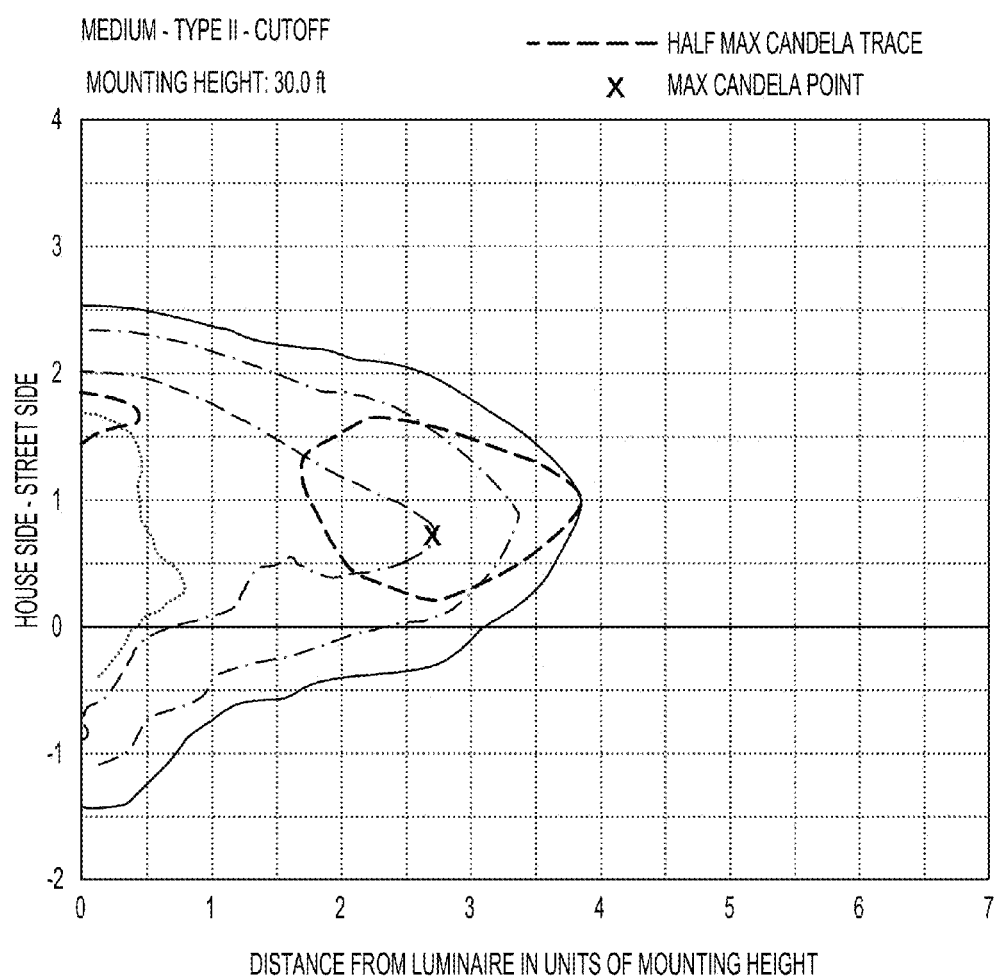
FIG. 21 depicts a plot of distribution of a light directing apparatus, according to an example embodiment

FIG. 21 depicts a plot 2100 of the illuminance contour values of the light directing apparatus 100, according to an example embodiment.

Figure 22:
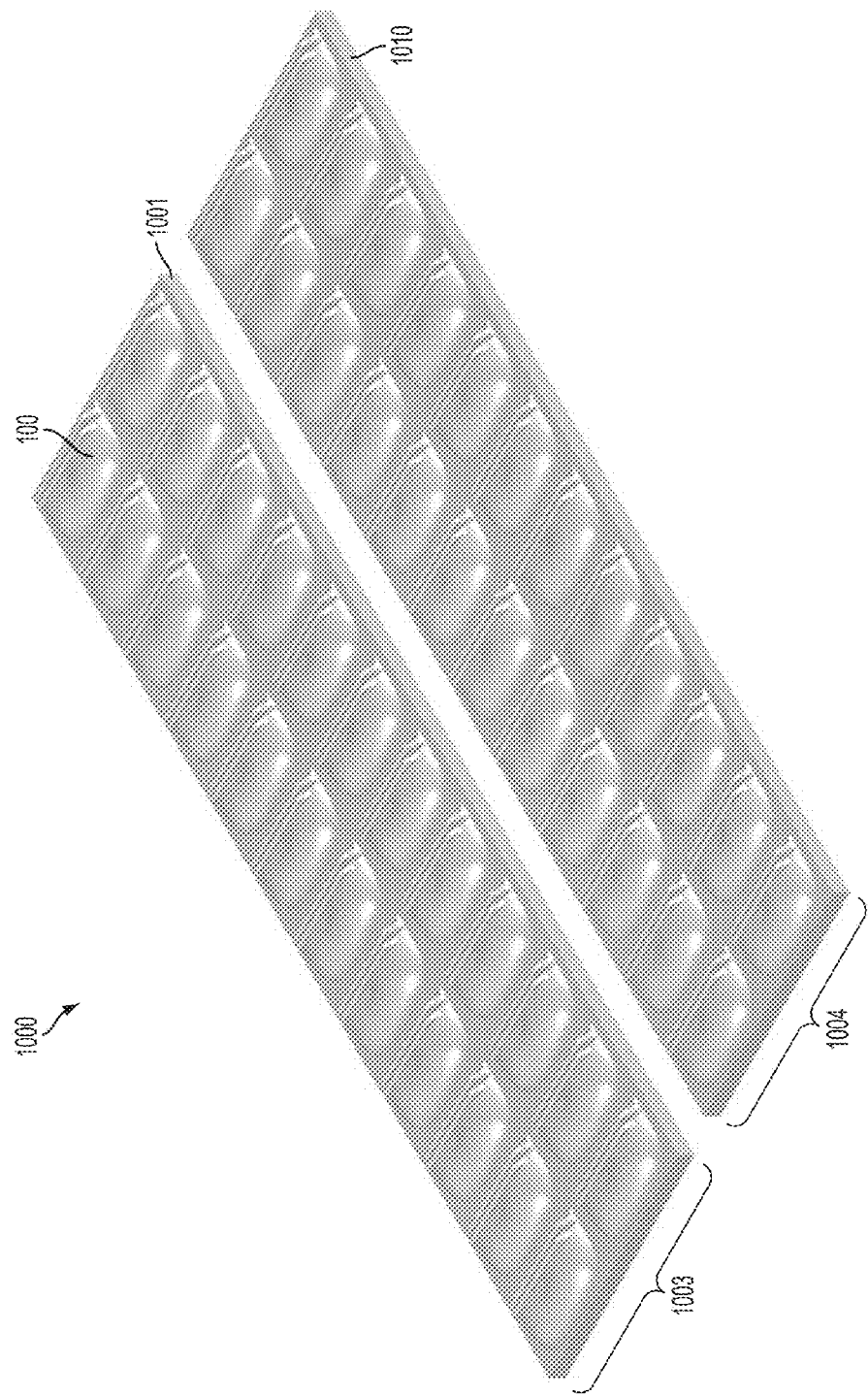
FIG. 22 depicts a light directing system, according to an example embodiment.

FIG. 22 depicts a light directing system, according to an example embodiment. As shown, a light directing system 1000 may include a plurality of light directing apparatuses 1002-1003 arranged on respective common optical substrates 1001, 1010, with each apparatus of the plurality of apparatuses 1002, 1003 containing a plurality of light directing lenses 100. Furthermore, system 1000 includes a plurality of LEDs 109 arranged within respective LED mating portions 107 of each individual light directing lenses 100, as discussed in reference to FIG. 18, of the plurality of light directing apparatuses 1003-1004.

As disclosed, example embodiments of the present invention provide light directing apparatuses and systems which redirect light from an LED to form a desired lighting profile.

Hereinafter, alternative forms of the light directing apparatuses' features, lens surfaces, and protrusions are described in detail with reference to FIGS. 23-86.

Figure 23:
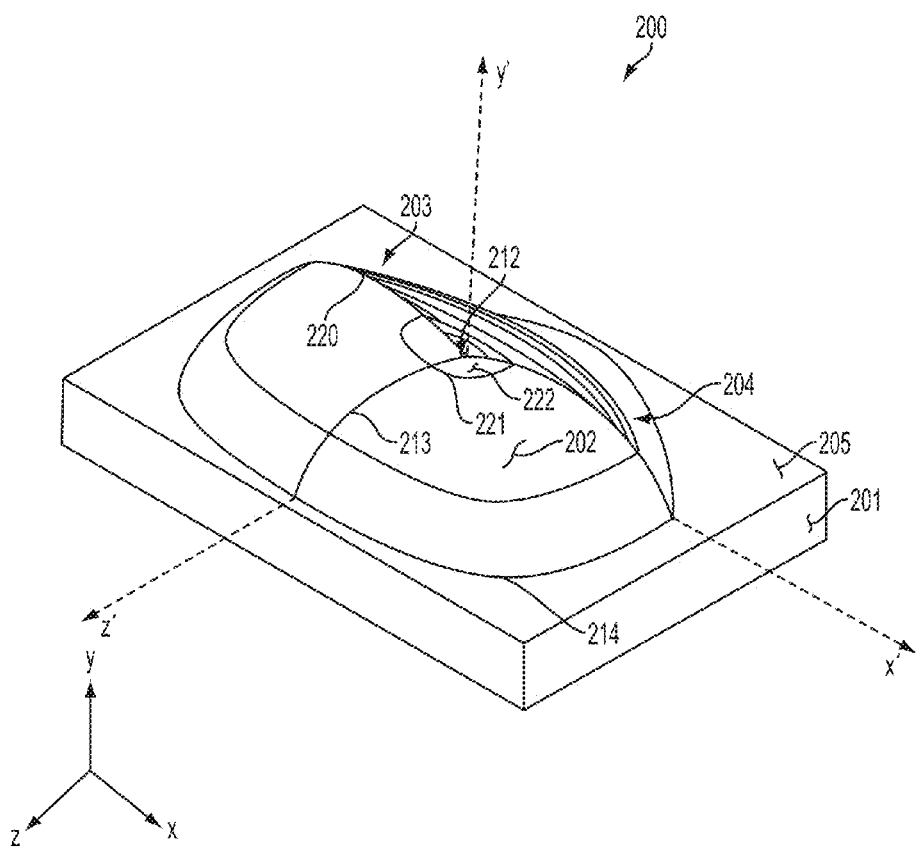
FIG. 23 depicts a perspective view of a light directing apparatus, according to an example embodiment.
Figure 24:
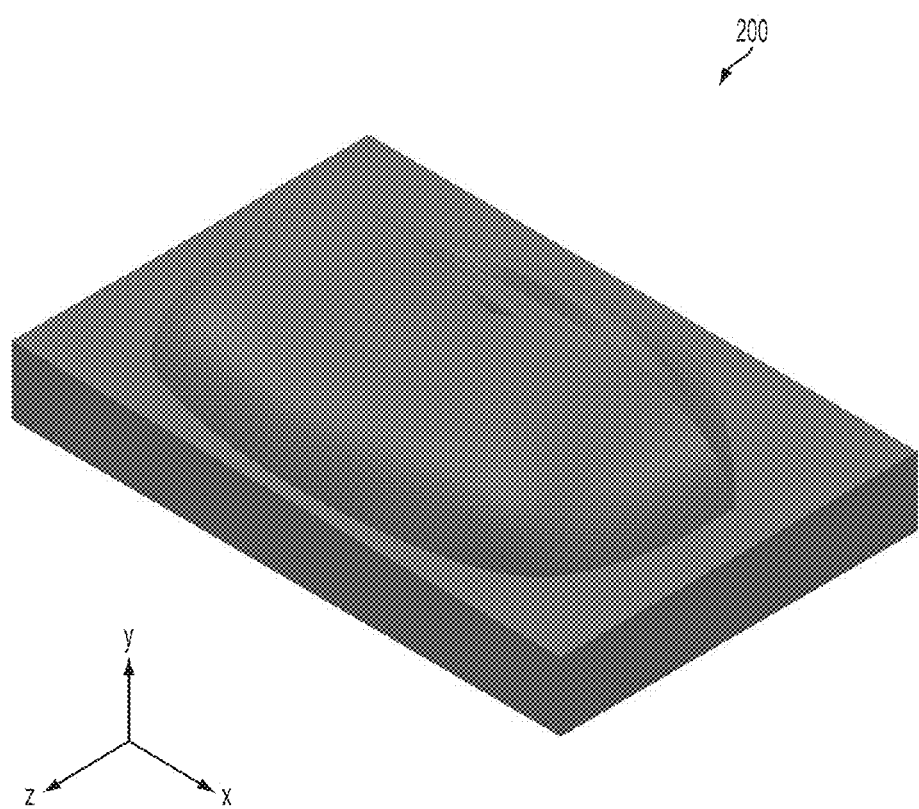
FIG. 24 depicts a perspective view of a light directing apparatus, according to an example embodiment.

Turning to FIGS. 23-24 a perspective view of an alternative light directing apparatus 200 is depicted. The light directing apparatus 200 may be formed of a material suitable for light transmission, for example, optically clear acrylic, silicone, or other suitable material. As illustrated, the apparatus 200 includes a base or optical substrate 201. The apparatus 200 further includes a compound lens outer surface 202 on a first side 205 of the optical substrate 201, the first side 205 of the optical substrate 201 defining a main plane X'-Z'. The compound lens outer surface 202 may be relatively smooth or may include at least a textured portion, for example through sand-blasting, etching, coating, or similarly texturizing a portion or portions of the compound lens surface 202. The textured surface or portion of the surface may reduce color separation and may be configured to blend or mix light for a more uniform color output profile. For example, a grain or coarseness of the texture may be adjusted to promote a desired color-blending profile for any desired application.

The apparatus 200 may further include a first protrusion 203 on the first side of the optical substrate 201, and a second protrusion 204 on the first side of the optical substrate 201. The first protrusion 203 is proximate to both the second protrusion 204 and the compound lens outer surface 202, and is disposed between the second protrusion 204 and the compound lens outer surface 202.

As shown, a centerline or valley 213 extends from a first edge 214 of the compound lens outer surface 202, to a point 212 on a second edge 220 of the compound lens outer surface 202. The compound lens outer surface has mirror image symmetry about the Y'-Z' plane (medial plane) containing the centerline 213. A region 222 which partially surrounds point 212 is defined by line 221 and is concave, or substantially concave in comparison to the rest of the compound lens outer surface 202. The concavity of region 222 has mirror image symmetry about the medial Y'-Z' plane. The reference axis Y' is orthogonal to the main plane X'-Z', and may be central to the body of the apparatus 200, and collinear with a central axis of a LED mated thereto.

Figure 25:
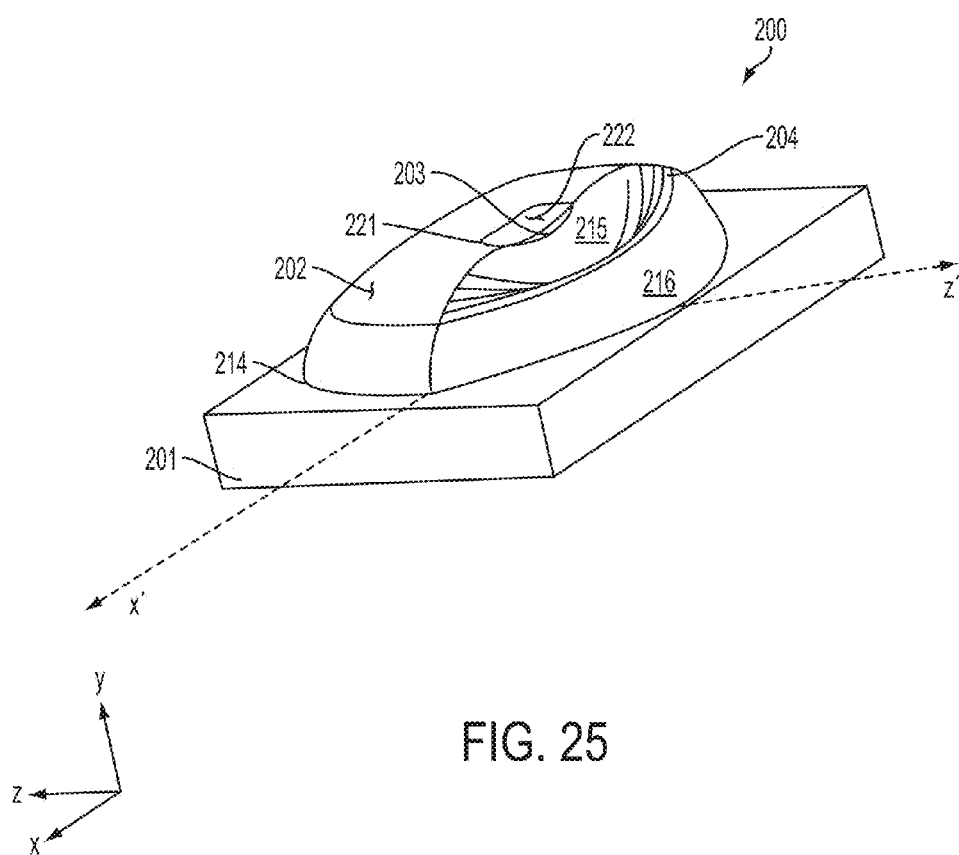
FIG. 25 depicts a perspective view of a light directing apparatus, according to an example embodiment.
Figure 26:
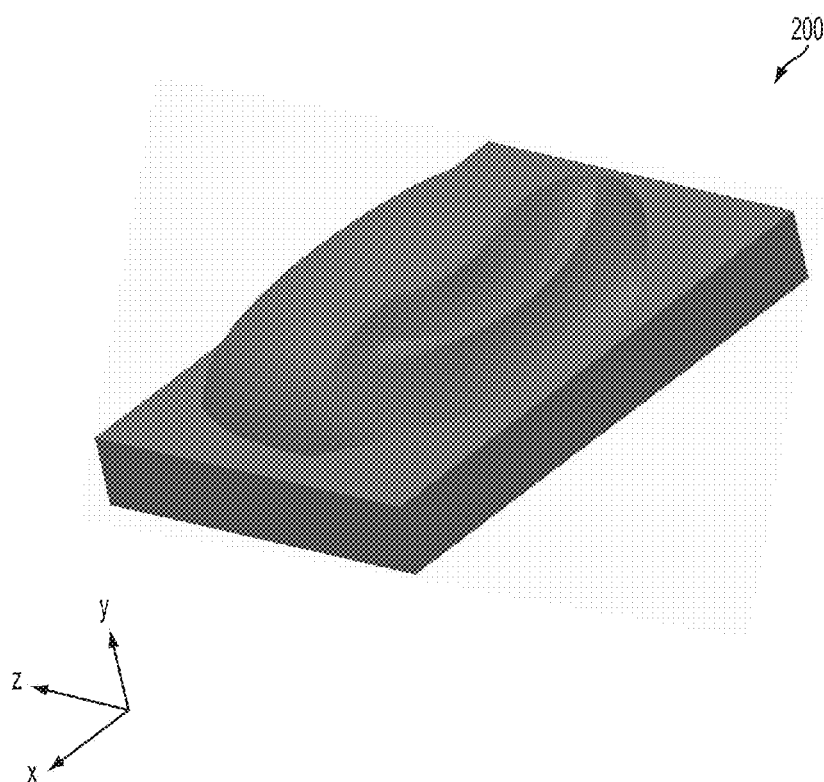
FIG. 26 depicts a perspective view of a light directing apparatus, according to an example embodiment.

FIGS. 25-26 depict an alternate perspective view of light directing apparatus 200. As illustrated, the first protrusion 203 includes a generally curved surface 215, which is proximate an apex or "tip" of the first protrusion 203 and the second protrusion 204 of the apparatus 200. As further illustrated, the second protrusion 204 includes a generally curved surface 216 proximate an apex or "tips" of the second protrusion 204 and the first side 205 of the substrate 201.

According to an example embodiment, one or more of surfaces 215 and/or 216 may be textured, for example, to aid in increasing light dispersion uniformity through sand-blasting, etching, coating, or otherwise texturizing respective surfaces. Furthermore, a grain or coarseness of the texture may be adjusted to promote a desired lighting profile for any desired application.

Figure 27:
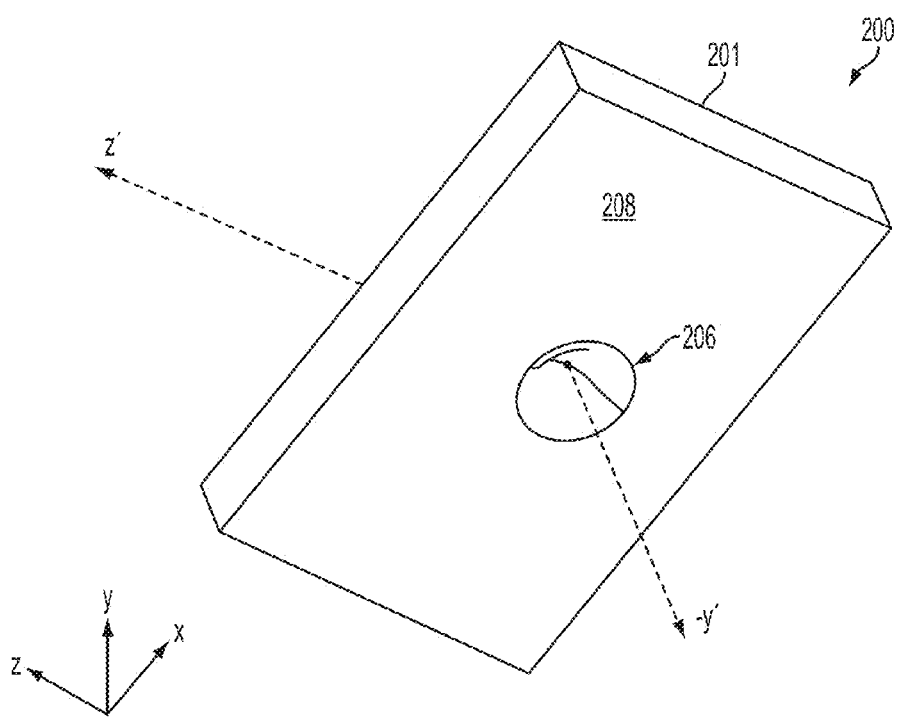
FIG. 27 depicts a perspective view of a light directing apparatus, according to an example embodiment.

FIG. 27 depicts an alternate perspective view of light directing apparatus 200. As shown, the light directing apparatus 200 includes an LED light-receiving portion 206 arranged on a second side 208 of the optical substrate 201. In an embodiment, the light-receiving portion 206 forms a recess in the second side 208 of the optical substrate 201 that receives an LED, thereby forming a mating portion for the LED. The light-receiving portion 206 may be generally hemispherical and rotationally symmetric about the central axis Y'. The light-receiving portion 206 may be disposed to receive an LED or other solid state light source. A surface of the light-receiving portion 206 may be textured (e.g., through sand-blasting, acid-etching, coating, or any other means of texturing) to reduce an interior halo of light emitted from a light source. For example, the light source is an LED or a semi-conductor light source, and the surface of the light-receiving portion 206 is textured to reduce an interior halo of the LED. Furthermore, another portion or portions of the second side 208 may additionally/alternatively be textured to aid in reducing halo and/or promote better color-blending.

As described above with reference to FIG. 23-26, according to at least one example embodiment, a light directing apparatus 200 includes an optical substrate 201, a compound lens outer surface 202 on a first side of the optical substrate, a first protrusion 203 on a second portion of the first side of the optical substrate proximate the compound lens outer surface, and a second protrusion 204 on the second portion of the optical substrate proximate the first protrusion.

To better understand these and other features and functions of the light directing apparatus 200, detailed illustrations are provided in FIGS. 28-38. All illustrations are presented with coordinate axes matched with the particular orientation of the apparatus 200 illustrated in each figure.

Figure 28:
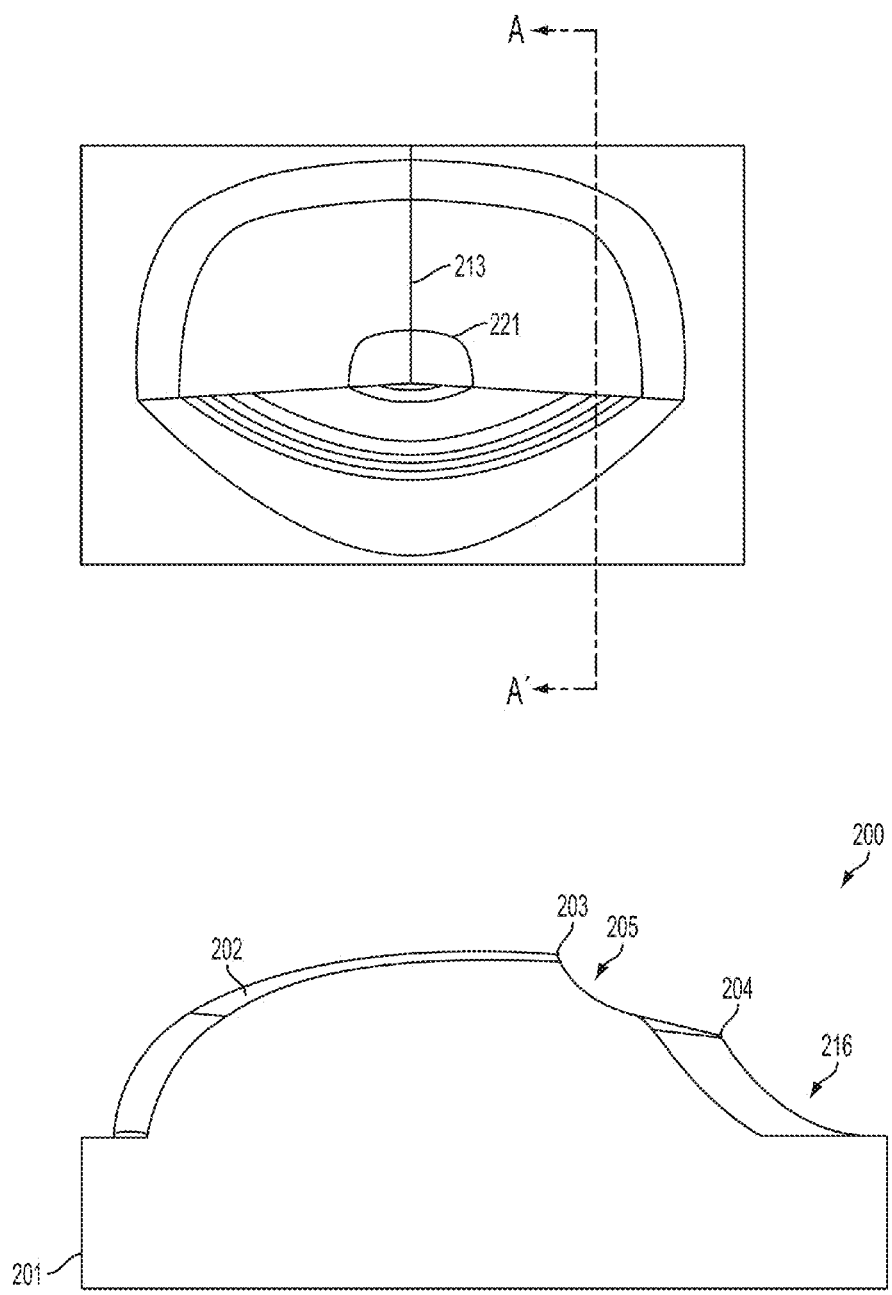
FIG. 28 depicts a planar section of a light directing apparatus, according to an example embodiment.

FIG. 28 depicts a planar section of light directing apparatus 200, taken along line A-A'. The line A-A' is parallel to centerline 213. As illustrated, the compound lens outer surface is relatively convex along line A-A'.

Figure 29:
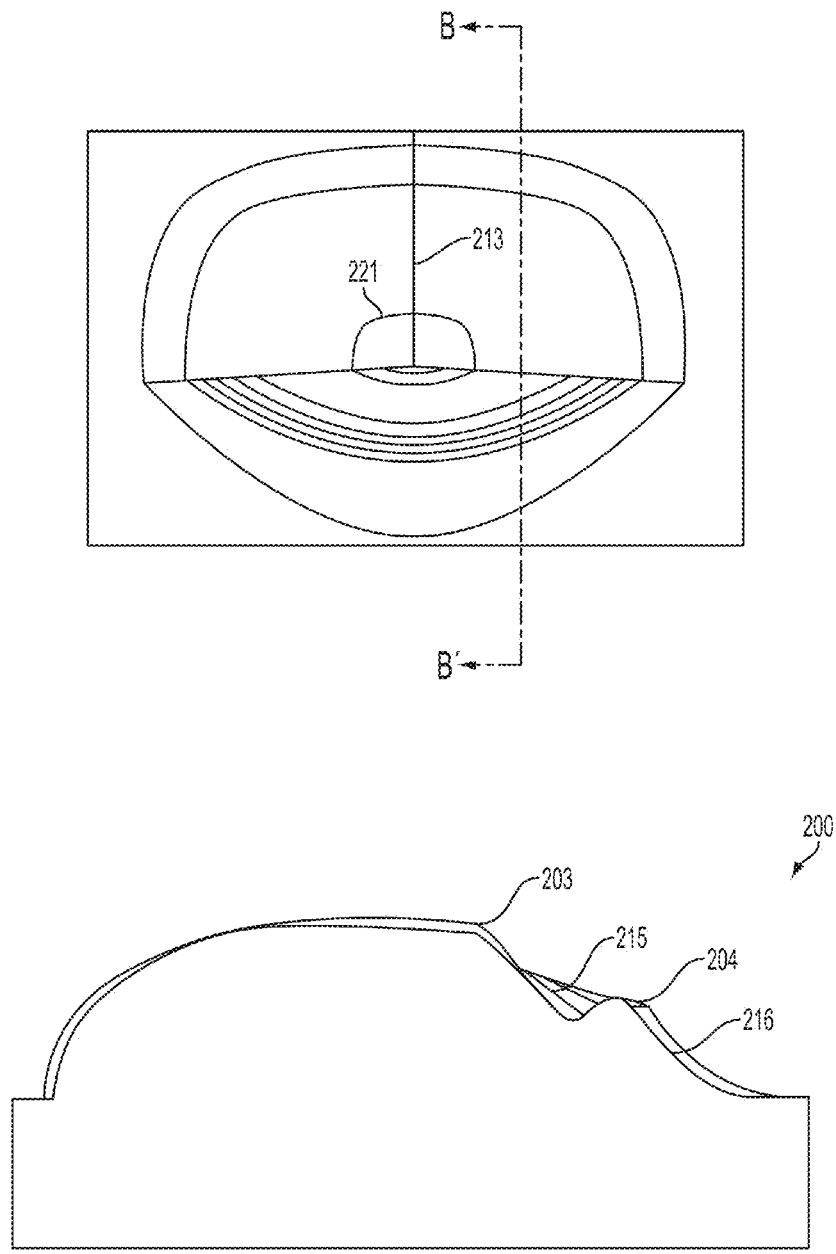
FIG. 29 depicts a planar section of a light directing apparatus, according to an example embodiment.

FIG. 29 depicts an additional planar section of light directing apparatus 200, taken along line B-B'. The line B-B' is parallel centerline 213. As illustrated, the compound lens outer surface is relatively convex along line B-B'. Furthermore, the relatively sharp, convex curved nature of surface 215 along line B-B' is apparent.

Figure 30:
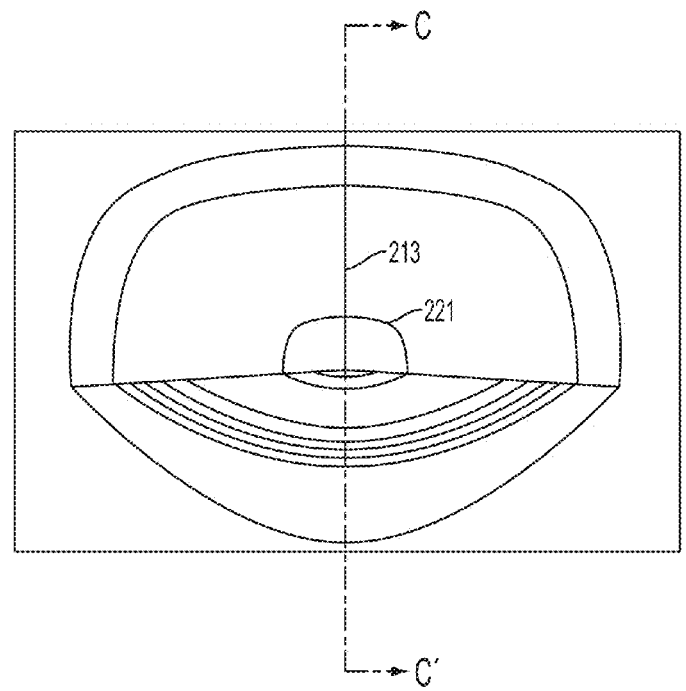
FIG. 30 depicts a planar section of a light directing apparatus, according to an example embodiment.
Figure 30:
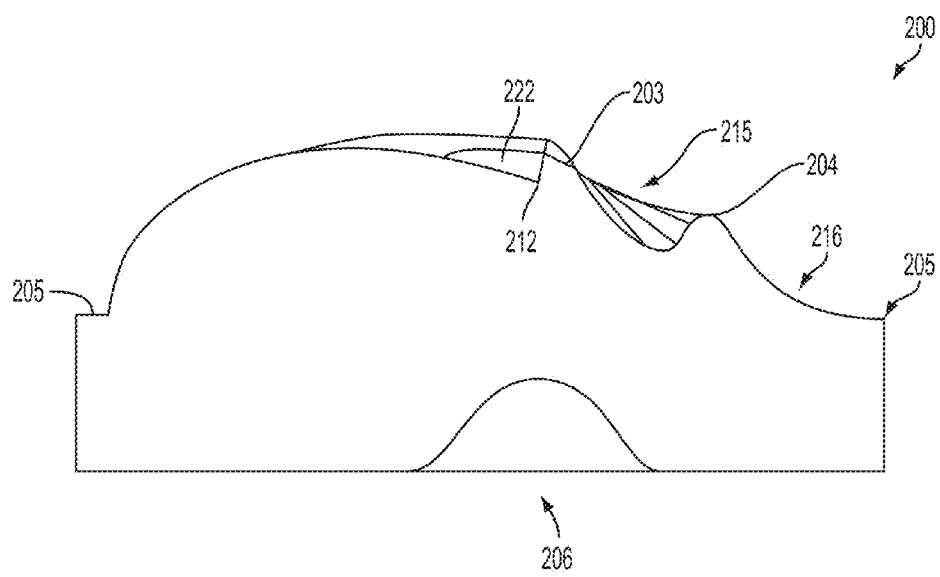

FIG. 30 depicts a planar section of light directing apparatus 200, taken along line C-C'. Line C-C' is collinear with centerline 213. As illustrated, portion 222 is generally concave, surface 215 is of a sharp, convex curved shape extending between the first protrusion 203 and the second protrusion 204, and surface 216 is of a generally convex shape extending from the second protrusion 204 to the first surface 205 of the apparatus 200.

Figure 31:
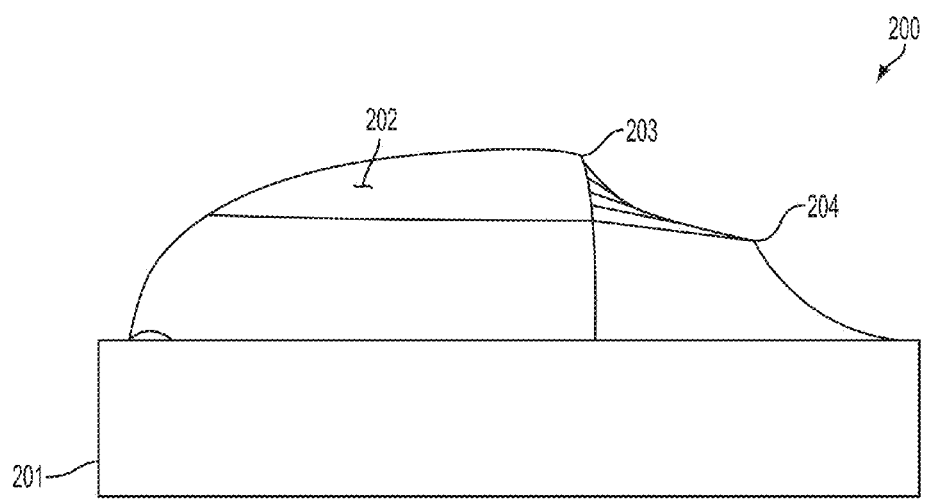
FIG. 31 depicts a planar section of a light directing apparatus, according to an example embodiment.

FIG. 31 depicts a side view of light directing apparatus 200.

Figure 32:
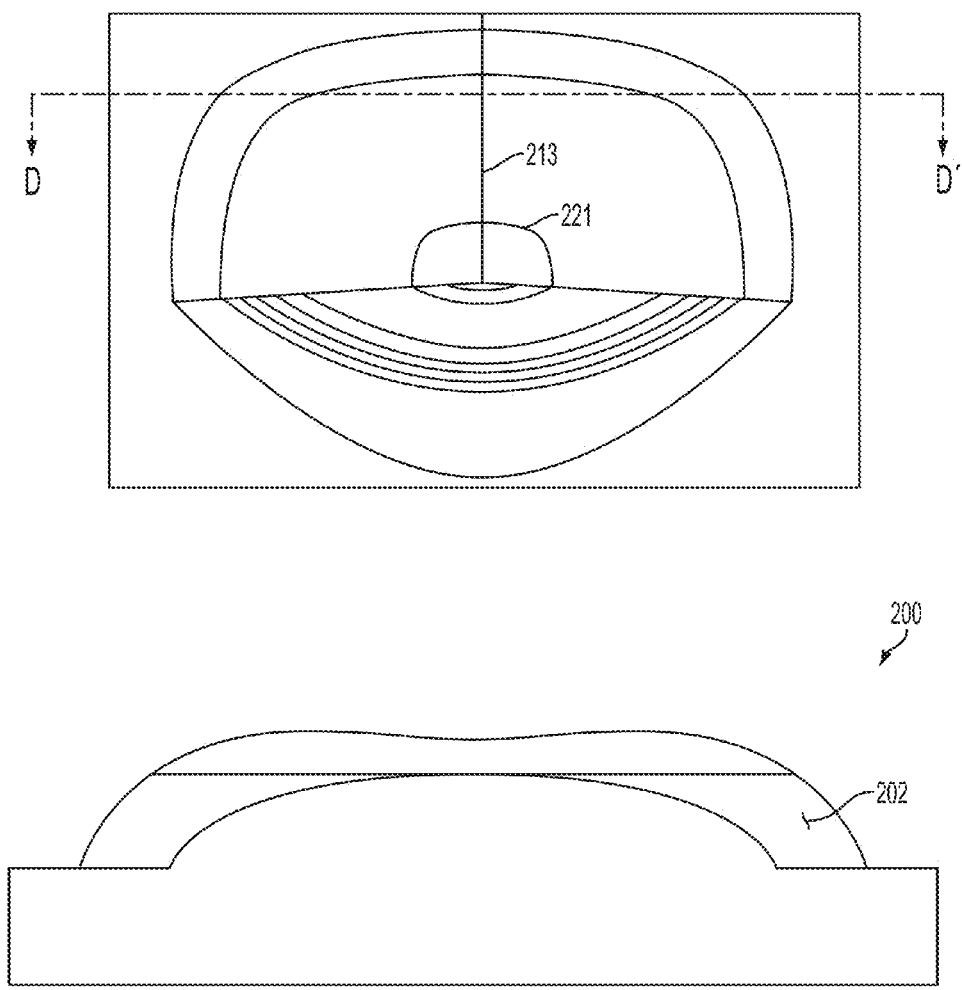
FIG. 32 depicts a planar section of a light directing apparatus, according to an example embodiment.

FIG. 32 depicts an additional planar section of light directing apparatus 200, taken along line D-D'. Line D-D' is perpendicular to centerline 213. As shown, the compound lens outer surface is generally convex at line D-D'.

Figure 33:
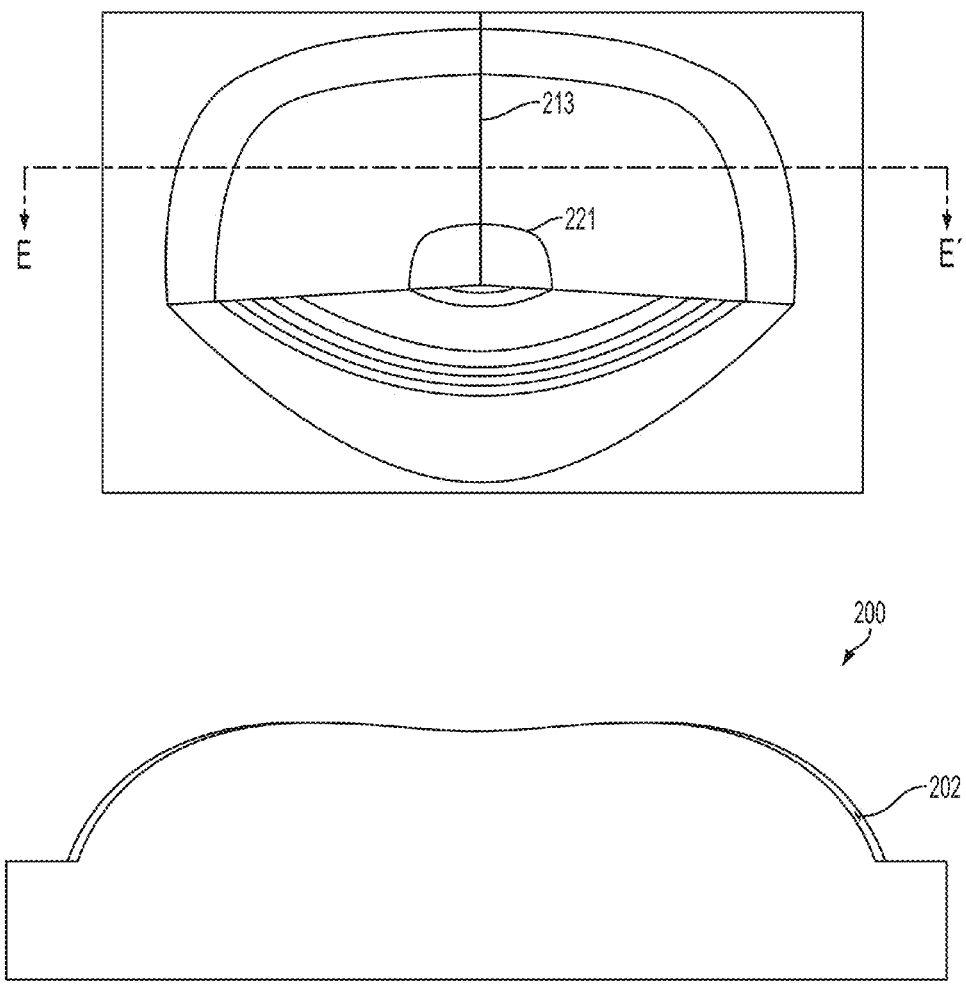
FIG. 33 depicts a planar section of a light directing apparatus, according to an example embodiment.

FIG. 33 depicts an additional planar section of light directing apparatus 200, taken along line E-E'. Line E-E' is perpendicular to centerline 213, and closer to the central axis Y' than is line D-D'. As shown, the compound lens outer surface 202 is substantially symmetrical about centerline 213.

Figure 34:
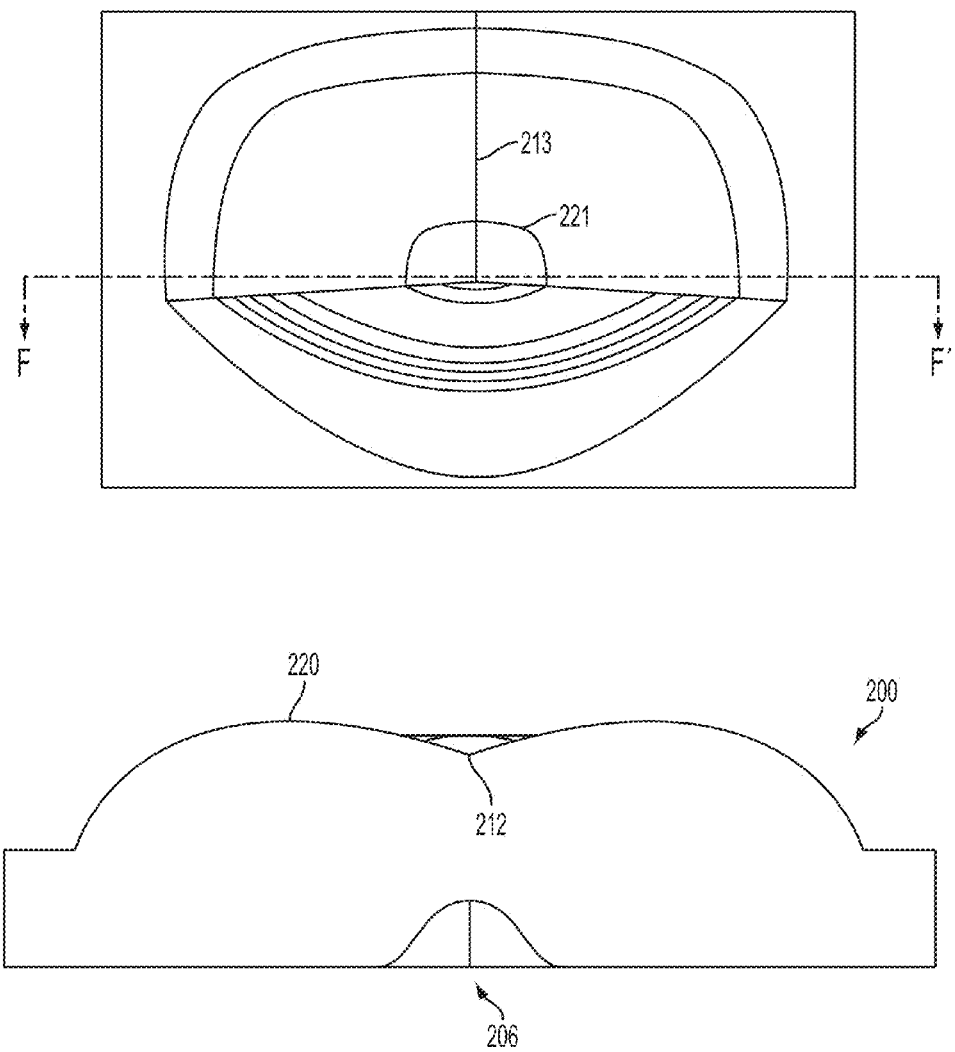
FIG. 34 depicts a planar section of a light directing apparatus, according to an example embodiment.

FIG. 34 depicts an additional planar section of light directing apparatus 200, taken along line F-F'. Line F-F' is perpendicular to centerline 213, and intersects the central axis Y'. As shown, the second edge 220 of the compound lens outer surface 202 forms a point 212 at centerline 213.

Figure 35:
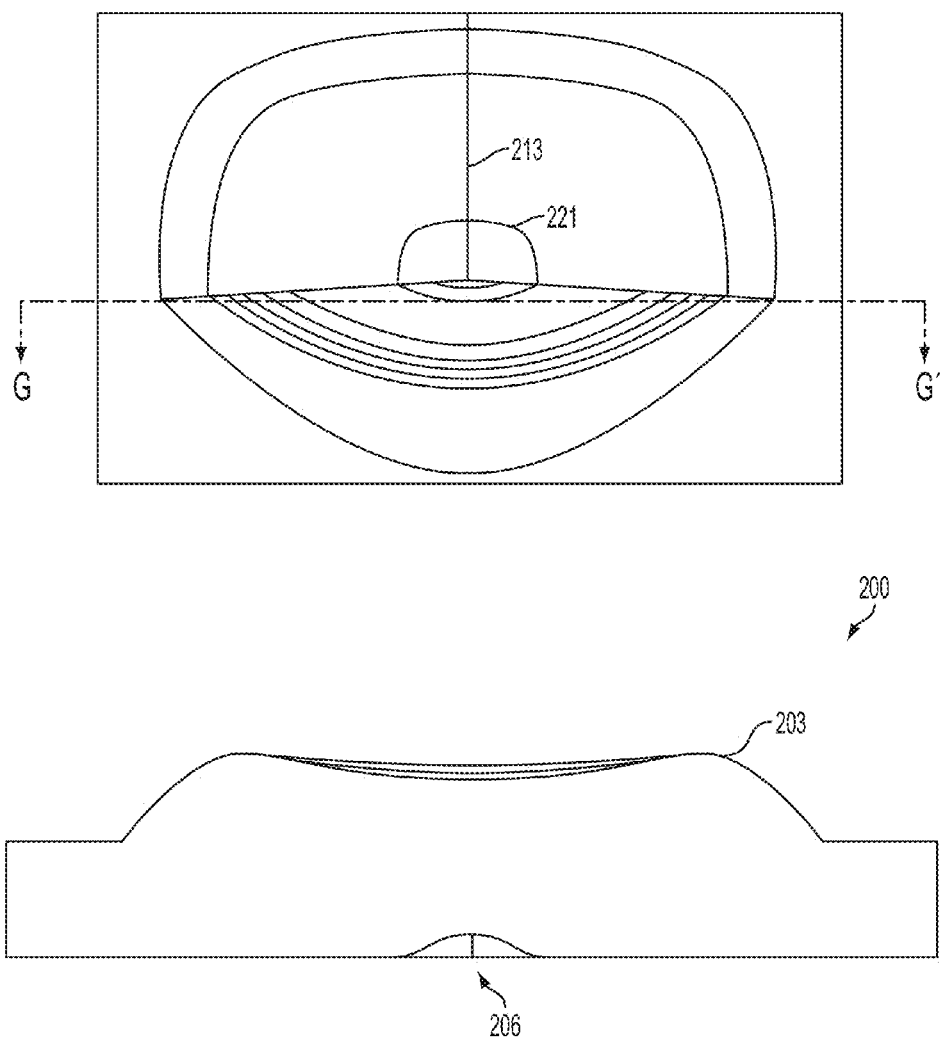
FIG. 35 depicts a planar section of a light directing apparatus, according to an example embodiment.

FIG. 35 depicts an additional planar section of light directing apparatus 200, taken along line G-G'. The line G-G' is perpendicular to centerline 213, and passes through the first protrusion 203.

Figure 36:
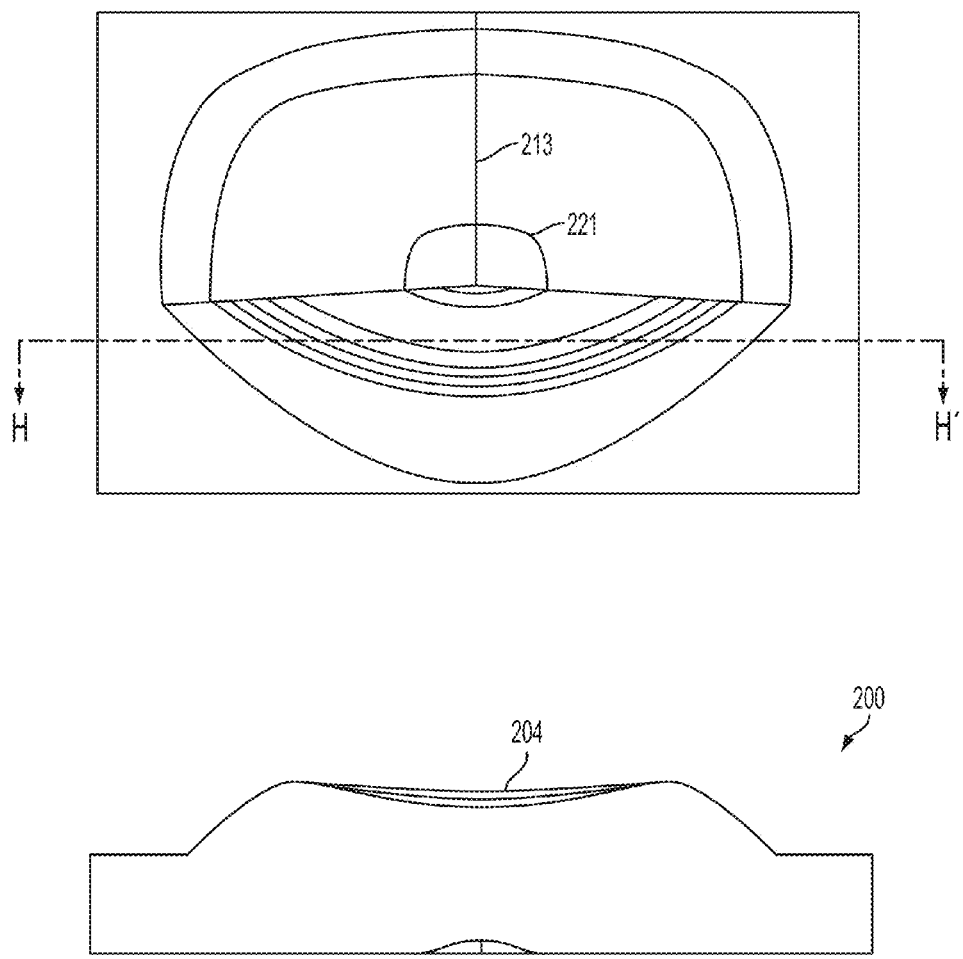
FIG. 36 depicts a planar section of a light directing apparatus, according to an example embodiment.

FIG. 36 depicts an additional planar section of light directing apparatus 200, taken along line H-H'. The line H-H' is perpendicular to centerline 213, and passes through the second protrusion 204 twice at two separate apexes or "peaks," showing the curved natured of the second protrusion 204.

Figure 37:
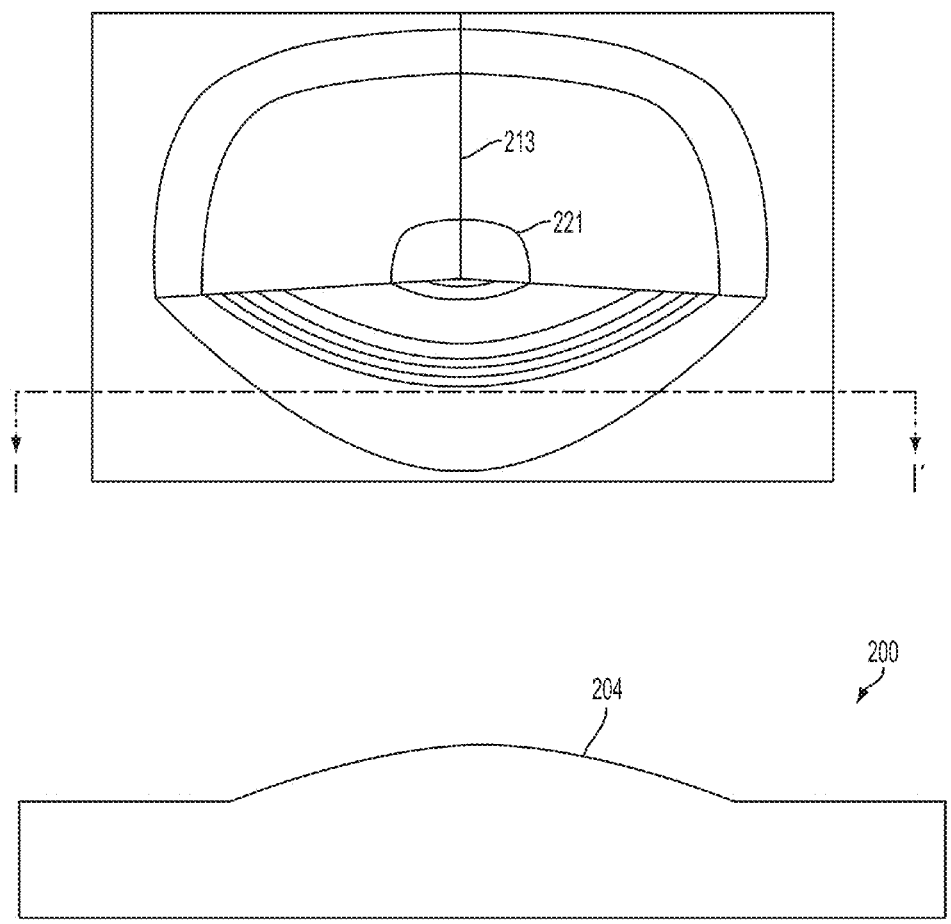
FIG. 37 depicts a planar section of a light directing apparatus, according to an example embodiment.

FIG. 37 depicts an additional planar section of light directing apparatus 200, taken along line I-I'. The line I-I' is perpendicular to centerline 213, and passes through the second protrusion 204 at a single point, showing the curved natured of the second protrusion 204 and the curved nature of the surface 216.

Figure 38:
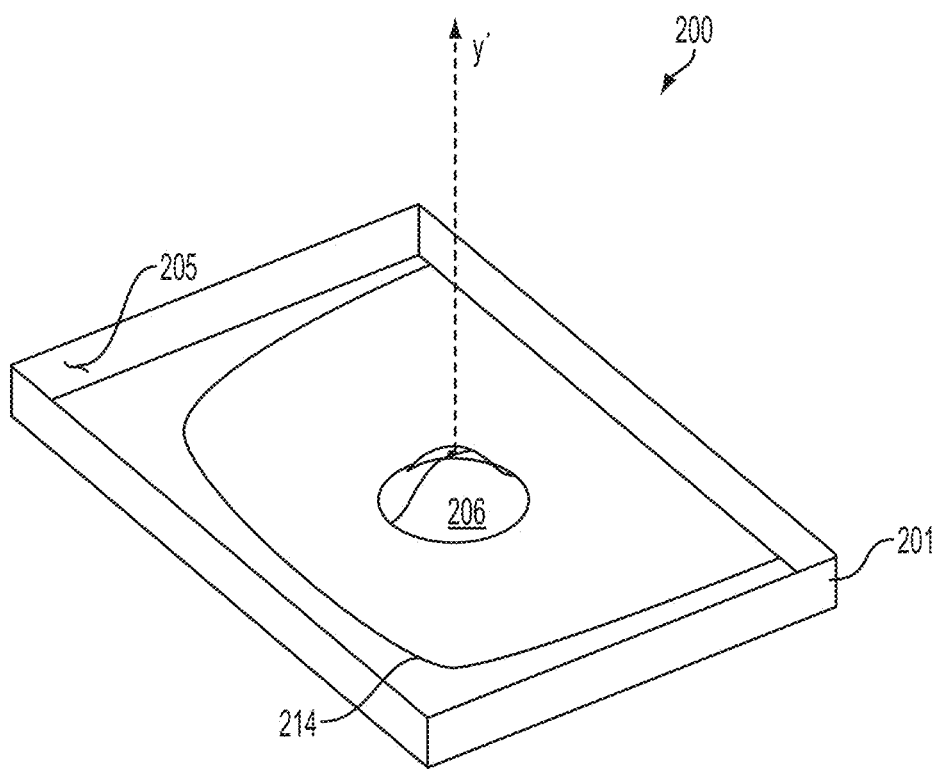
FIG. 38 depicts a perspective view of an interior of a light directing apparatus, according to an example embodiment.

FIG. 38 depicts a perspective view of an interior of light directing apparatus 200. As shown, the light-receiving portion 206 is rotationally symmetrical about central axis Y'.

Although structurally unique, it should be appreciated that the combination of compound lens outer surface 202 and protrusions 103-104 provide for light redirecting properties somewhat similar to those provide by apparatus 100. For example, the protrusions 203 and 204 redirect light emitted from a light source generally towards the street side of the apparatus 200.

With regard to light-redirection, rays are reflected internally (i.e., on surfaces internal to the lens 200) towards the street side. For example, as a ray of incident light reacts with an air-surface interface, this ray of incident light is reflected towards the street side of the lens 200 through substantially total internal reflection achieved through a combination of the first and second protrusions 203, 204, similar to that described above with reference to FIG. 18. In this manner, the combination of internal reflections of incident light redirects light emitted from a light source towards the street side of lens 200.

Further, although not illustrated for the sake of clarity, it is appreciated that light not internally reflected tends to be refracted towards the street side as well to be reflected through interaction with surfaces 215 and 216 associated with the first and second protrusions 203 and 204, respectively.

Therefore, as described above, it is apparent that light emitted from a light source substantially coupled to the lens 200 interacts with the first and second protrusions 203, 204 such that this light is redirected towards a street side of the lens 200 through substantially total internal reflection, and partially through refraction. Additionally, it should be appreciated that refraction of light at the compound lens outer surface 202 on the first portion of the lens 200 also occurs such that this light is redirected towards the street side of the lens 200.

Figure 39:
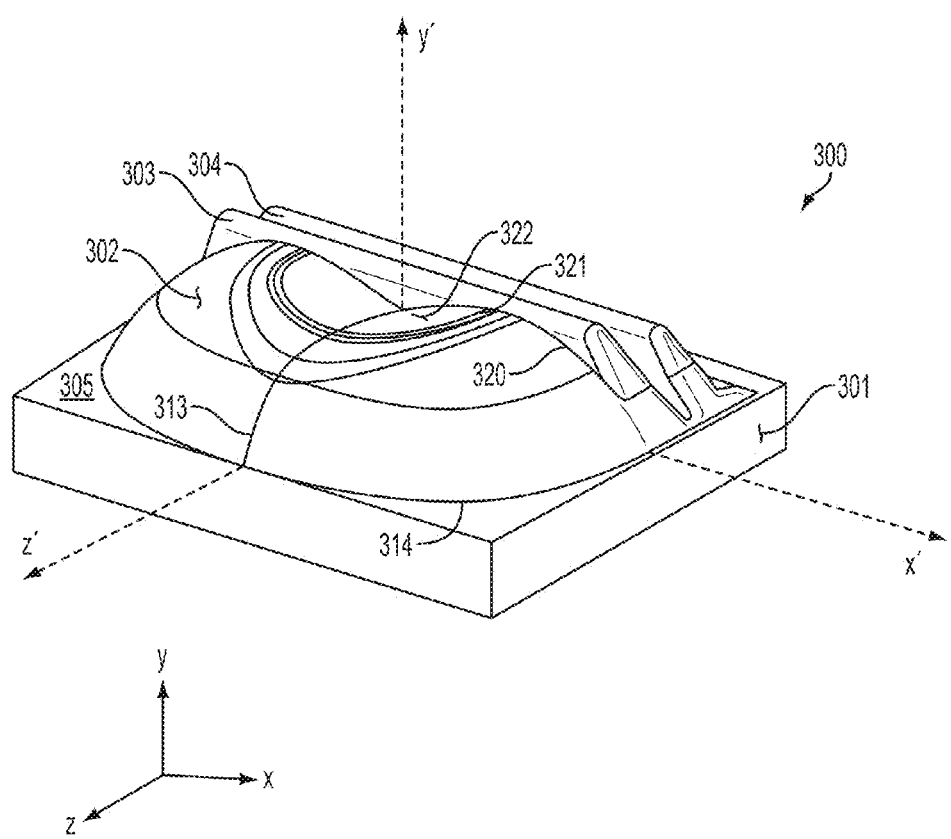
FIG. 39 depicts a perspective view of a light directing apparatus, according to an example embodiment.
Figure 40:
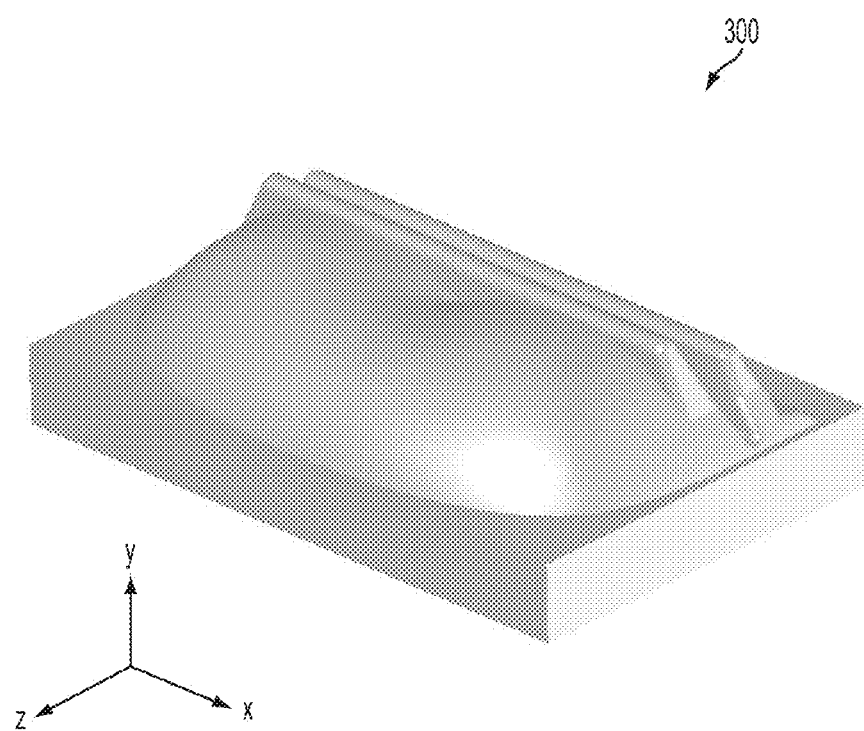
FIG. 40 depicts a perspective view of a light directing apparatus, according to an example embodiment.

Turning now to FIGS. 39-40 perspective views of an additional alternative light directing apparatus 300 is depicted. The light directing apparatus 300 may be formed of a material suitable for light transmission, for example, optically clear acrylic, silicone, or other suitable material. As illustrated, the apparatus 300 includes a base or optical substrate 301. The apparatus 300 further includes a compound lens outer surface 302 on a first side 305 of the optical substrate 301, the first side 305 of the optical substrate 301 defining a main plane X'-Z'. The compound lens outer surface 302 may be relatively smooth or may include at least a textured portion, for example through sand-blasting, etching, coating, or similarly texturizing a portion or portions of the compound lens surface 202. The textured surface or portion of the surface may reduce color separation and may be configured to blend or mix light for a more uniform color output profile. For example, a grain or coarseness of the texture may be adjusted to promote a desired color-blending profile for any desired application.

The apparatus 300 may further include a first protrusion 303 on the first side of the optical substrate 301, and a second protrusion 304 on the first side of the optical substrate 301. The first protrusion 303 is proximate to both the second protrusion 304 and the compound lens outer surface 302, and is disposed between the second protrusion 304 and the compound lens outer surface 302.

As shown, a centerline or valley 313 extends from a first edge 314 of the compound lens outer surface 302, to a point 312 on a second edge 320 of the compound lens outer surface 302. The compound lens outer surface has mirror image symmetry about the Y'-Z' plane (medial plane) containing the centerline 313. A region 322 which partially surrounds point 312 is defined by line 321 and is concave, or substantially concave in comparison to the rest of the compound lens outer surface 302. The concavity of region 322 has mirror image symmetry about the medial Y'-Z' plane. The reference axis Y' is orthogonal to the main plane X'-Z', and may be central to the body of the apparatus 300, and collinear with a central axis of an LED mated thereto.

Figure 41:
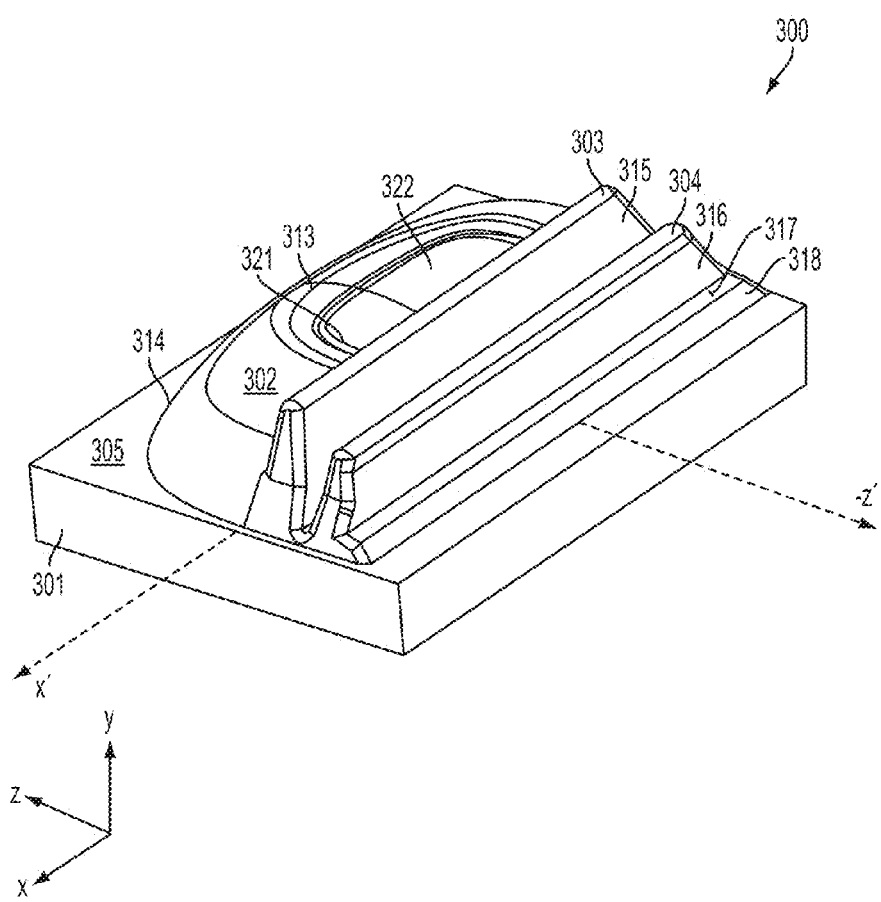
FIG. 41 depicts a perspective view of a light directing apparatus, according to an example embodiment.
Figure 42:
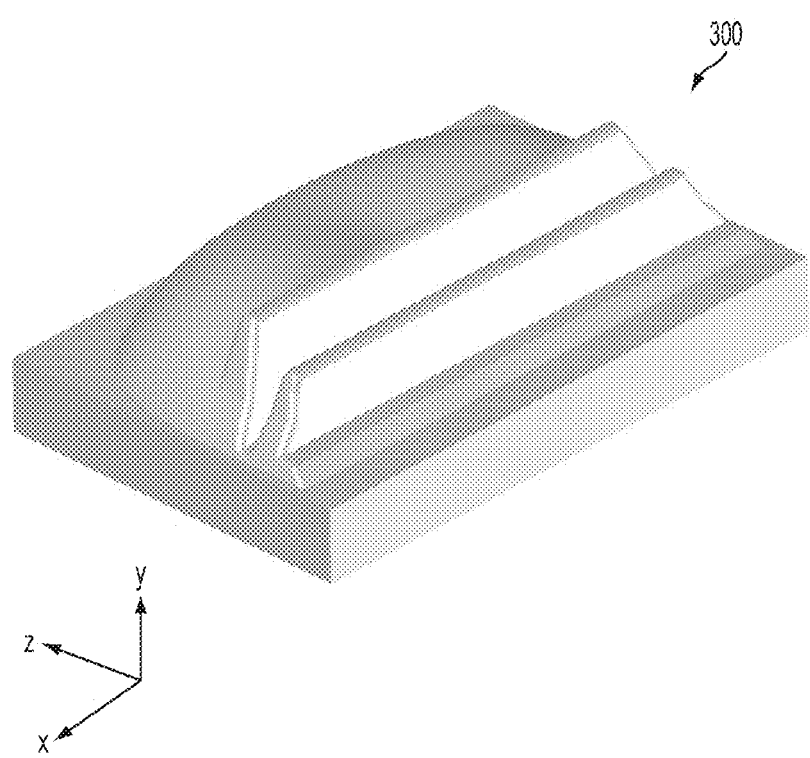
FIG. 42 depicts a perspective view of a light directing apparatus, according to an example embodiment.

FIGS. 41-42 depict an alternate perspective view of light directing apparatus 300. As illustrated, the first protrusion 303 includes a generally flat surface 315, which is proximate an apex or "tip" of the first protrusion 303 and the first side 305 of the optical substrate 301. As further illustrated, the second protrusion 304 includes a compound angular surface comprising at least three portions, a first portion 316, a second portion 317, and a third portion 318. The first portion 316 may be relatively flat, or may be slightly curved, angled, or similarly arranged depending upon any desired lighting profile. As particularly illustrated, the first portion 316 is slightly curved and is proximate to an apex or "tip" of the second protrusion 304 and the second portion 317. The second portion 317 may be relatively flat, and is proximate both the first portion 316 and the third portion 318. The third portion 318 may be relatively flat, and is proximate both the second portion 317 and the first side 315 of the optical substrate 301.

According to an example embodiment, one or more of surface 315 and/or portions 316, 317, and 318 may be textured, for example, to aid in increasing light dispersion uniformity through sand-blasting, etching, coating, or otherwise texturizing respective surfaces. Furthermore, a grain or coarseness of the texture may be adjusted to promote a desired lighting profile for any desired application.

Figure 43:
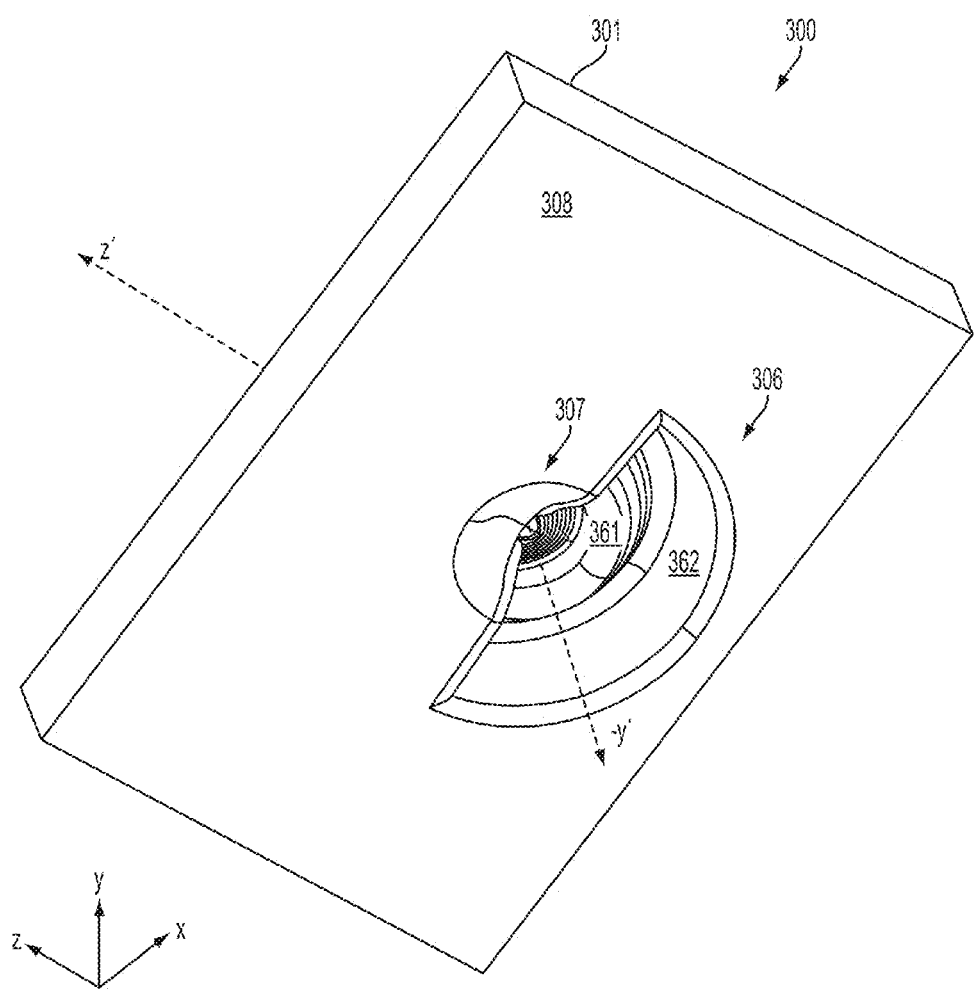
FIG. 43 depicts a perspective view of a light directing apparatus, according to an example embodiment.

FIG. 43 depicts an alternate perspective view of light directing apparatus 300. As shown, the light directing apparatus 300 includes a collimator 306 arranged on a second side 308 of the optical substrate 301. The collimator 306 includes at least two reflective indentations 361 and 362. The reflective indentations are generally circular and rotationally symmetric, or at least partially circular and partially rotationally symmetric, about the central axis Y'. The apparatus 300 further includes an LED light-receiving portion 307 arranged on the second side 308 of the optical substrate 301 and proximate to the collimator 306. In an embodiment, the light-receiving portion 307 forms a recess in the second side of the optical substrate that receives an LED, thereby forming a mating portion for the LED (for example, as seen for apparatus 100 in FIG. 18). The light-receiving portion 307 may be generally hemispherical and rotationally symmetric about the central axis Y'. The light-receiving portion 307 may be disposed to receive an LED or other solid state light source. A surface of the light-receiving portion 307 may be textured (e.g., through sand-blasting, acid-etching, coating, or any other means of texturing) to reduce an interior halo of light emitted from a light source. For example, the light source is an LED or a semiconductor light source, and the surface of the light-receiving portion 307 is textured to reduce an interior halo of the LED. Furthermore, another portion or portions of the second side 308 may additionally/alternatively be textured to aid in reducing halo and/or promote better color-blending.

As described above with reference to FIG. 39-43, according to at least one example embodiment, a light directing apparatus 300 includes an optical substrate 301, a compound lens outer surface 302 on a first side of the optical substrate, a first protrusion 303 on a second portion of the first side of the optical substrate proximate the compound lens outer surface, and a second protrusion 304 on the second portion of the optical substrate proximate the first protrusion.

To better understand these and other features and functions of the light directing apparatus 300, detailed illustrations are provided in FIGS. 44-53. All illustrations are presented with coordinate axes matched with the particular orientation of the apparatus 300 illustrated in each figure.

Figure 44:
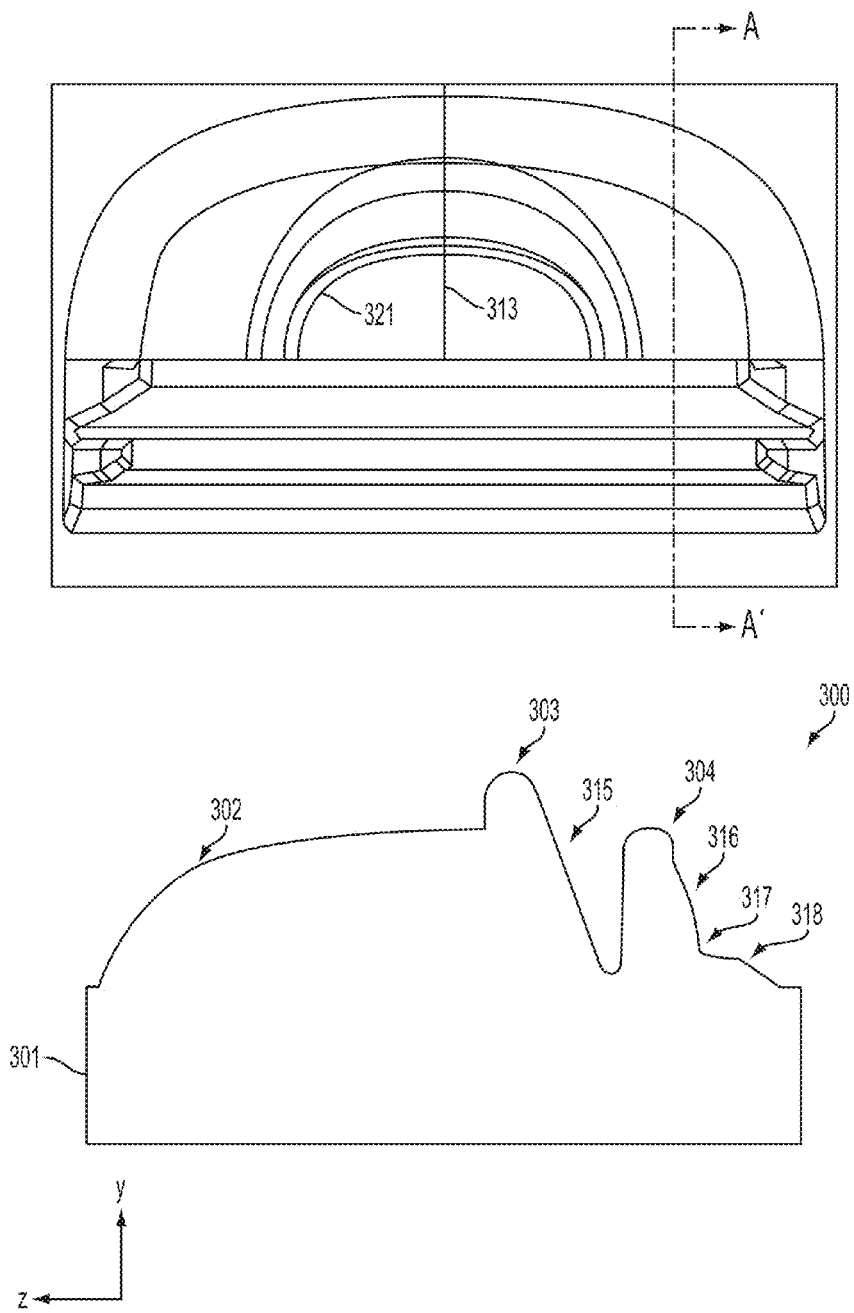
FIG. 44 depicts a planar section of a light directing apparatus, according to an example embodiment.

FIG. 44 depicts a planar section of light directing apparatus 300, taken along line A-A'. The line A-A' is parallel to centerline 313. As illustrated, the compound lens outer surface is relatively convex along line A-A'.

Figure 45:
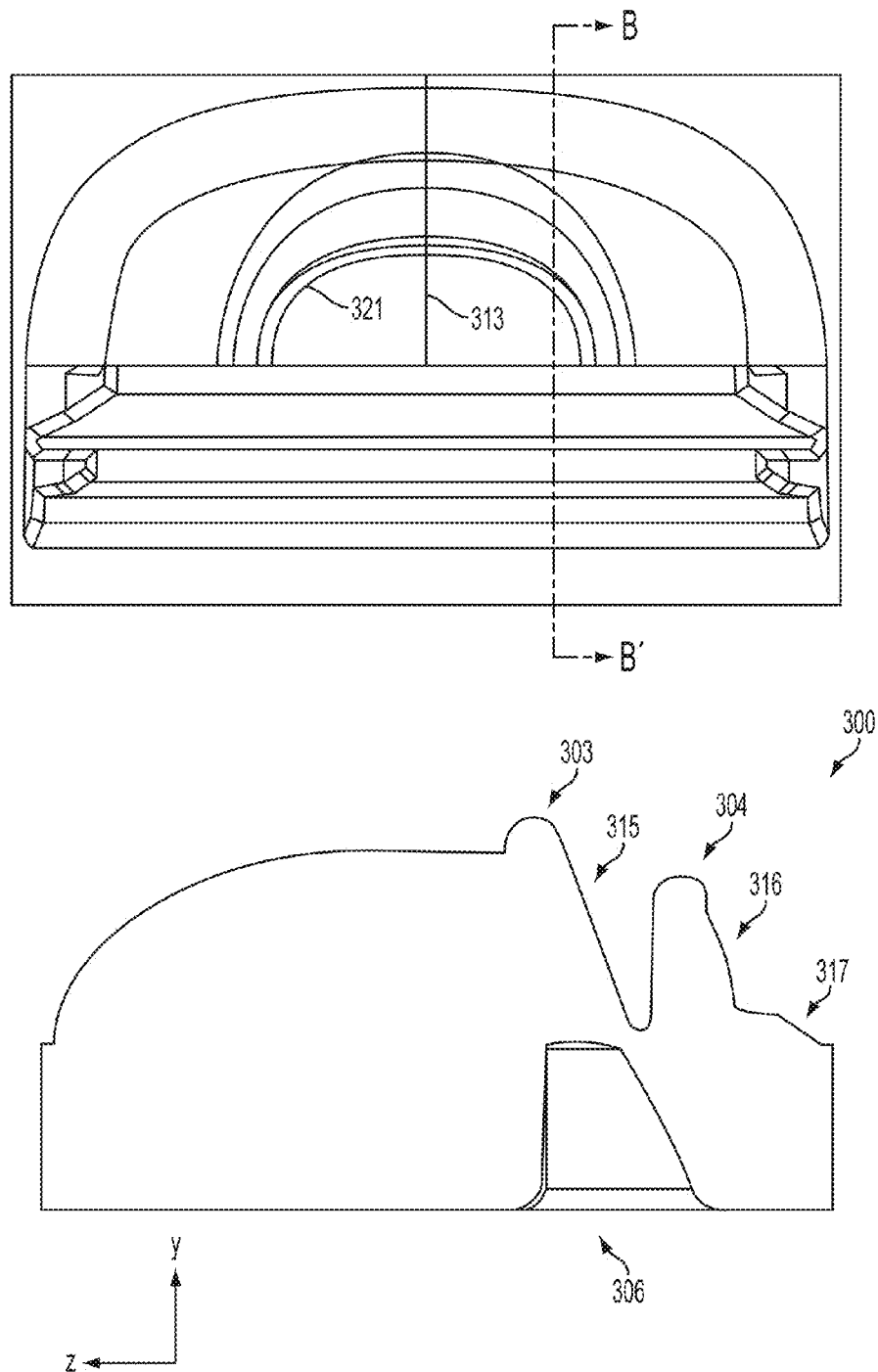
FIG. 45 depicts a planar section of a light directing apparatus, according to an example embodiment.

FIG. 45 depicts an additional planar section of light directing apparatus 300, taken along line B-B'. The line B-B' is parallel centerline 313. As illustrated, the compound lens outer surface is relatively convex along line B-B'. Furthermore, an outer edge of reflective indentation 362 of collimator 306 is present along line B-B'.

Figure 46:
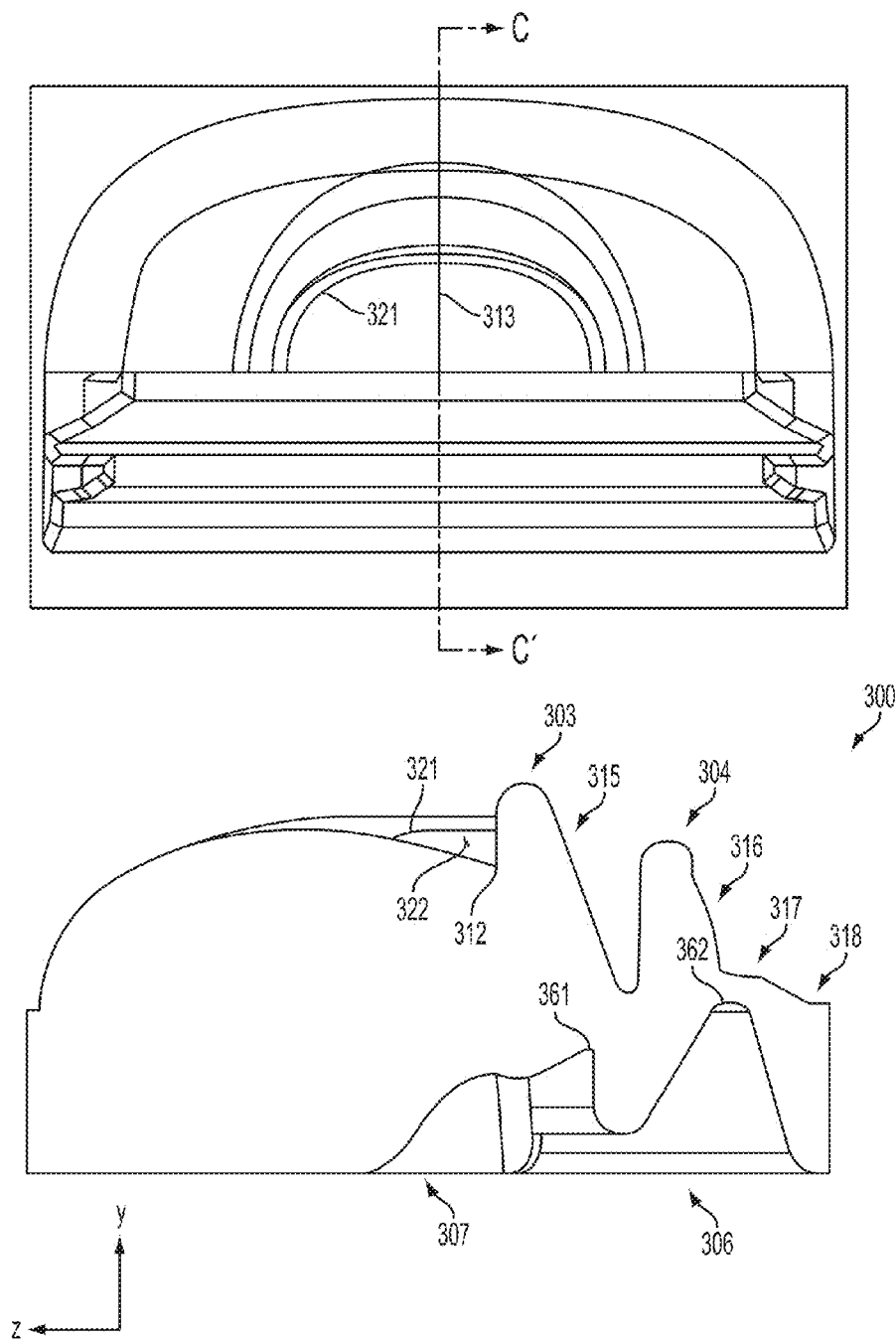
FIG. 46 depicts a planar section of a light directing apparatus, according to an example embodiment.

FIG. 46 depicts a planar section of light directing apparatus 300, taken along line C-C'. Line C-C' is collinear with centerline 313. As illustrated, portion 322 is generally concave. Furthermore, reflective indentations 361 and 362 have a generally triangular profile.

Figure 47:
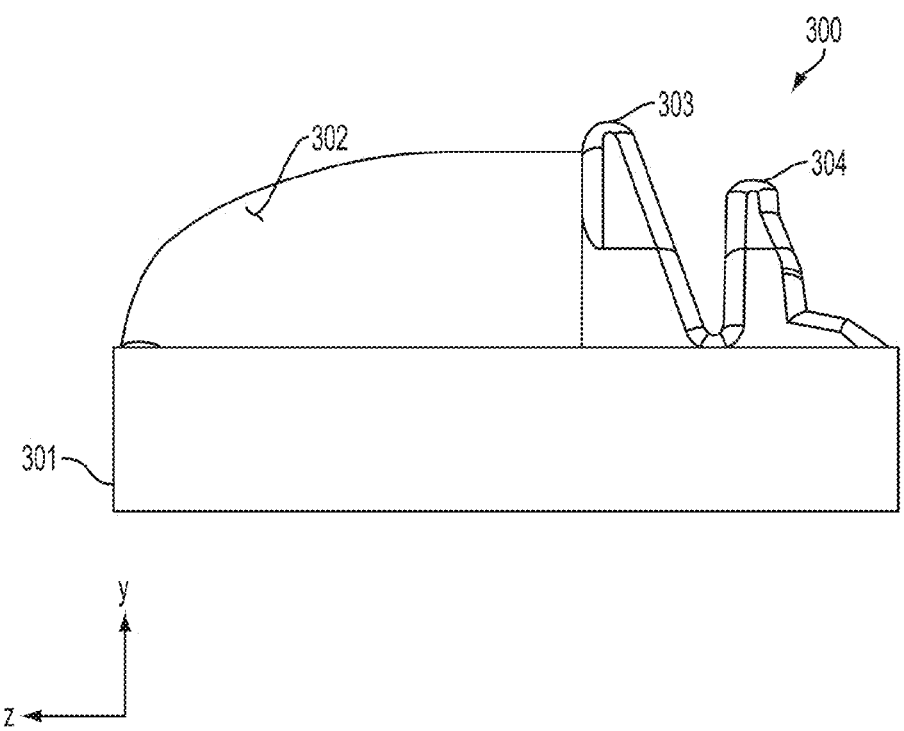
FIG. 47 depicts a planar section of a light directing apparatus, according to an example embodiment.

FIG. 47 depicts a side view of light directing apparatus 300.

Figure 48:
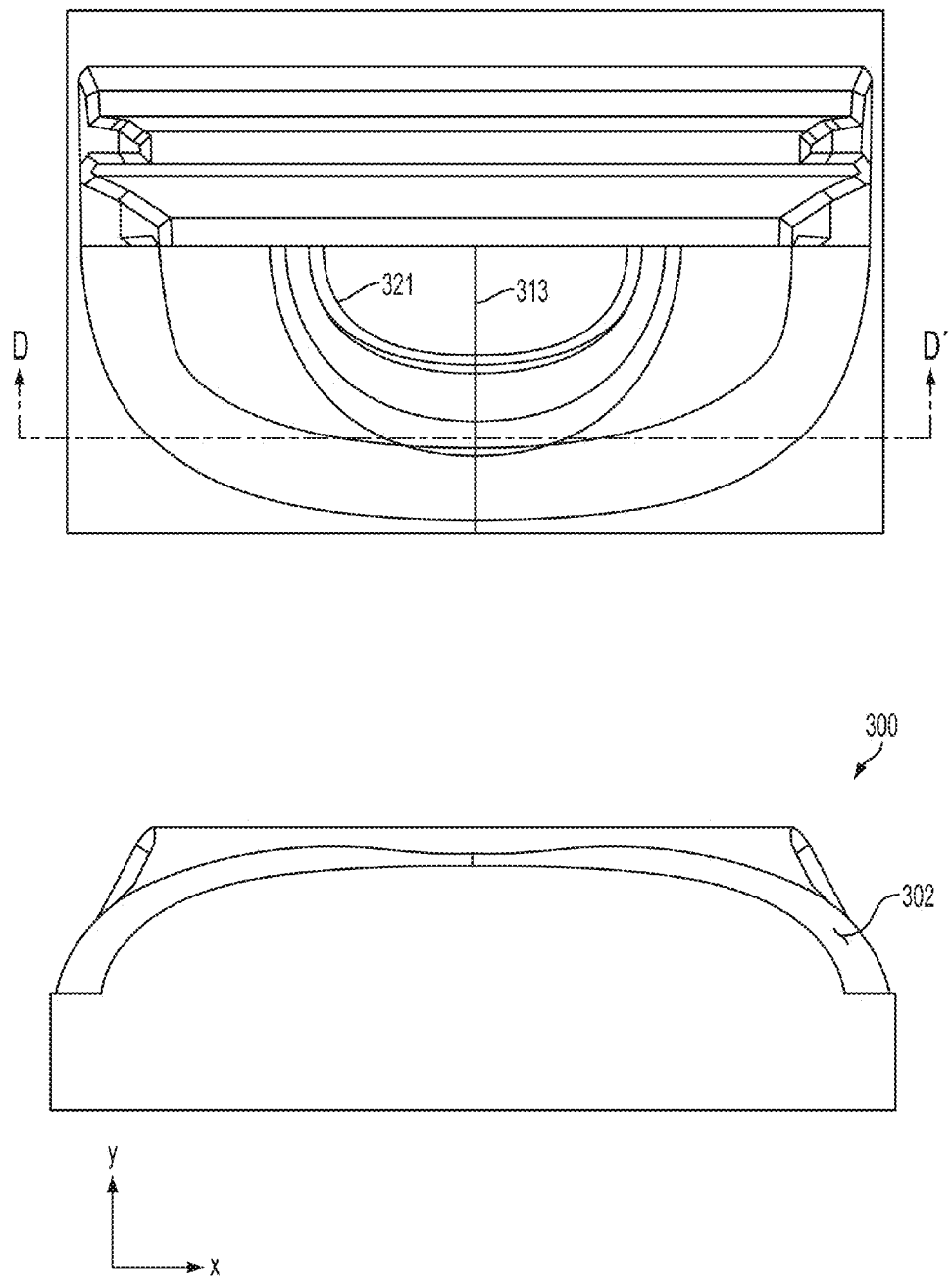
FIG. 48 depicts a planar section of a light directing apparatus, according to an example embodiment.

FIG. 48 depicts an additional planar section of light directing apparatus 300, taken along line D-D'. Line D-D' is perpendicular to centerline 313. As shown, the compound lens outer surface is generally convex at line D-D'.

Figure 49:
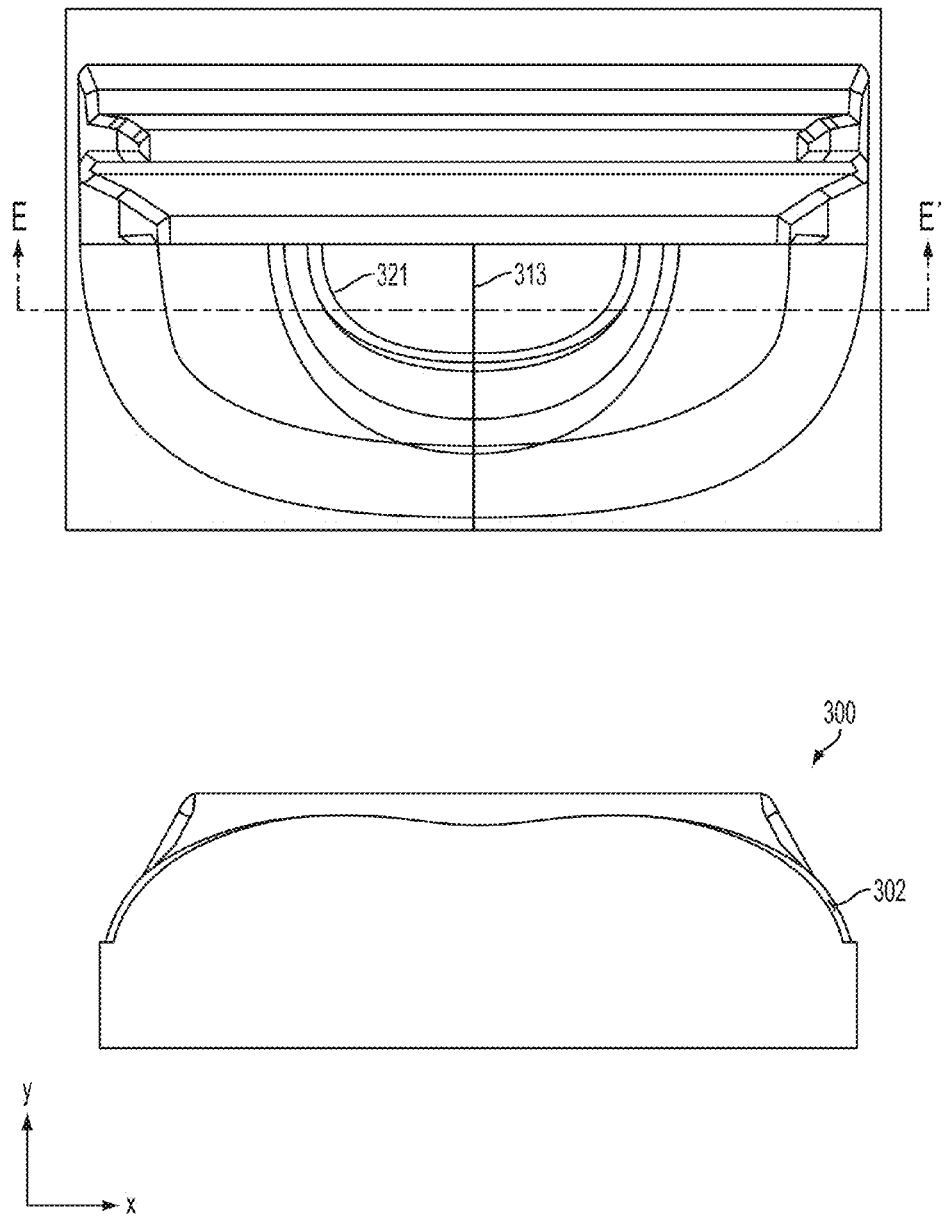
FIG. 49 depicts a planar section of a light directing apparatus, according to an example embodiment.

FIG. 49 depicts an additional planar section of light directing apparatus 300, taken along line E-E'. Line E-E' is perpendicular to centerline 313, and closer to the central axis Y' than is line D-D'. As shown, the compound lens outer surface 302 is substantially symmetrical about centerline 313.

Figure 50:
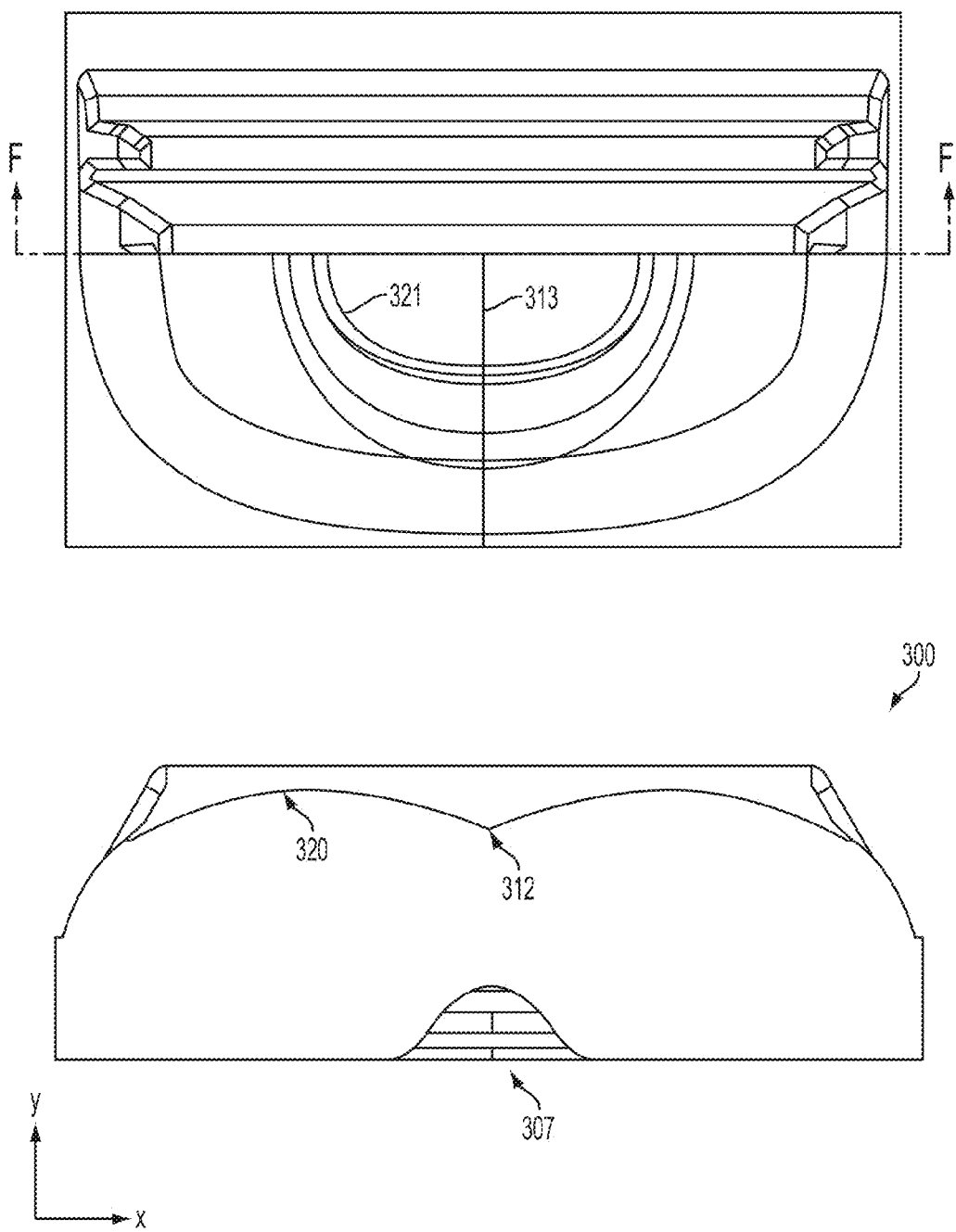
FIG. 50 depicts a planar section of a light directing apparatus, according to an example embodiment.

FIG. 50 depicts an additional planar section of light directing apparatus 300, taken along line F-F'. Line F-F' is perpendicular to centerline 313, and intersects the central axis Y'. As shown, the second edge 320 of the compound lens outer surface 302 forms a point 312 at centerline 313.

Figure 51:
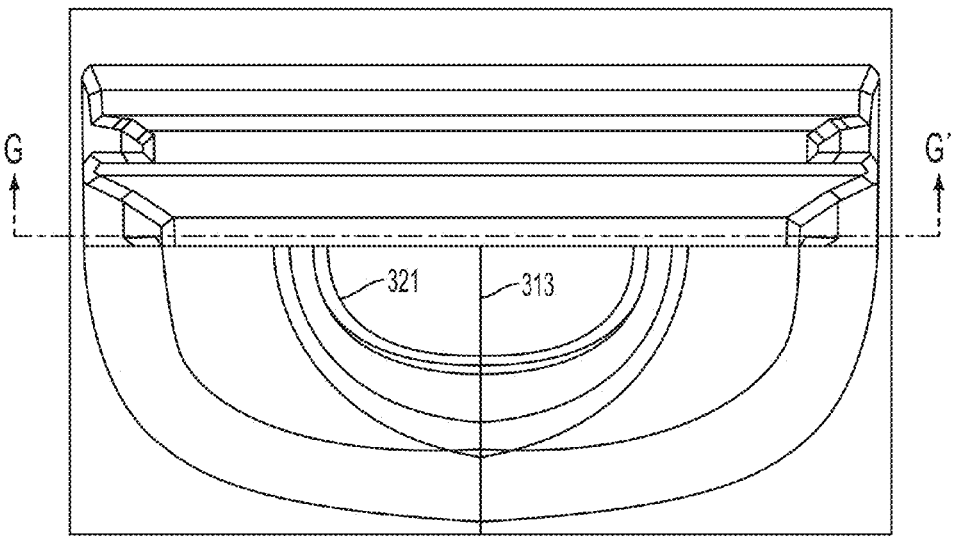
FIG. 51 depicts a planar section of a light directing apparatus, according to an example embodiment.
Figure 51:
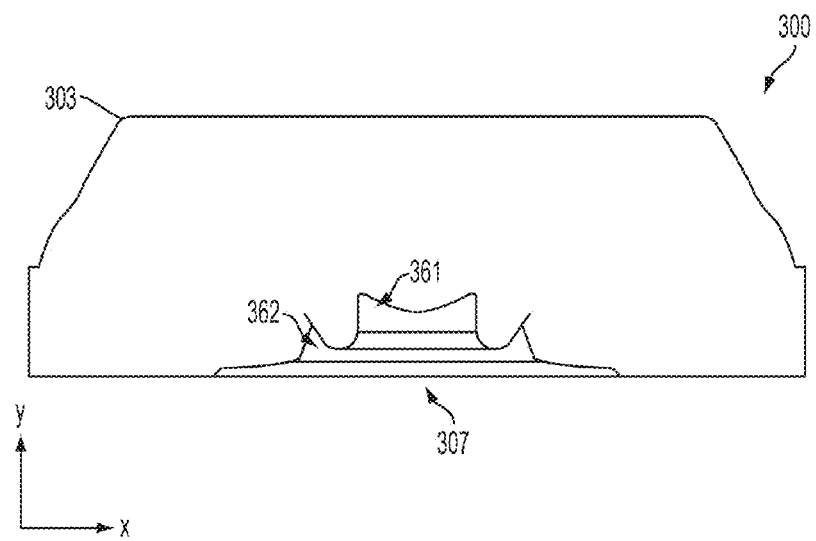

FIG. 51 depicts an additional planar section of light directing apparatus 300, taken along line G-G'. The line G-G' is perpendicular to centerline 313, and passes through the first protrusion 303.

Figure 52:
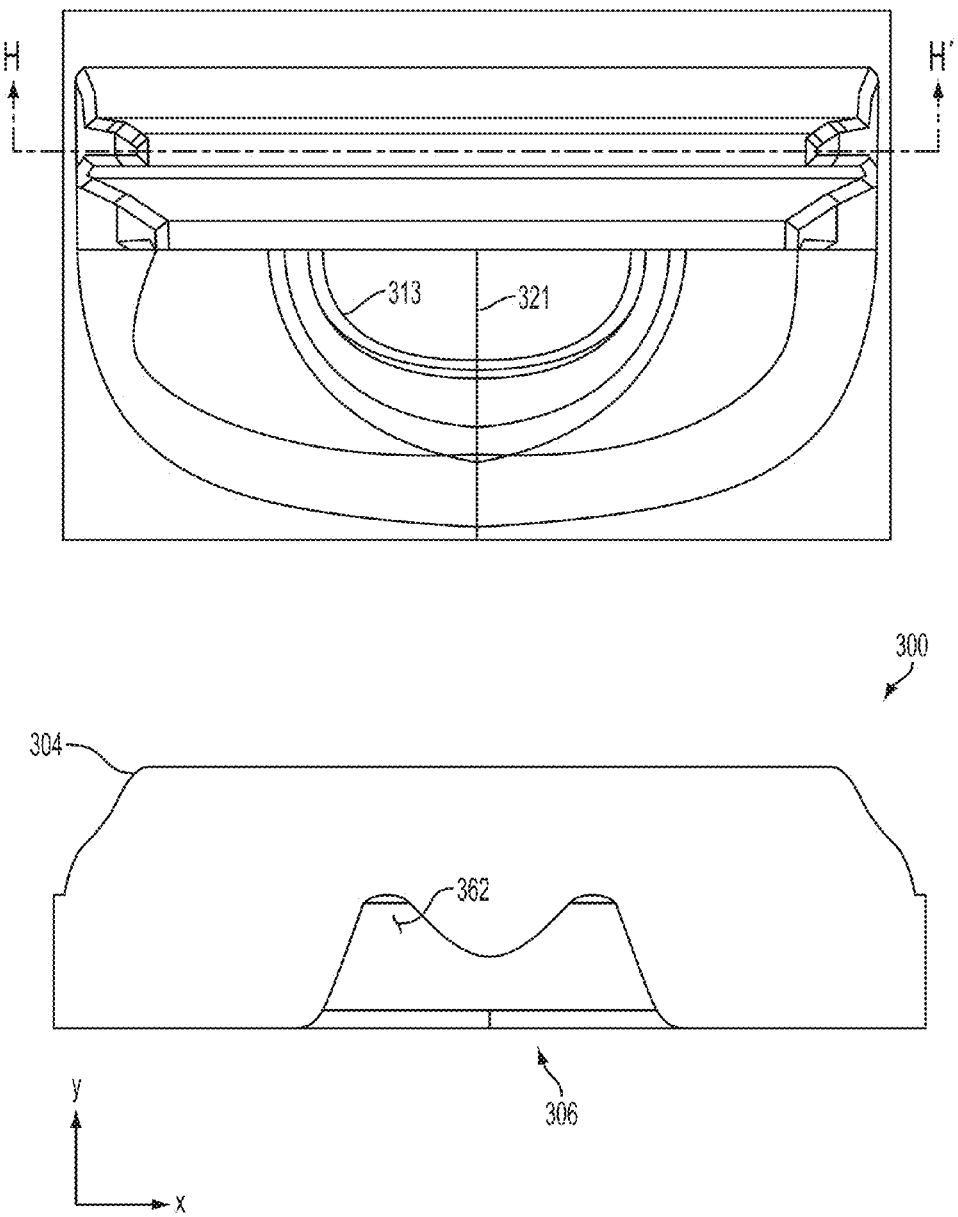
FIG. 52 depicts a planar section of a light directing apparatus, according to an example embodiment.

FIG. 52 depicts an additional planar section of light directing apparatus 300, taken along line H-H'. The line H-H' is perpendicular to centerline 313, and passes through the second protrusion 304.

Figure 53:
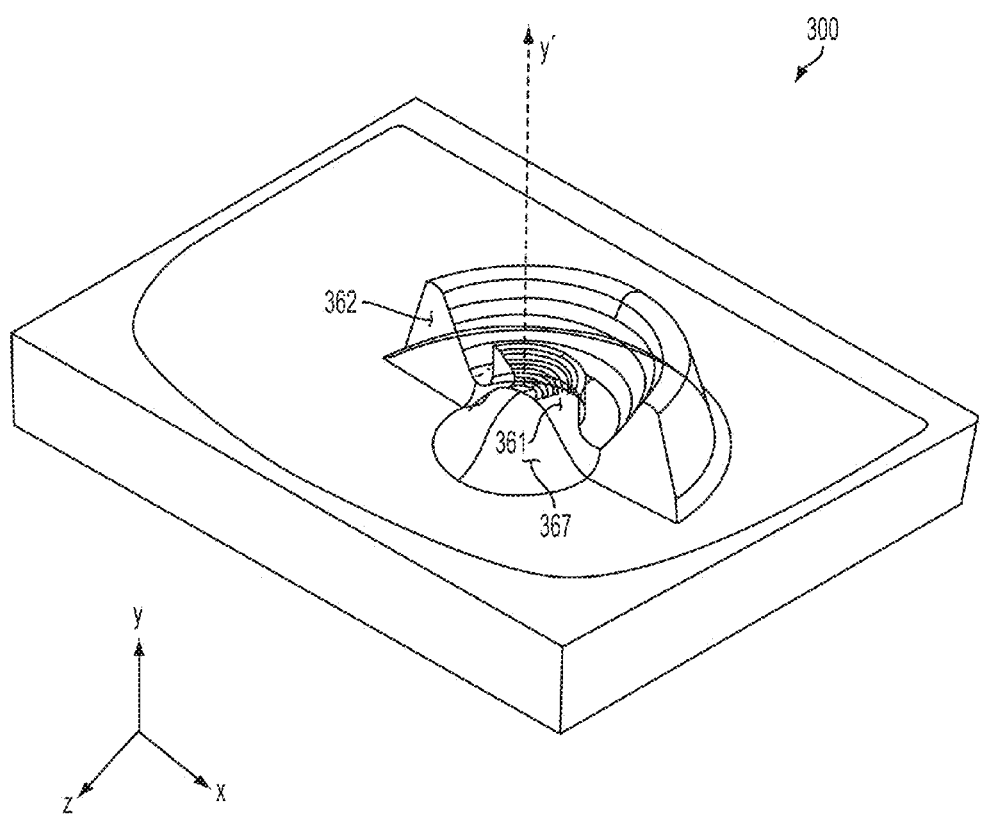
FIG. 53 depicts a perspective view of an interior of a light directing apparatus, according to an example embodiment.

FIG. 53 depicts a perspective view of an interior of light directing apparatus 300. As shown, the collimator 306 is partially rotationally symmetrical about central axis Y'. Furthermore, the light-receiving portion 307 is partially rotationally symmetrical about central axis Y'.

Although structurally unique, it should be appreciated that the combination of compound lens outer surface 302 and protrusions 303-304 and collimator 306 provide for light redirecting properties somewhat similar to those provide by apparatus 100. For example, the protrusions 303 and 304 redirect light emitted from a light source generally towards the street side of the apparatus 300 very similarly as illustrated and described with reference to FIG. 18.

With regard to light-redirection, rays are reflected internally (i.e., on surfaces internal to the lens 300) towards the street side. For example, as a ray of incident light reacts with an air-surface interface, this ray of incident light is reflected towards the street side of the lens 300 through substantially total internal reflection achieved through a combination of the first and second protrusions 303, 304, similar to that described above with reference to FIG. 18. In this manner, the combination of internal reflections of incident light redirects light emitted from a light source towards the street side of lens 300.

Further, although not illustrated for the sake of clarity, it is appreciated that light not internally reflected tends to be refracted towards the street side as well to be reflected through interaction with surfaces 315 and 316 associated with the first and second protrusions 303 and 304, respectively.

Therefore, as described above, it is apparent that light emitted from a light source substantially coupled to the lens 300 interacts with the first and second protrusions 303, 304 such that this light is redirected towards a street side of the lens 300 through substantially total internal reflection, and partially through refraction. Additionally, it should be appreciated that refraction of light at the compound lens outer surface 302 on the first portion of the lens 300 also occurs such that this light is redirected towards the street side of the lens 300.

Figure 54:
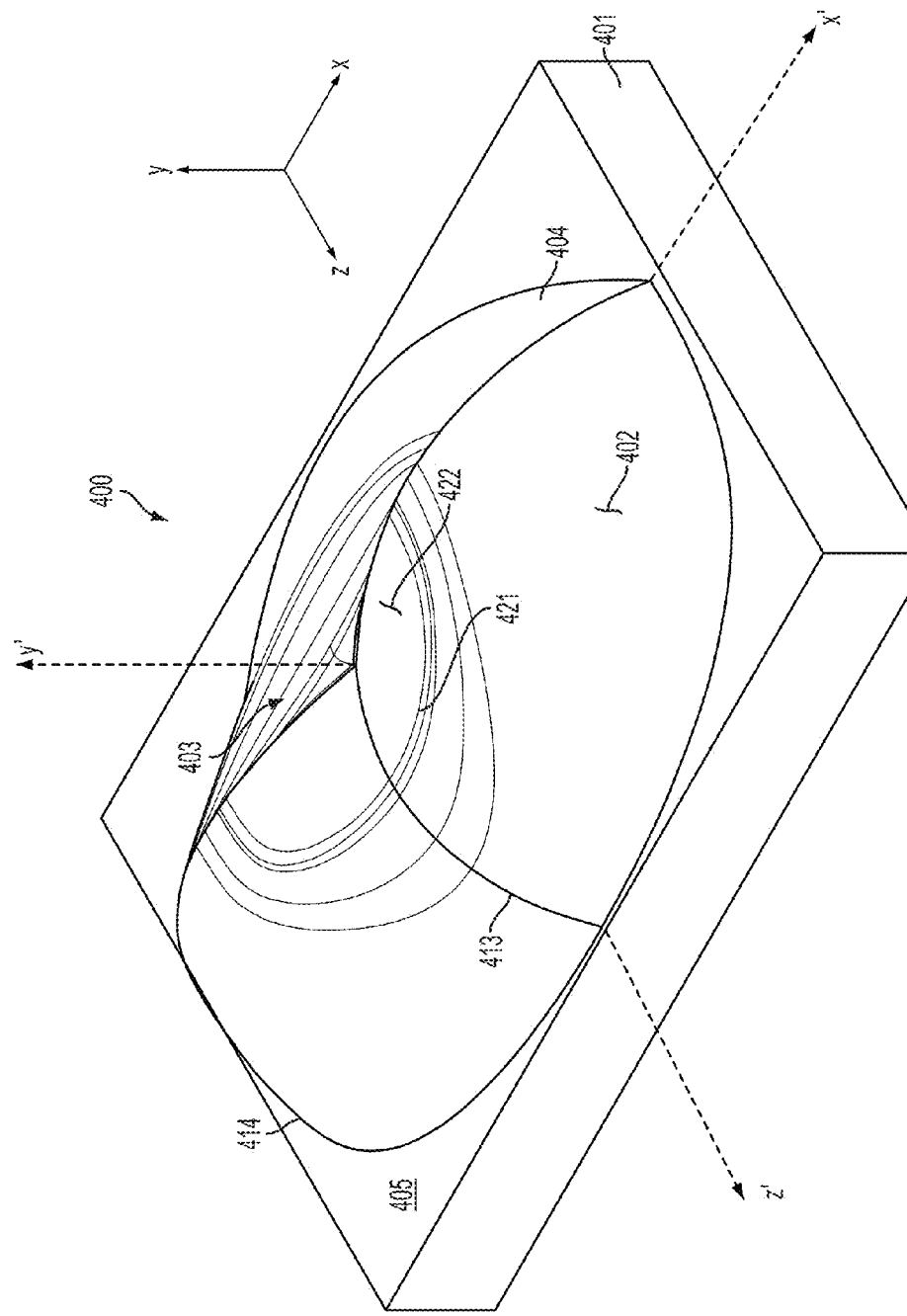
FIG. 54 depicts a perspective view of a light directing apparatus, according to an example embodiment.
Figure 55:
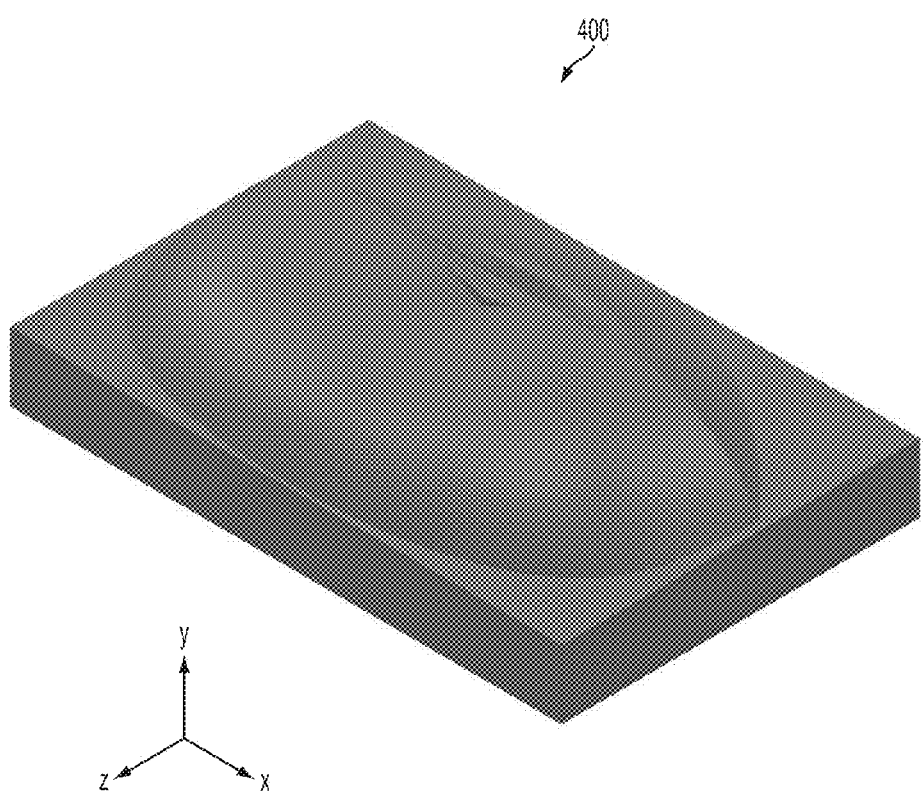
FIG. 55 depicts a perspective view of a light directing apparatus, according to an example embodiment.

Turning to FIGS. 54-55, a perspective view of an additional alternative light directing apparatus 400 is depicted. The light directing apparatus 400 may be formed of a material suitable for light transmission, for example, optically clear acrylic, silicone, or other suitable material. As illustrated, the apparatus 400 includes a base or optical substrate 401. The apparatus 400 further includes a compound lens outer surface 402 on a first side 405 of the optical substrate 401, the first side 405 of the optical substrate 401 defining a main plane X'-Z'. The compound lens outer surface 402 may be relatively smooth or may include at least a textured portion, for example through sand-blasting, etching, coating, or similarly texturizing a portion or portions of the compound lens surface 202. The textured surface or portion of the surface may reduce color separation and may be configured to blend or mix light for a more uniform color output profile. For example, a grain or coarseness of the texture may be adjusted to promote a desired color-blending profile for any desired application.

The apparatus 400 may further include a first protrusion 403 on the first side 405 of the optical substrate 401, and a second protrusion 404 on the first side 405 of the optical substrate 401. The first protrusion 403 is proximate to both the second protrusion 404 and the compound lens outer surface 402, and is disposed between the second protrusion 404 and the compound lens outer surface 402.

As shown, a centerline or valley 413 extends from a first edge 414 of the compound lens outer surface 402, to a point 412 on a second edge 420 of the compound lens outer surface 402. The compound lens outer surface has mirror image symmetry about the Y'-Z' plane (medial plane) containing the centerline 413. A region 422 which partially surrounds point 412 is defined by line 421 and is concave, or substantially concave in comparison to the rest of the compound lens outer surface 402. The concavity of region 422 has mirror image symmetry about the medial Y'-Z' plane. The reference axis Y' is orthogonal to the main plane X'-Z', and may be central to the body of the apparatus 400, and collinear with a central axis of a LED mated thereto.

Figure 56:
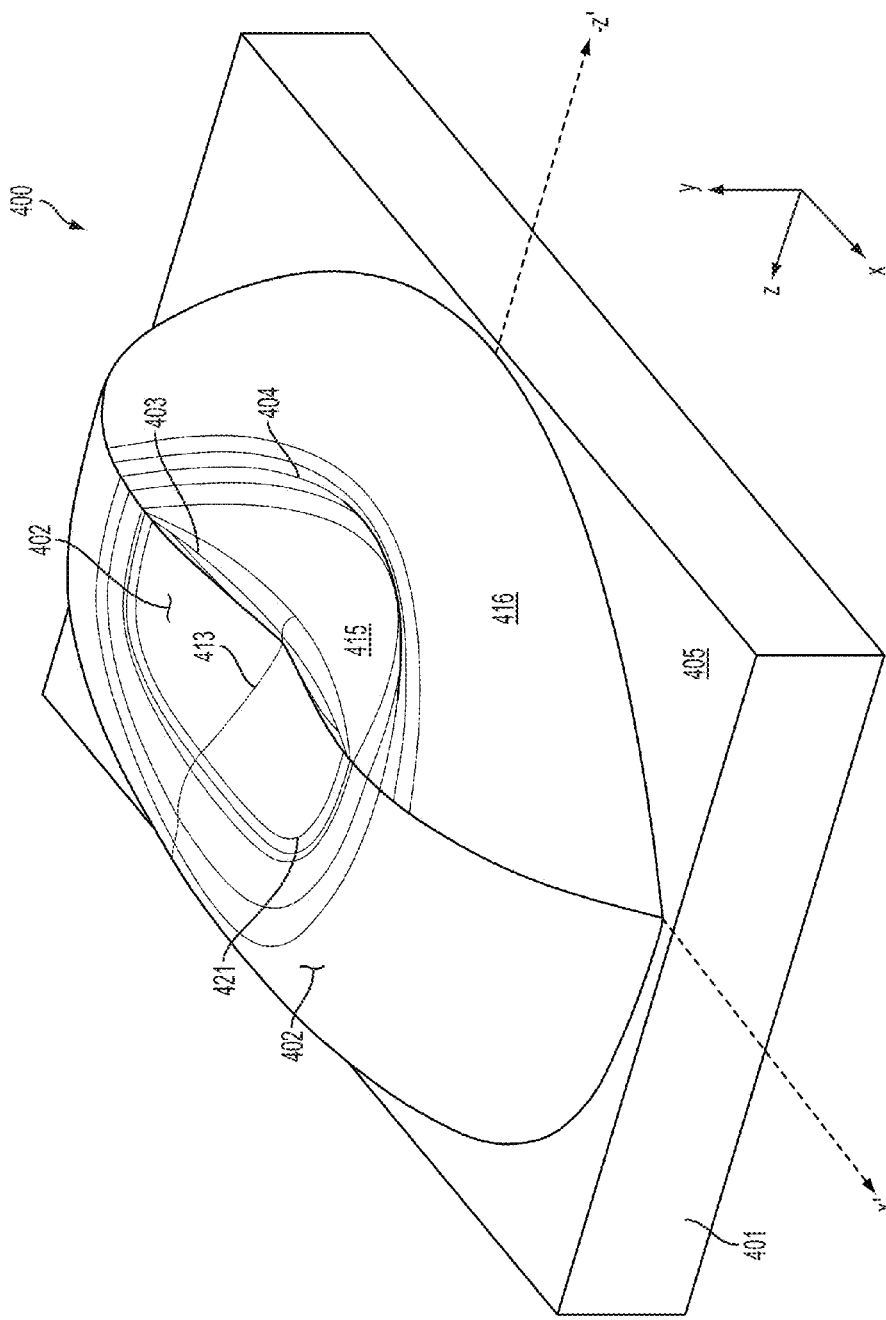
FIG. 56 depicts a perspective view of a light directing apparatus, according to an example embodiment.
Figure 57:
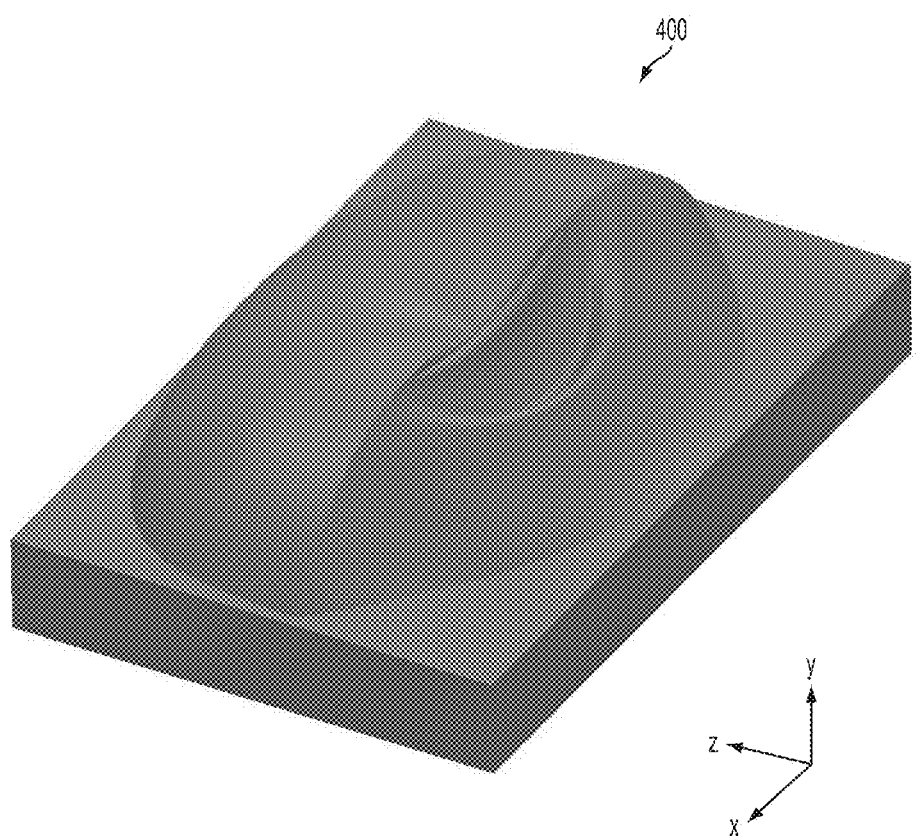
FIG. 57 depicts a perspective view of a light directing apparatus, according to an example embodiment.

FIGS. 56-57 depict an alternate perspective view of light directing apparatus 400. As illustrated, the first protrusion 403 includes a generally curved surface 415, which is proximate an apex or "tip" of the first protrusion 403 and the second protrusion 404 of the apparatus 400. As further illustrated, the second protrusion 404 includes a generally curved surface 416 proximate an apex or "tips" of the second protrusion 404 and the first side 405 of the substrate 401.

According to an example embodiment, one or more of surfaces 415 and/or 416 may be textured, for example, to aid in increasing light dispersion uniformity through sand-blasting, etching, coating, or otherwise texturizing respective surfaces. Furthermore, a grain or coarseness of the texture may be adjusted to promote a desired lighting profile for any desired application.

Figure 58:
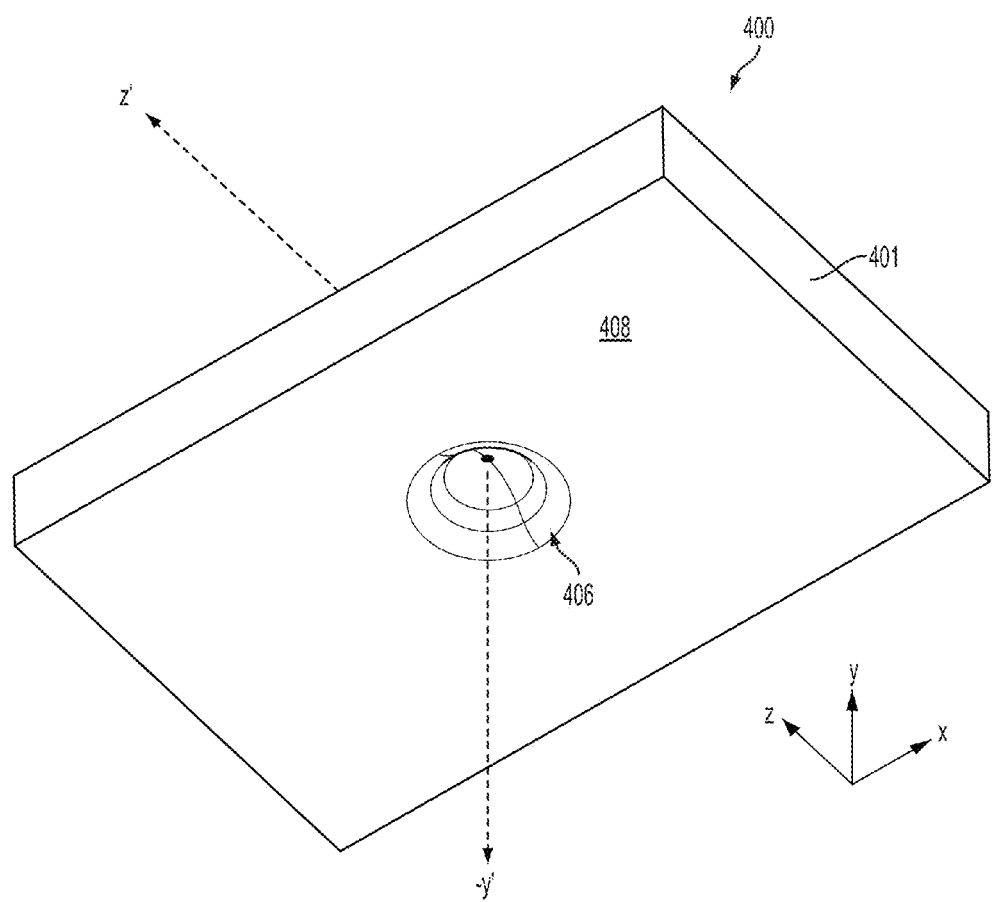
FIG. 58 depicts a perspective view of a light directing apparatus, according to an example embodiment.

FIG. 58 depicts an alternate perspective view of light directing apparatus 400. As shown, the light directing apparatus 400 includes an LED light-receiving portion 406 arranged on a second side 408 of the optical substrate 401. In an embodiment, the light-receiving portion 406 forms a recess in the second side 408 of the optical substrate 401 that receives an LED, thereby forming a mating portion for the LED. The light-receiving portion 406 may be generally hemispherical and rotationally symmetric about the central axis Y'. The light-receiving portion 406 may be disposed to receive an LED or other solid state light source. A surface of the light-receiving portion 406 may be textured (e.g., through sand-blasting, acid-etching, coating, or any other means of texturing) to reduce an interior halo of light emitted from a light source. For example, the light source is an LED or a semiconductor light source, and the surface of the light-receiving portion 406 is textured to reduce an interior halo of the LED. Furthermore, another portion or portions of the second side 408 may additionally/alternatively be textured to aid in reducing halo and/or promote better color-blending.

As described above with reference to FIG. 54-58, according to at least one example embodiment, a light directing apparatus 400 includes an optical substrate 401, a compound lens outer surface 402 on a first side of the optical substrate, a first protrusion 403 on a second portion of the first side of the optical substrate proximate the compound lens outer surface, and a second protrusion 404 on the second portion of the optical substrate proximate the first protrusion.

To better understand these and other features and functions of the light directing apparatus 400, detailed illustrations are provided in FIGS. 59-69. All illustrations are presented with coordinate axes matched with the particular orientation of the apparatus 400 illustrated in each figure.

Figure 59:
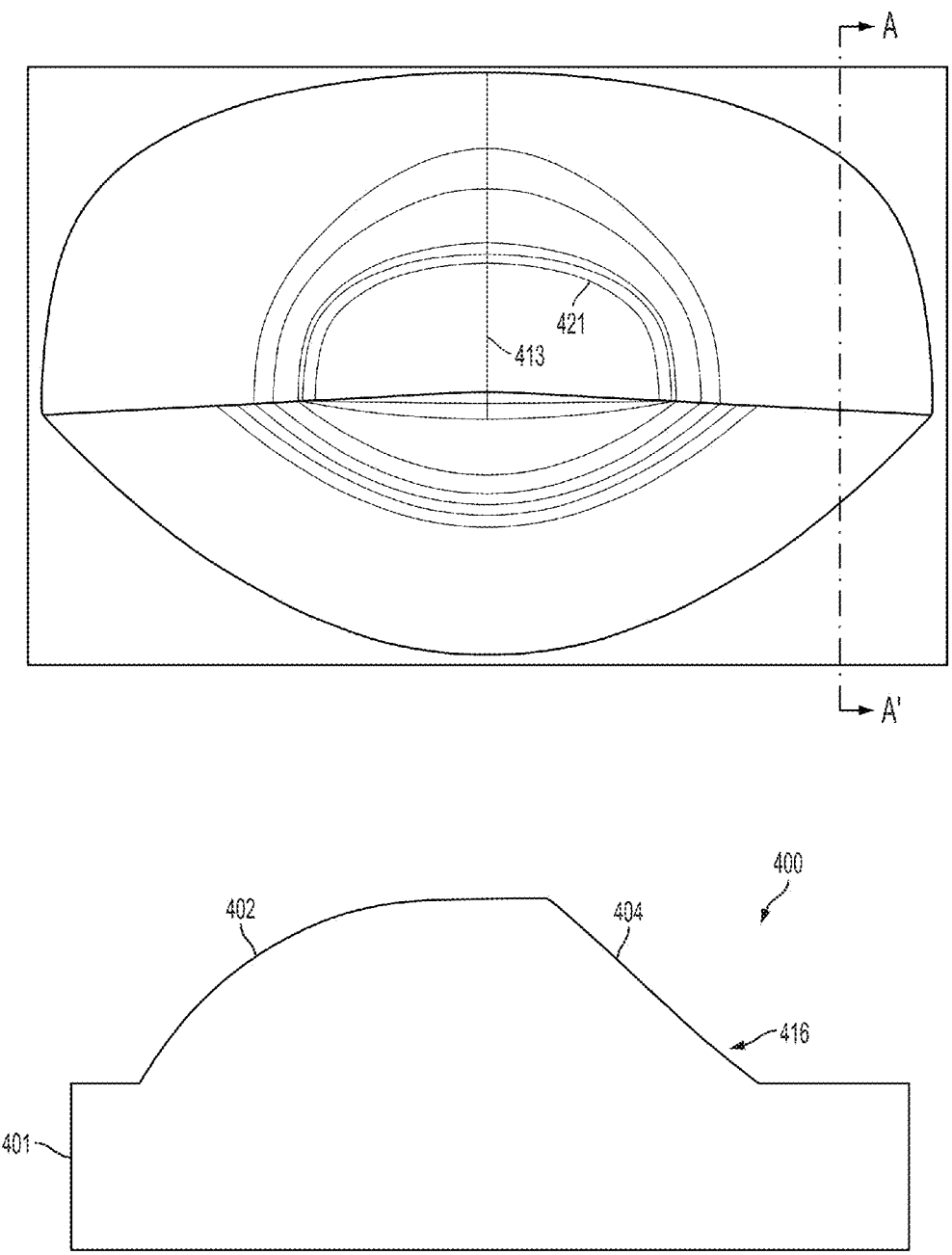
FIG. 59 depicts a planar section of a light directing apparatus, according to an example embodiment.

FIG. 59 depicts a planar section of light directing apparatus 400, taken along line A-A'. The line A-A' is parallel to centerline 413. As illustrated, the compound lens outer surface is relatively convex along line A-A'.

Figure 60:
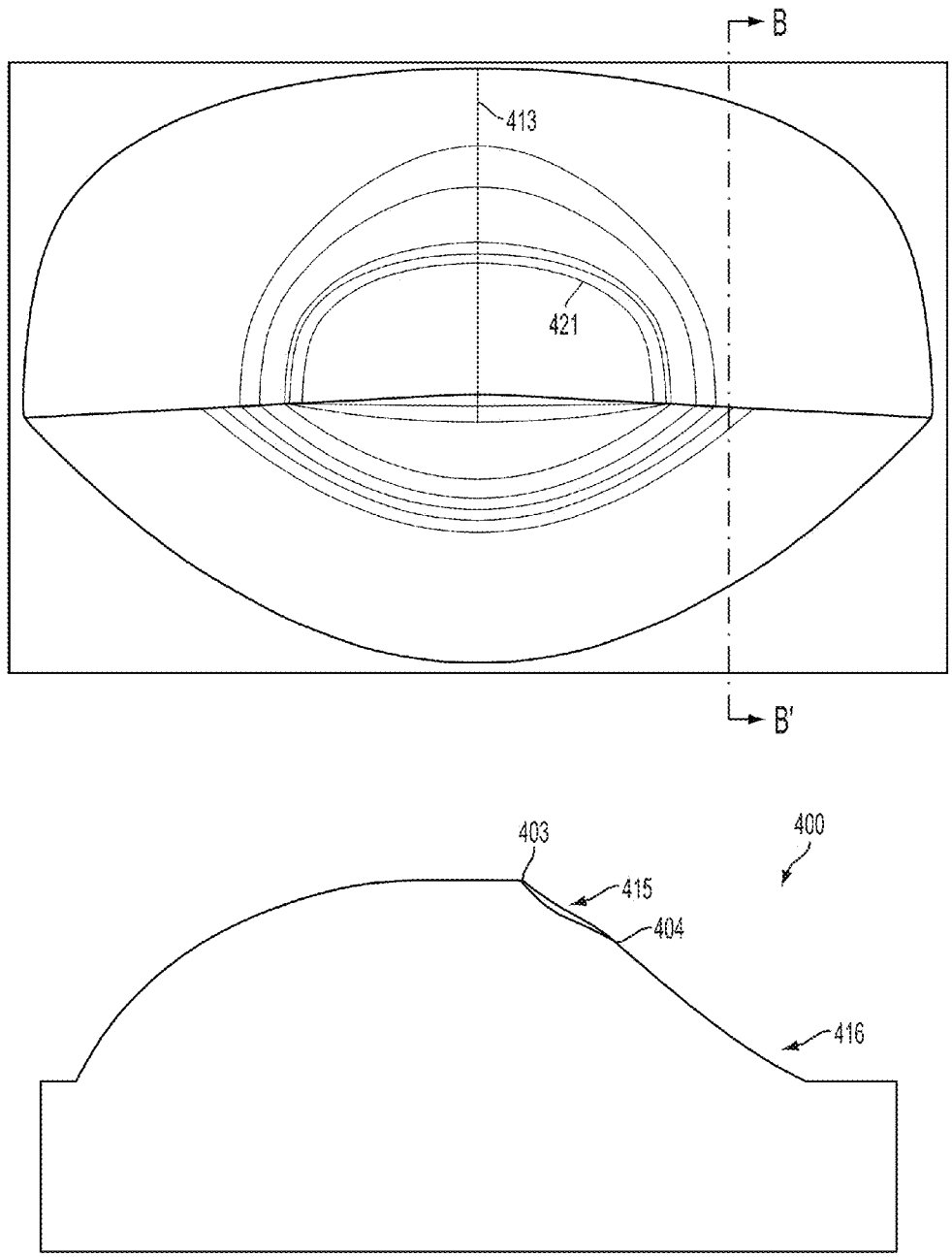
FIG. 60 depicts a planar section of a light directing apparatus, according to an example embodiment.

FIG. 60 depicts an additional planar section of light directing apparatus 400, taken along line B-B'. The line B-B' is parallel centerline 413. As illustrated, the compound lens outer surface is relatively convex along line B-B'. Furthermore, the relatively sharp, convex curved nature of surface 415 along line B-B' is apparent.

Figure 61:
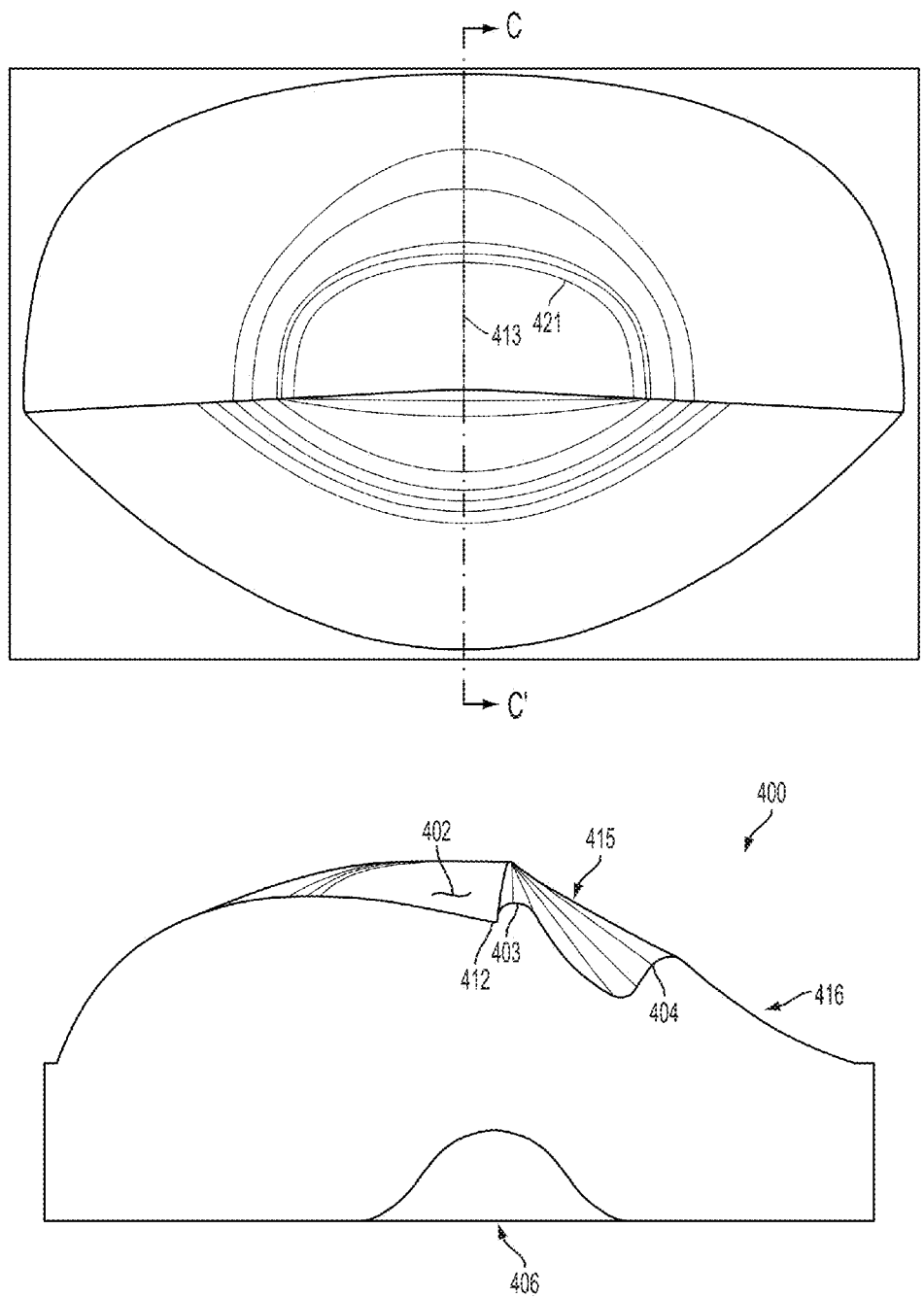
FIG. 61 depicts a planar section of a light directing apparatus, according to an example embodiment.

FIG. 61 depicts a planar section of light directing apparatus 400, taken along line C-C'. Line C-C' is collinear with centerline 413. As illustrated, portion 422 is generally concave, surface 415 is of a sharp, convex curved shape extending between the first protrusion 403 and the second protrusion 404, and surface 416 is of a generally convex shape extending from the second protrusion 404 to the first surface 405 of the apparatus 400.

Figure 62:
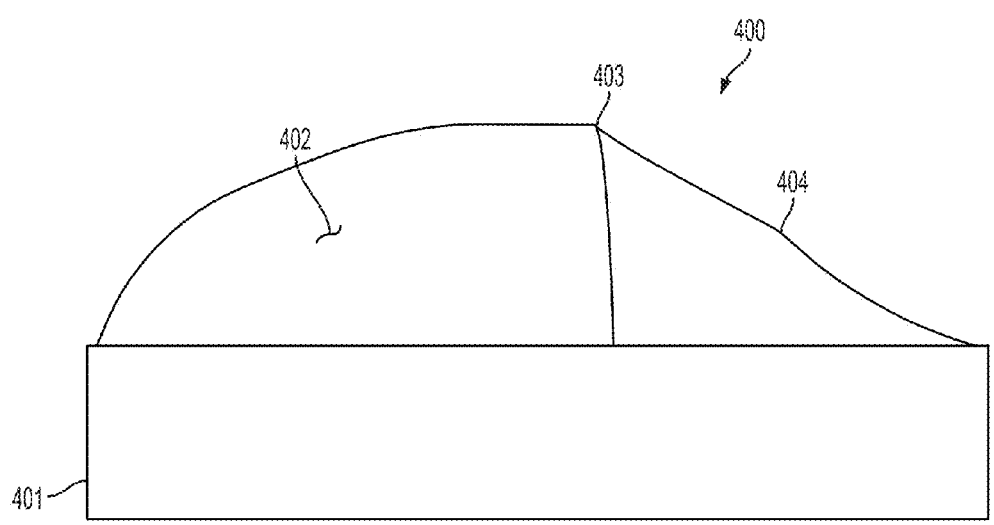
FIG. 62 depicts a planar section of a light directing apparatus, according to an example embodiment.

FIG. 62 depicts a side view of light directing apparatus 400.

Figure 63:
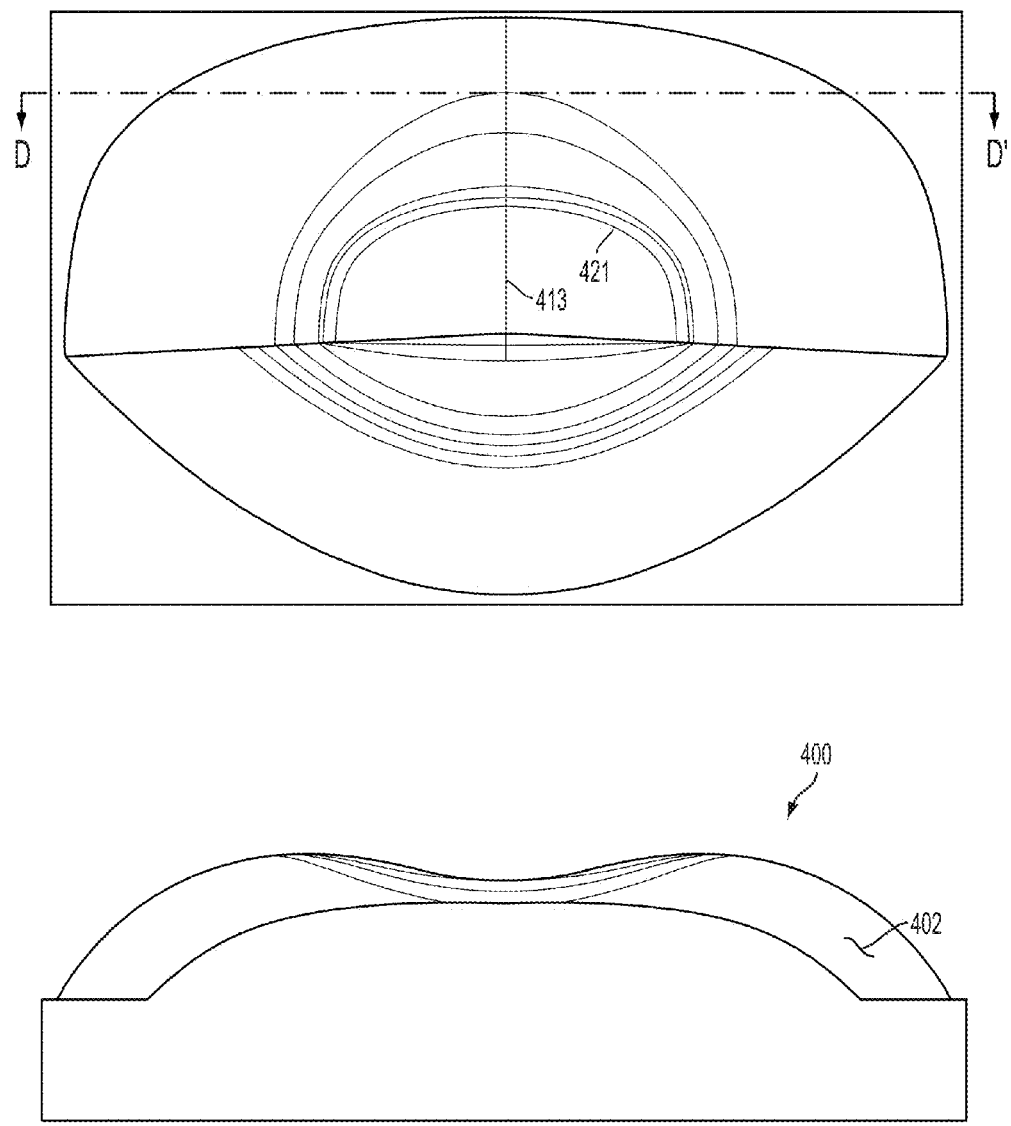
FIG. 63 depicts a planar section of a light directing apparatus, according to an example embodiment.

FIG. 63 depicts an additional planar section of light directing apparatus 400, taken along line D-D'. Line D-D' is perpendicular to centerline 413. As shown, the compound lens outer surface 402 is generally convex at line D-D'.

Figure 64:
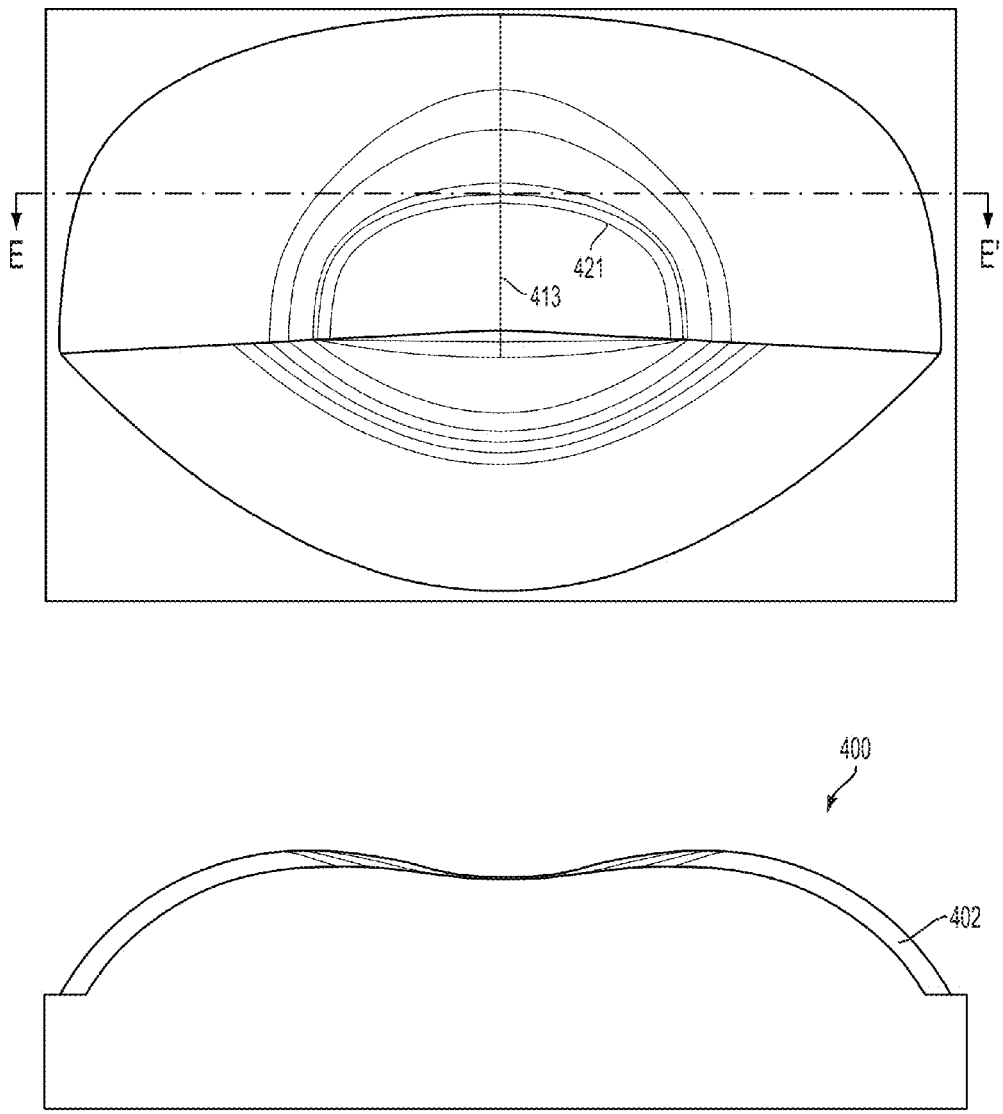
FIG. 64 depicts a planar section of a light directing apparatus, according to an example embodiment.

FIG. 64 depicts an additional planar section of light directing apparatus 400, taken along line E-E'. Line E-E' is perpendicular to centerline 413, and closer to the central axis Y' than is line D-D'. As shown, the compound lens outer surface 402 is substantially symmetrical about centerline 413.

Figure 65:
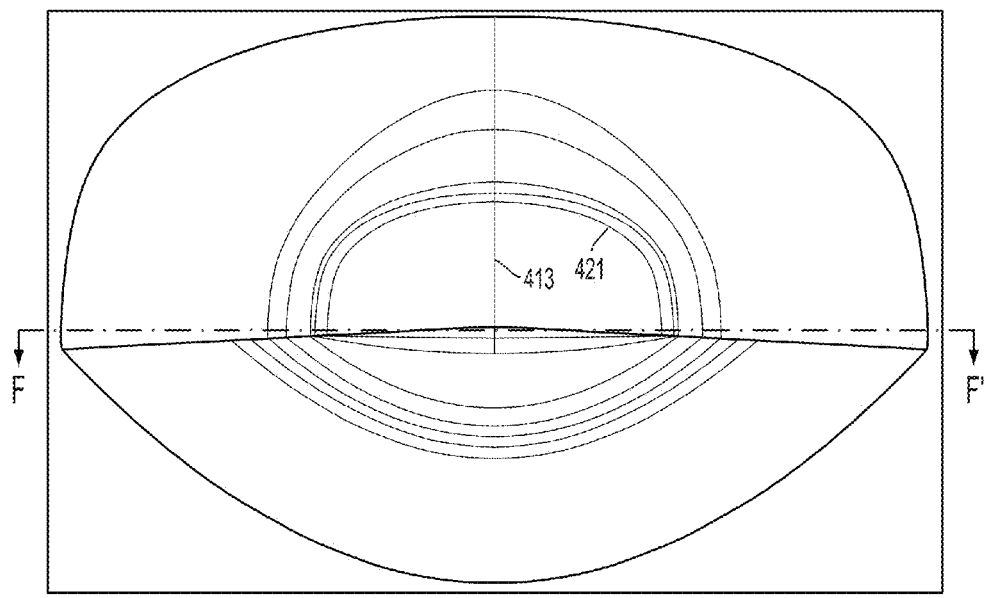
FIG. 65 depicts a planar section of a light directing apparatus, according to an example embodiment.
Figure 65:
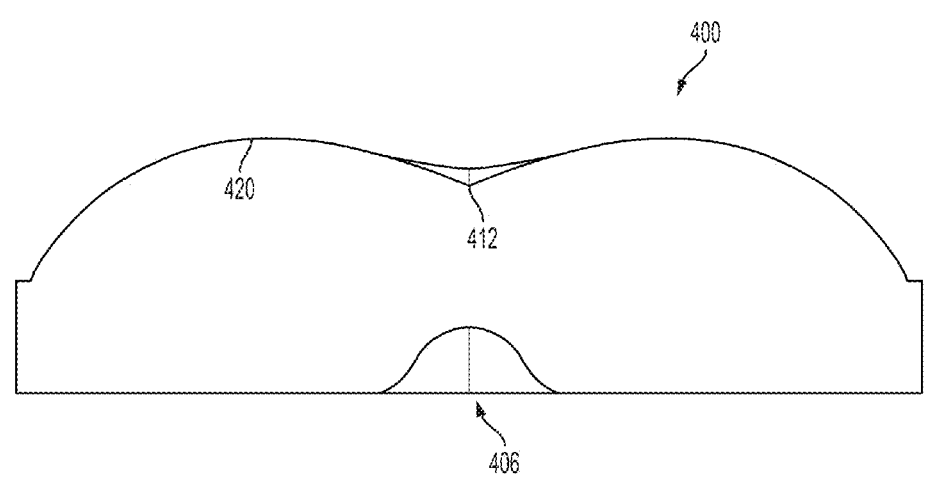

FIG. 65 depicts an additional planar section of light directing apparatus 400, taken along line F-F'. Line F-F' is perpendicular to centerline 413, and intersects the central axis Y'. As shown, the second edge 420 of the compound lens outer surface 402 forms a point 412 at centerline 413.

Figure 66:
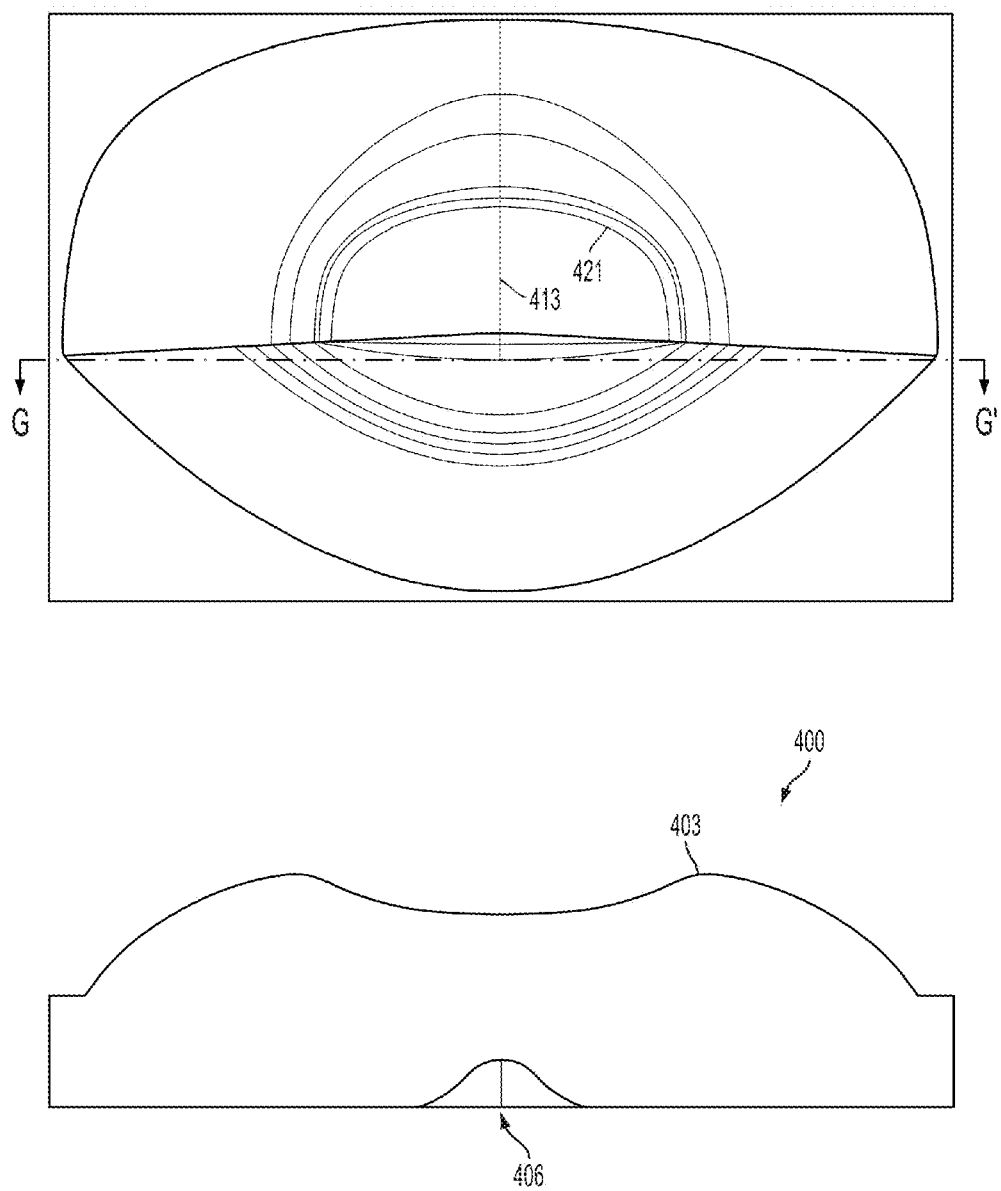
FIG. 66 depicts a planar section of a light directing apparatus, according to an example embodiment.

FIG. 66 depicts an additional planar section of light directing apparatus 400, taken along line G-G'. The line G-G' is perpendicular to centerline 413, and passes through the first protrusion 403 once, and passes through the second protrusion 404 twice at two separate apexes or "peaks," showing the curved natured of the second protrusion 404.

Figure 67:
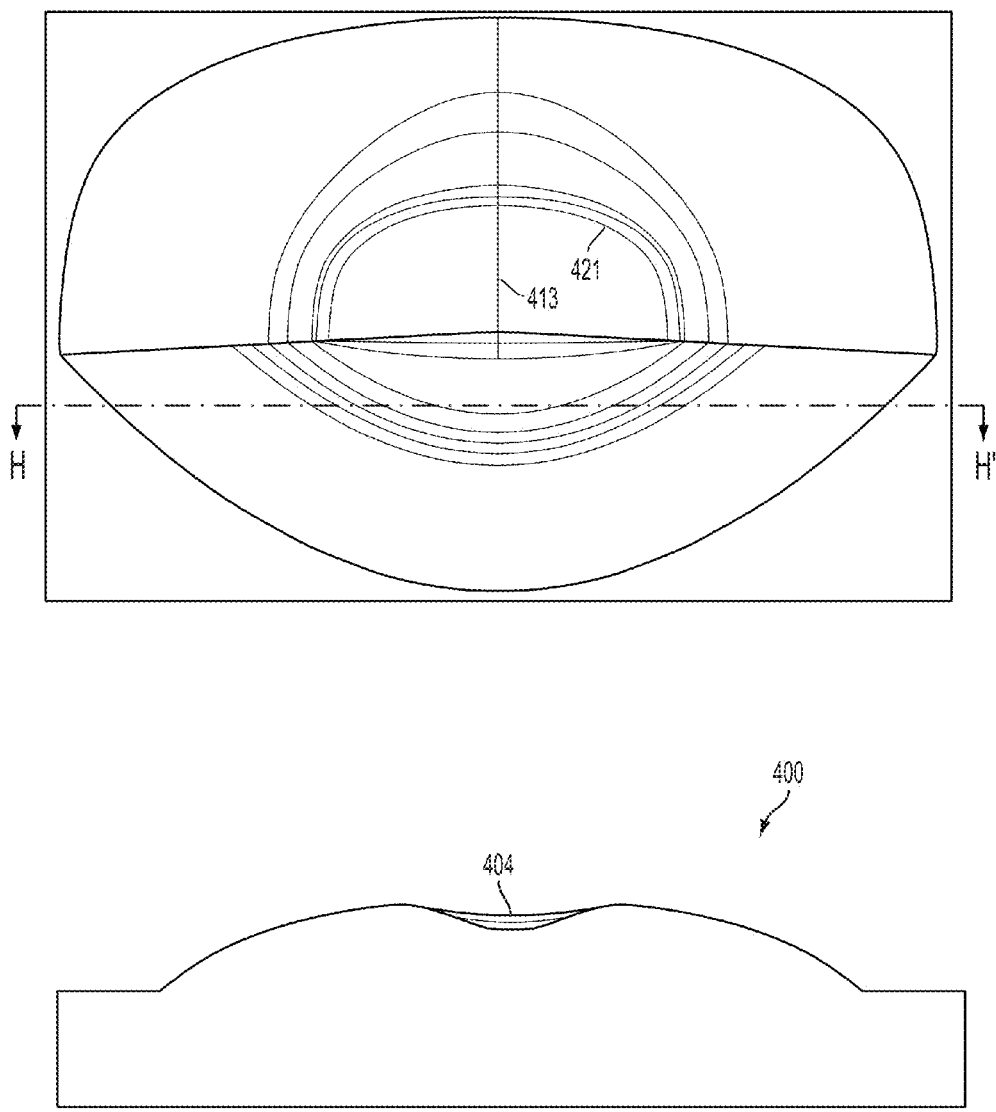
FIG. 67 depicts a planar section of a light directing apparatus, according to an example embodiment.

FIG. 67 depicts an additional planar section of light directing apparatus 400, taken along line H-H'. The line H-H' is perpendicular to centerline 413, and passes through the second protrusion 404 twice at two separate apexes or "peaks," showing the curved natured of the second protrusion 404.

Figure 68:
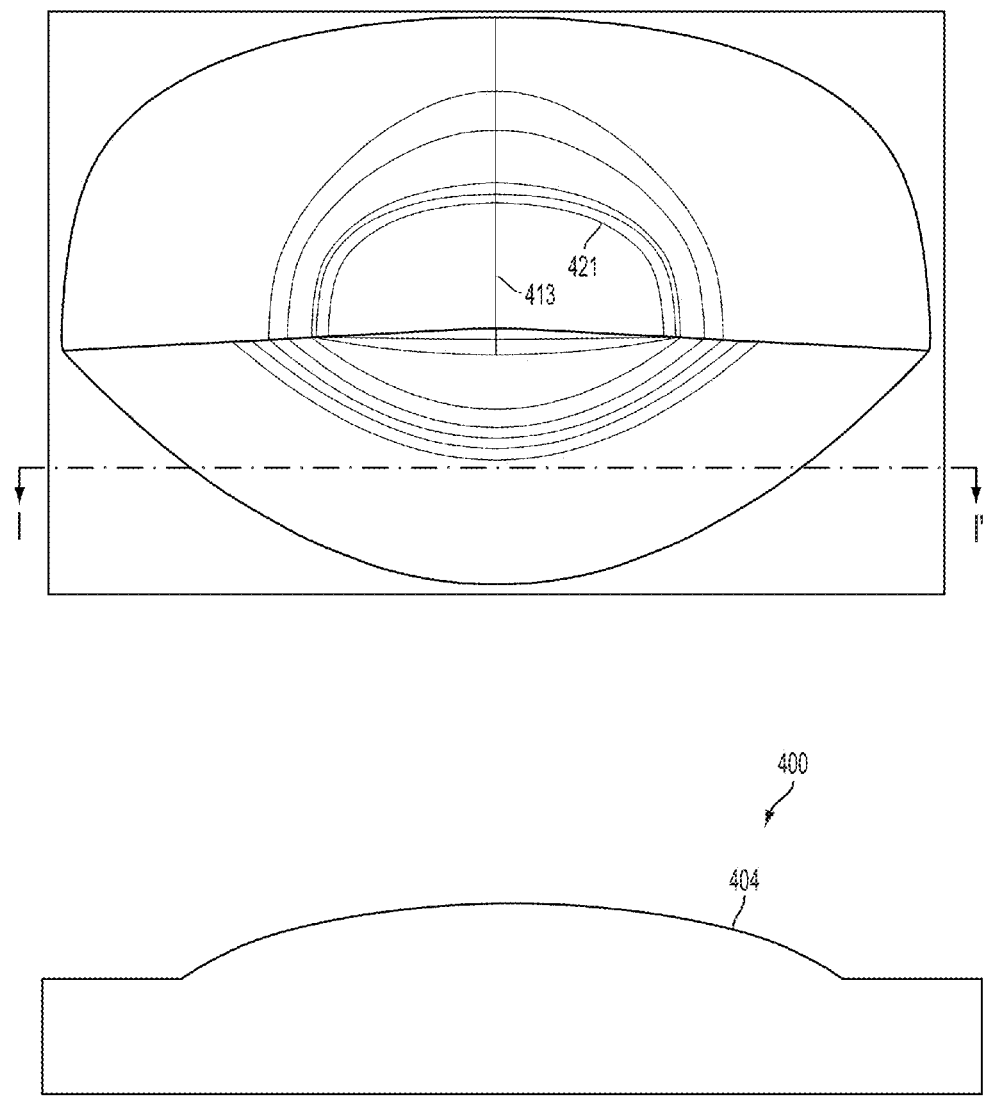
FIG. 68 depicts a planar section of a light directing apparatus, according to an example embodiment.

FIG. 68 depicts an additional planar section of light directing apparatus 400, taken along line I-I'. The line I-I' is perpendicular to centerline 413, and passes through the second protrusion 404 at a single point, showing the curved natured of the second protrusion 404 and the curved nature of the surface 416.

Figure 69:
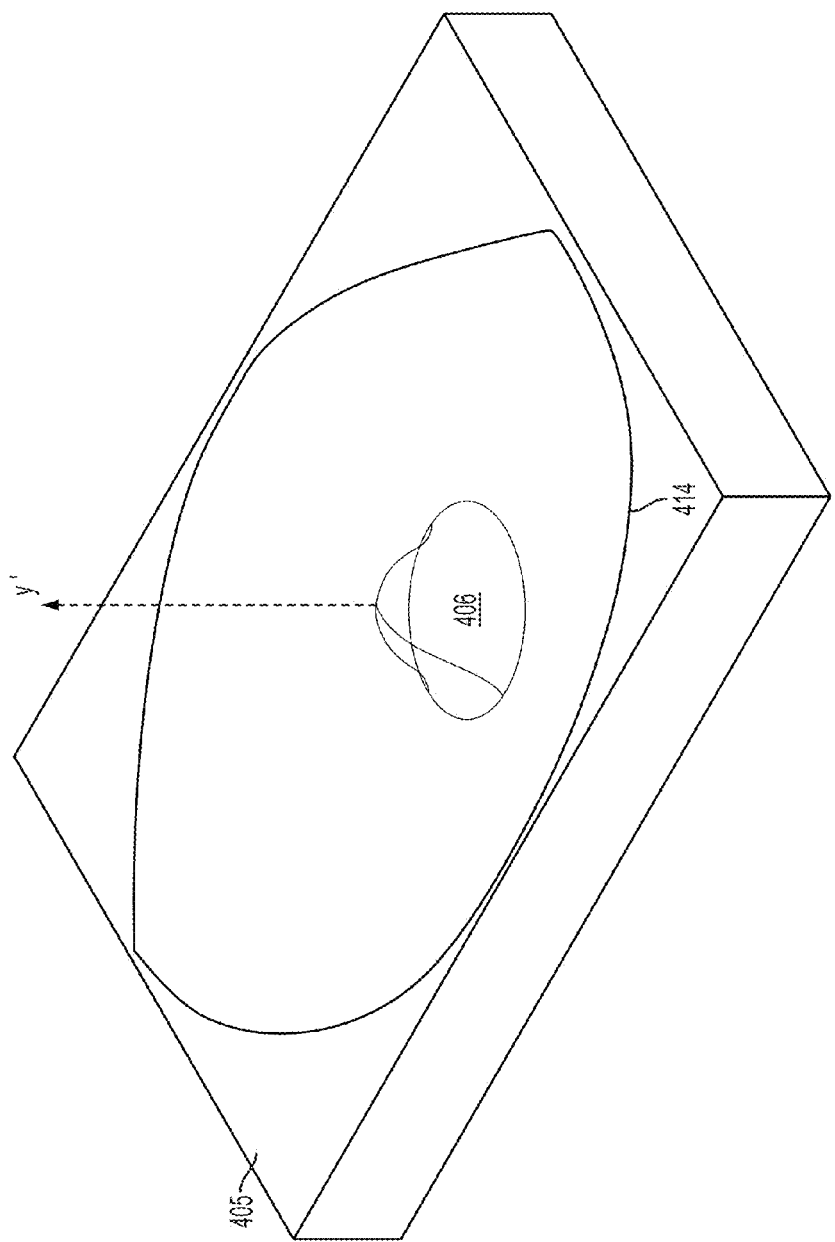
FIG. 69 depicts a perspective view of an interior of a light directing apparatus, according to an example embodiment.

FIG. 69 depicts a perspective view of an interior of light directing apparatus 400. As shown, the light-receiving portion 406 is rotationally symmetrical about central axis Y'.

Although structurally unique, it should be appreciated that the combination of compound lens outer surface 402 and protrusions 403-404 provide for light redirecting properties somewhat similar to those provide by apparatuses 100, 200, and 300. For example, the protrusions 403 and 404 redirect light emitted from a light source generally towards the street side of the apparatus 400.

With regard to light-redirection, rays are reflected internally (i.e., on surfaces internal to the lens 400) towards the street side. For example, as a ray of incident light reacts with an air-surface interface, this ray of incident light is reflected towards the street side of the lens 400 through substantially total internal reflection achieved through a combination of the first and second protrusions 403, 404, similar to that described above with reference to FIG. 18. In this manner, the combination of internal reflections of incident light redirects light emitted from a light source towards the street side of lens 400.

Further, although not illustrated for the sake of clarity, it is appreciated that light not internally reflected tends to be refracted towards the street side as well to be reflected through interaction with surfaces 415 and 416 associated with the first and second protrusions 403 and 404, respectively.

Therefore, as described above, it is apparent that light emitted from a light source substantially coupled to the lens 400 interacts with the first and second protrusions 403, 404 such that this light is redirected towards a street side of the lens 400 through substantially total internal reflection, and partially through refraction. Additionally, it should be appreciated that refraction of light at the compound lens outer surface 402 on the first portion of the lens 400 also occurs such that this light is redirected towards the street side of the lens 400.

Figure 70:
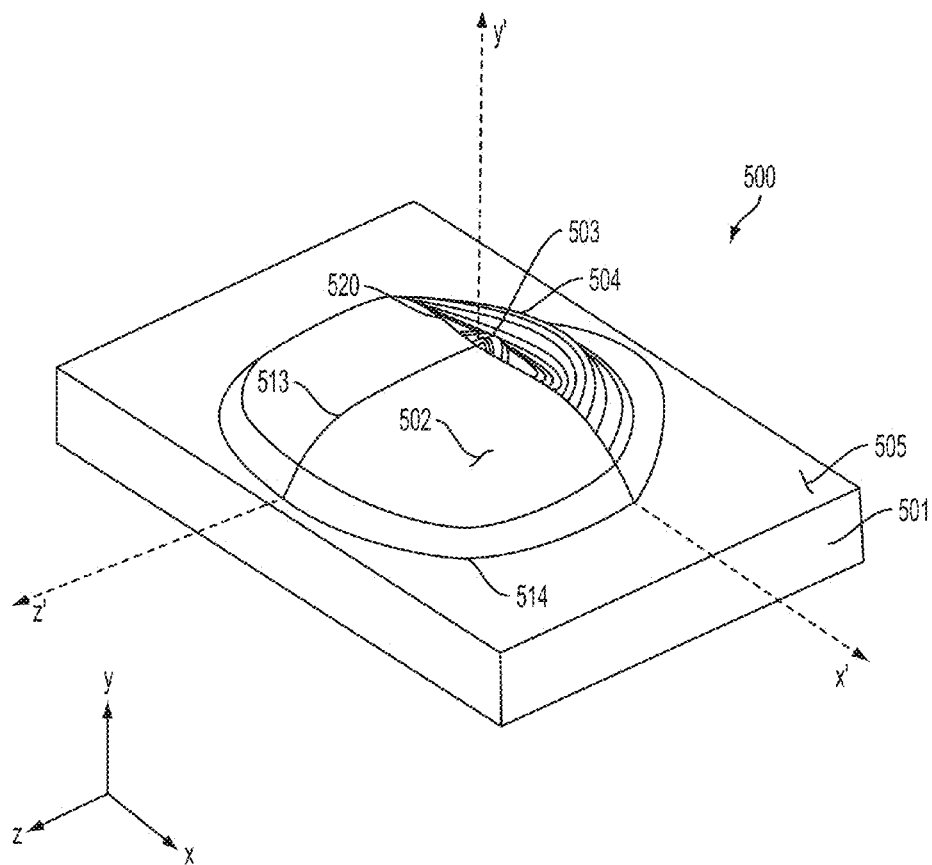
FIG. 70 depicts a perspective view of a light directing apparatus, according to an example embodiment.
Figure 71:
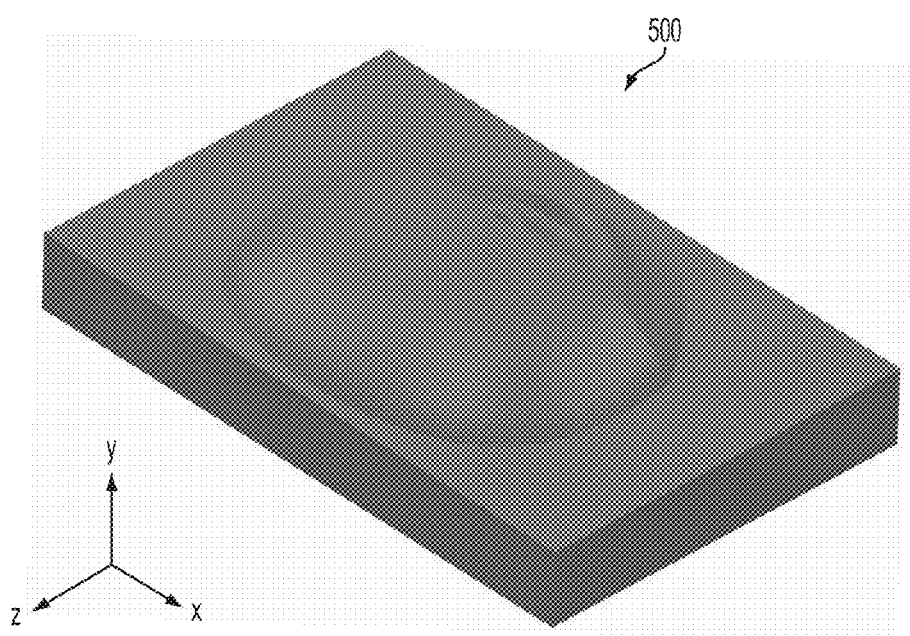
FIG. 71 depicts a perspective view of a light directing apparatus, according to an example embodiment.

Turning to FIGS. 70-71, a perspective view of an additional alternative light directing apparatus 500 is depicted. The light directing apparatus 500 may be formed of a material suitable for light transmission, for example, optically clear acrylic, silicone, or other suitable material. As illustrated, the apparatus 500 includes a base or optical substrate 501. The apparatus 500 further includes a compound outer lens outer surface 502 on a first side 505 of the optical substrate 501, the first side 505 of the optical substrate 501 defining a main plane X'-Z'. The compound outer lens outer surface 502 may be relatively smooth or may include at least a textured portion, for example through sand-blasting, etching, coating, or similarly texturizing a portion or portions of the compound lens surface 502. The textured surface or portion of the surface may reduce color separation and may be configured to blend or mix light for a more uniform color output profile. For example, a grain or coarseness of the texture may be adjusted to promote a desired color-blending profile for any desired application.

The apparatus 500 may further include a first protrusion 503 on the first side 505 of the optical substrate 501, and a second protrusion 504 on the first side 505 of the optical substrate 501. The first protrusion 503 is proximate to both the second protrusion 504 and the compound lens outer surface 502, and is disposed between the second protrusion 504 and the compound lens outer surface 502.

As shown, a centerline or valley 513 extends from a first edge 514 of the compound lens outer surface 502, to a second edge 520 of the compound lens outer surface 502. The compound lens outer surface has mirror image symmetry about the Y'-Z' plane (medial plane) containing the centerline 513. The reference axis Y' is orthogonal to the main plane X'-Z', and may be central to the body of the apparatus 500, and collinear with a central axis of an LED mated thereto.

Figure 72:
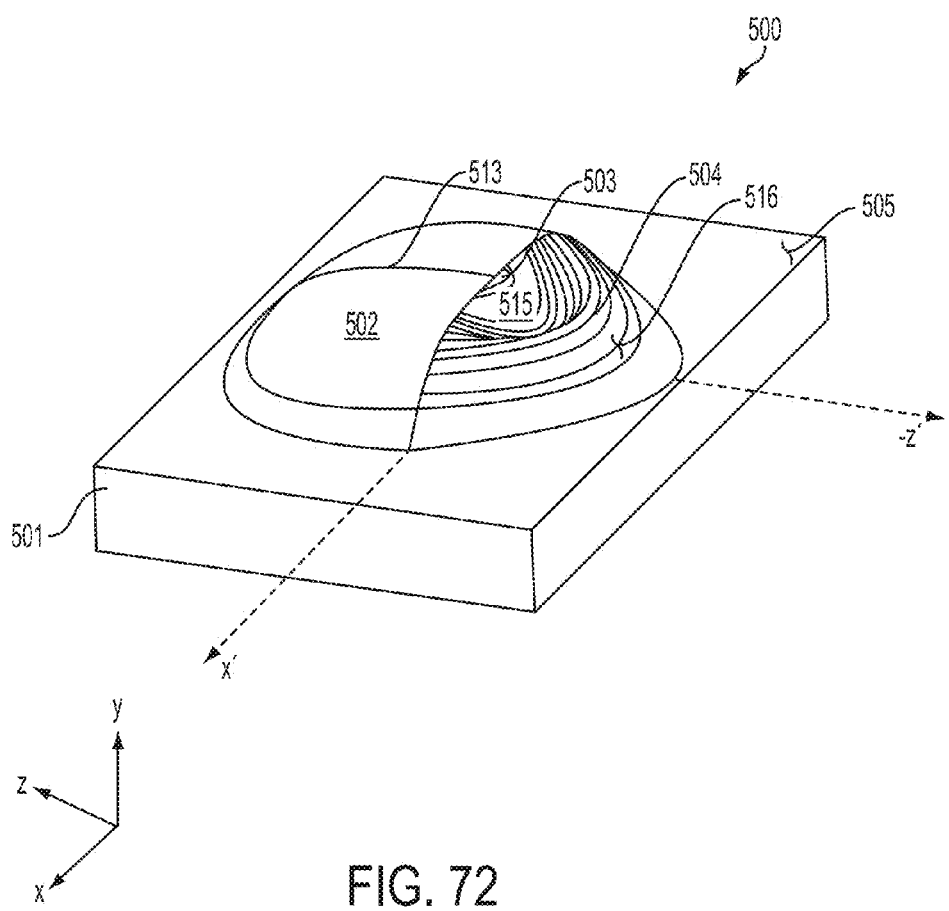
FIG. 72 depicts a perspective view of a light directing apparatus, according to an example embodiment.
Figure 73:
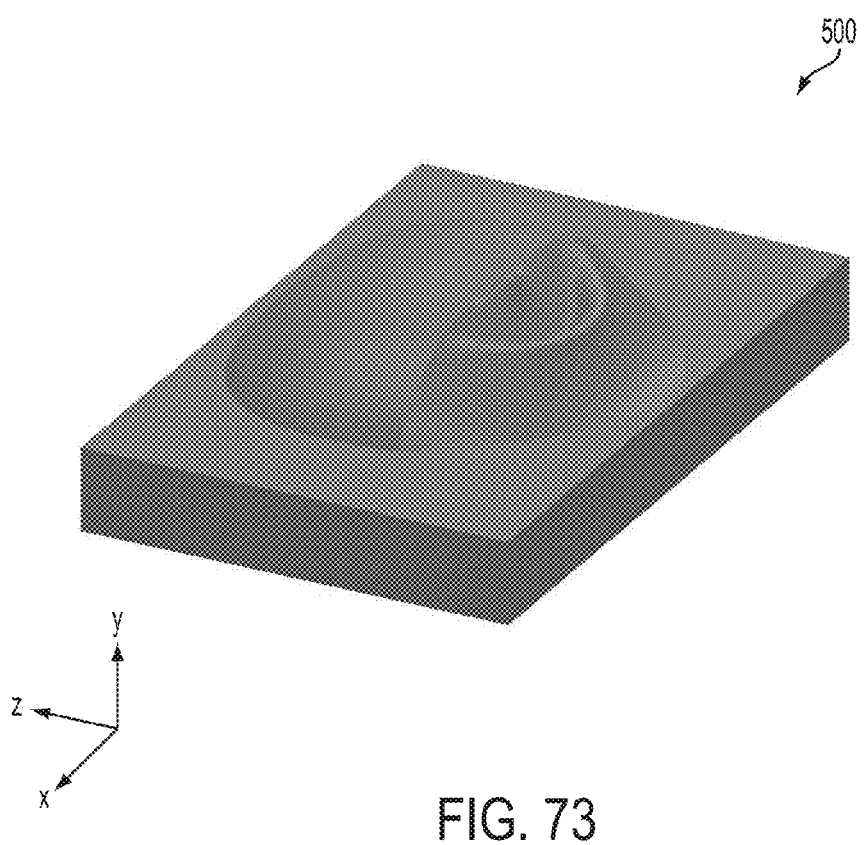
FIG. 73 depicts a perspective view of a light directing apparatus, according to an example embodiment.

FIGS. 72-73 depict an alternate perspective view of light directing apparatus 500. As illustrated, the first protrusion 503 includes a generally curved surface 515, which is proximate an apex or "tip" of the first protrusion 503 and the second protrusion 504 of the apparatus 500. As further illustrated, the second protrusion 504 includes a generally curved surface 516 proximate an apex or "tip" of the second protrusion 504 and the first side 505 of the substrate 501.

According to an example embodiment, one or more of surfaces 515 and/or 516 may be textured, for example, to aid in increasing light dispersion uniformity through sand-blasting, etching, coating, or otherwise texturizing respective surfaces. Furthermore, a grain or coarseness of the texture may be adjusted to promote a desired lighting profile for any desired application.

Figure 74:
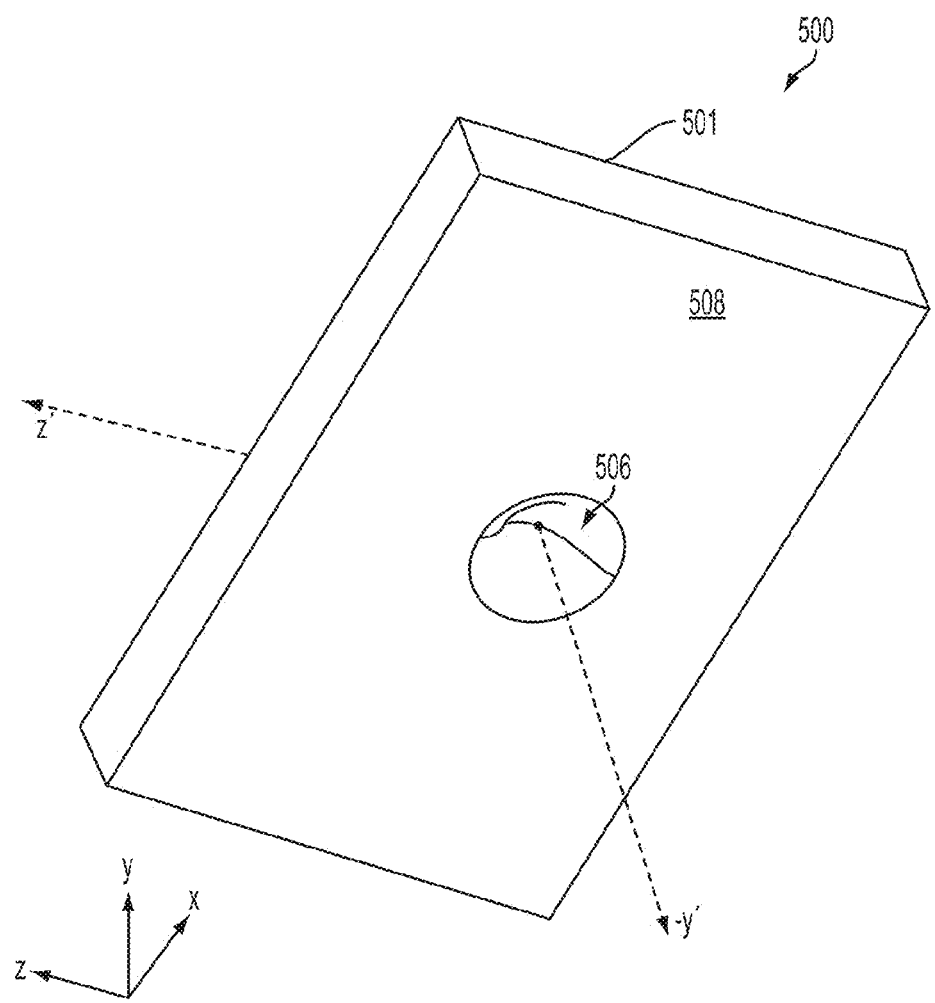
FIG. 74 depicts a perspective view of a light directing apparatus, according to an example embodiment.

FIG. 74 depicts an alternate perspective view of light directing apparatus 500. As shown, the light directing apparatus 500 includes an LED light-receiving portion 506 arranged on a second side 508 of the optical substrate 501. In an embodiment, the light-receiving portion 506 forms a recess in the second side 508 of the optical substrate 501 that receives an LED, thereby forming a mating portion for the LED. The light-receiving portion 506 may be generally hemispherical and rotationally symmetric about the central axis Y'. The light-receiving portion 506 may be disposed to receive an LED or other solid state light source. A surface of the light-receiving portion 506 may be textured (e.g., through sand-blasting, acid-etching, or any other means of texturing) to reduce an interior halo of light emitted from a light source. For example, the light source is an LED or a semiconductor light source, and the surface of the light-receiving portion 506 is textured to reduce an interior halo of the LED. Furthermore, another portion or portions of the second side 508 may additionally/alternatively be textured to aid in reducing halo and/or promote better color-blending.

As described above with reference to FIG. 70-74, according to at least one example embodiment, a light directing apparatus 500 includes an optical substrate 501, a compound lens outer surface 502 on a first side of the optical substrate, a first protrusion 503 on a second portion of the first side of the optical substrate proximate the compound lens outer surface, and a second protrusion 504 on the second portion of the optical substrate proximate the first protrusion.

To better understand these and other features and functions of the light directing apparatus 500, detailed illustrations are provided in FIGS. 75-86. All illustrations are presented with coordinate axes matched with the particular orientation of the apparatus 500 illustrated in each figure.

Figure 75:
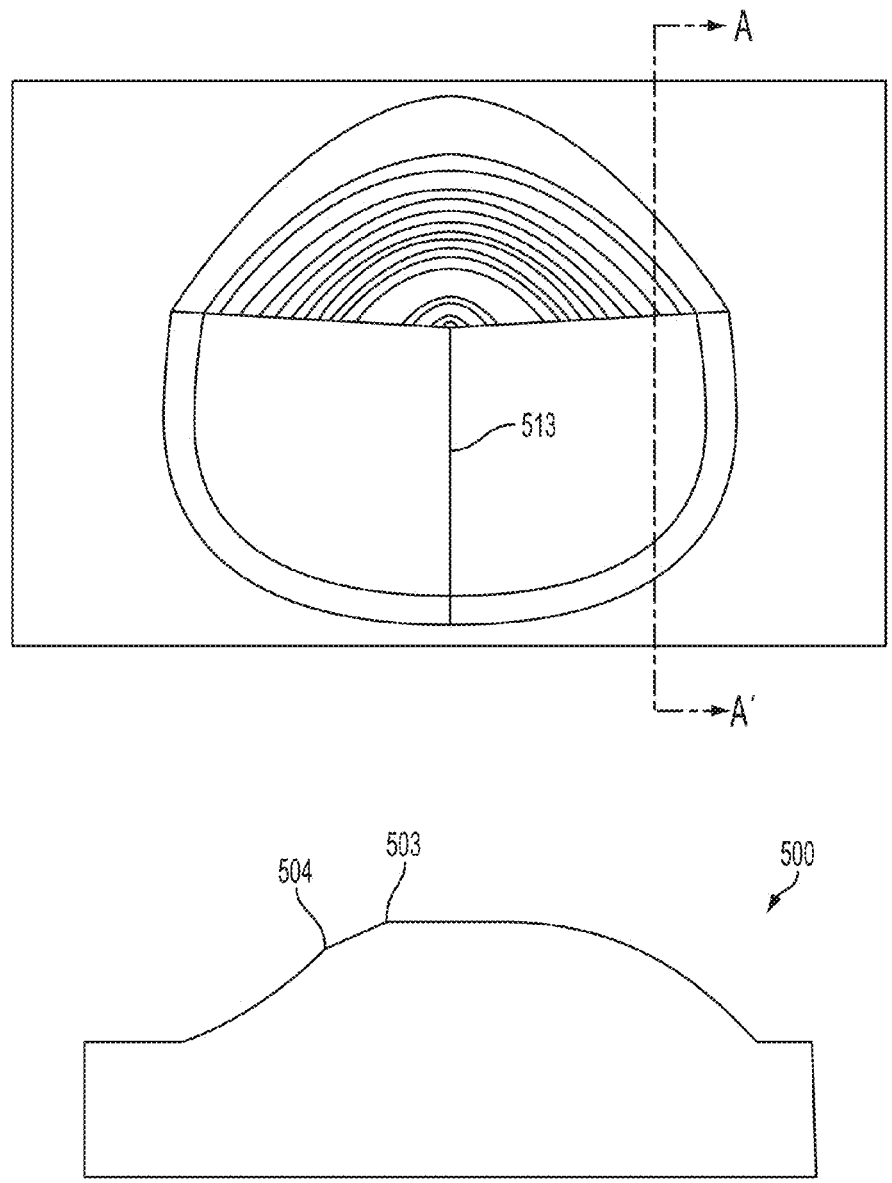
FIG. 75 depicts a planar section of a light directing apparatus, according to an example embodiment.

FIG. 75 depicts a planar section of light directing apparatus 500, taken along line A-A'. The line A-A' is parallel to centerline 513. As illustrated, the compound lens outer surface is relatively convex along line A-A'.

Figure 76:
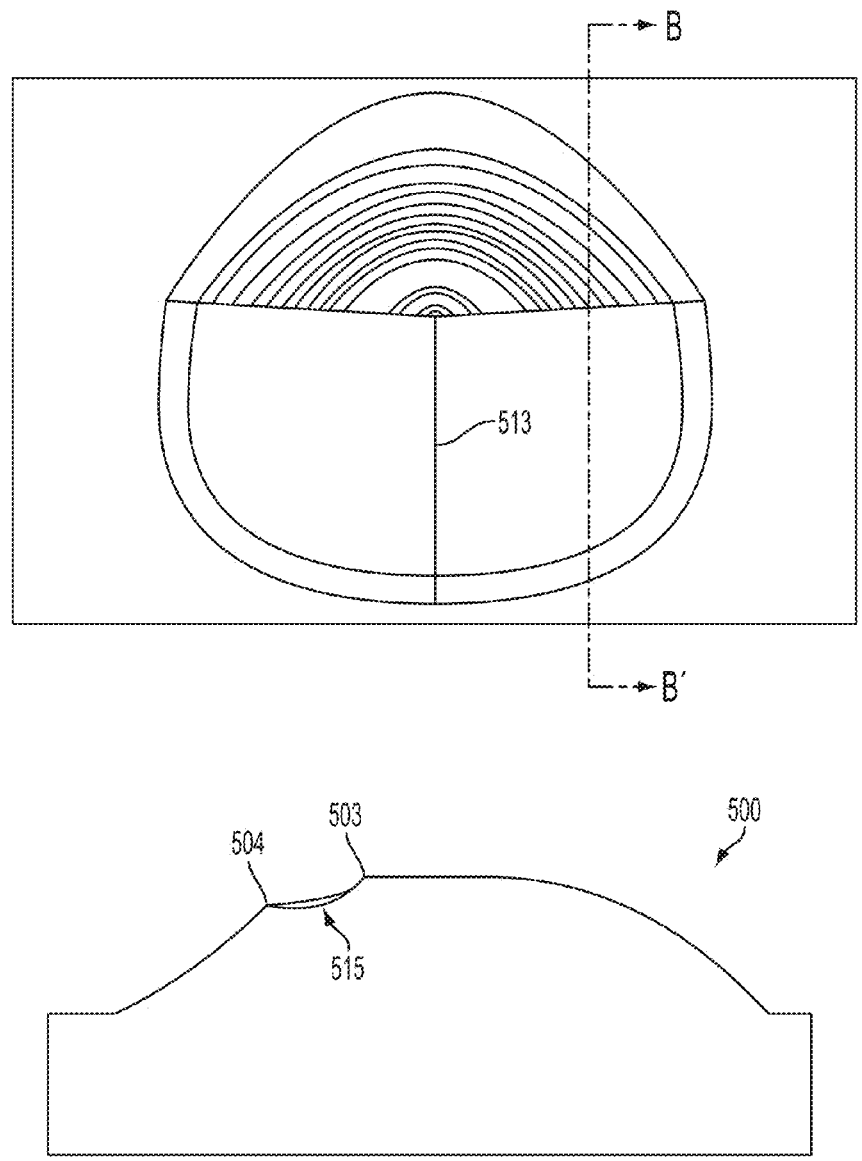
FIG. 76 depicts a planar section of a light directing apparatus, according to an example embodiment.

FIG. 76 depicts an additional planar section of light directing apparatus 500, taken along line B-B'. The line B-B' is parallel centerline 513. As illustrated, the compound lens outer surface is relatively convex along line B-B'. Furthermore, the relatively sharp, convex curved nature of surface 515 along line B-B' is apparent.

Figure 77:
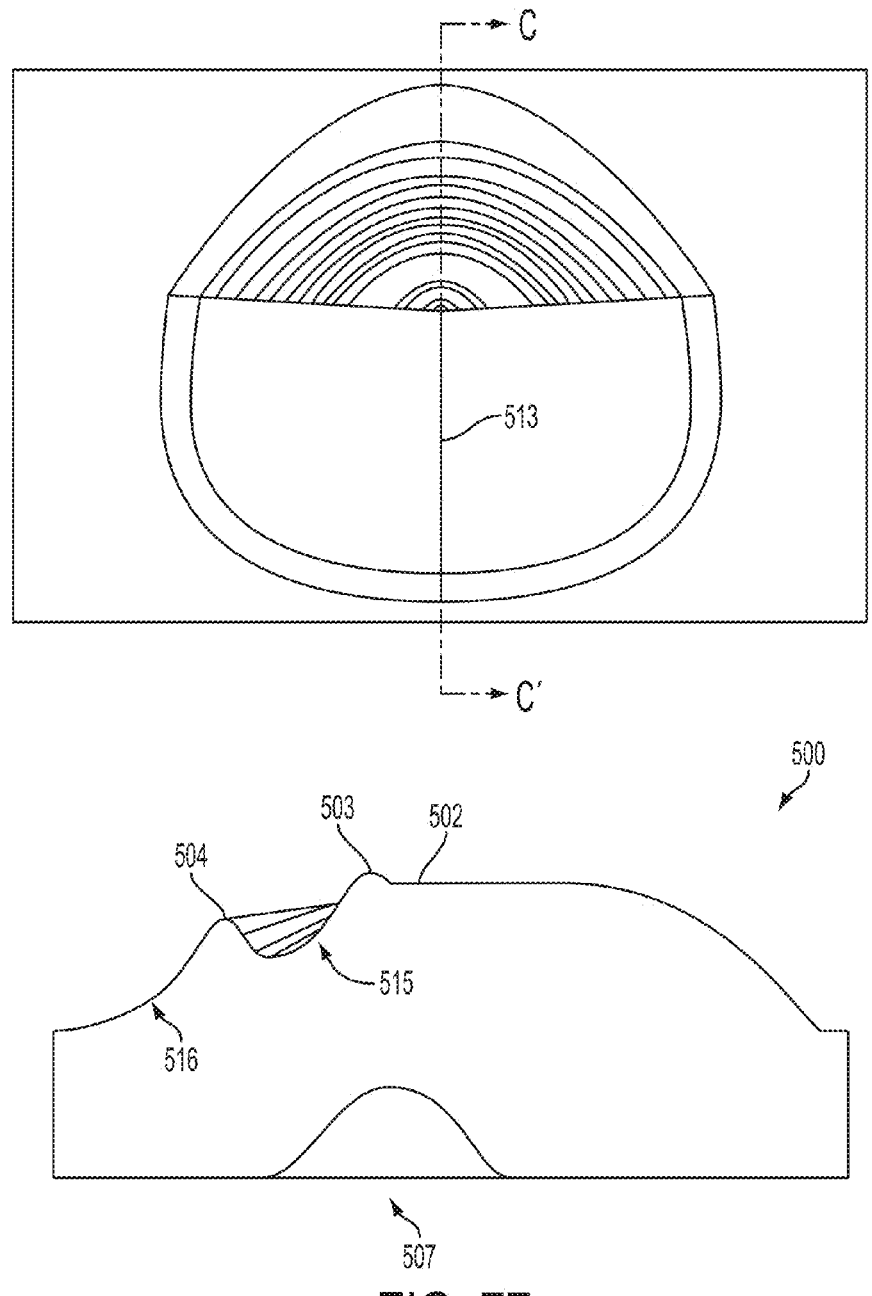
FIG. 77 depicts a planar section of a light directing apparatus, according to an example embodiment.

FIG. 77 depicts a planar section of light directing apparatus 500, taken along line C-C'. Line C-C' is collinear with centerline 513. As illustrated, surface 515 is of a sharp, convex curved shape extending between the first protrusion 503 and the second protrusion 504, and surface 516 is of a generally convex shape extending from the second protrusion 504 to the first surface 505 of the apparatus 500.

Figure 78:
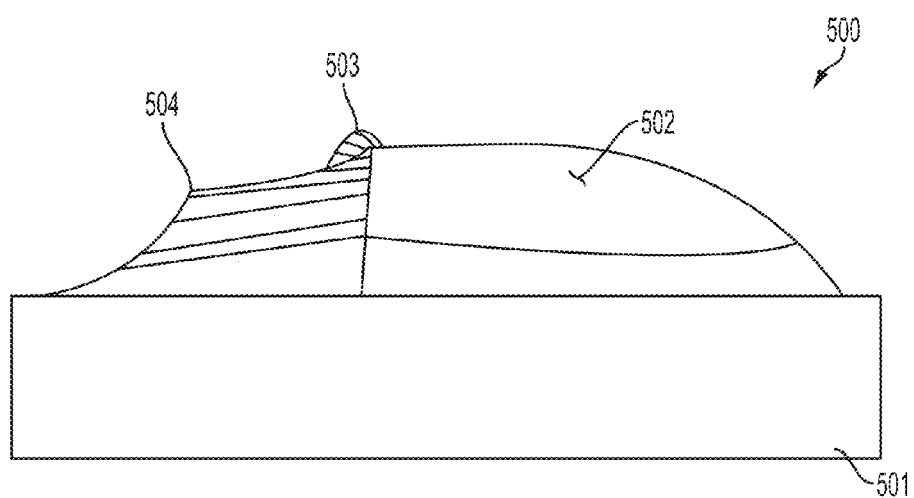
FIG. 78 depicts a planar section of a light directing apparatus, according to an example embodiment.

FIG. 78 depicts a side view of light directing apparatus 500.

Figure 79:
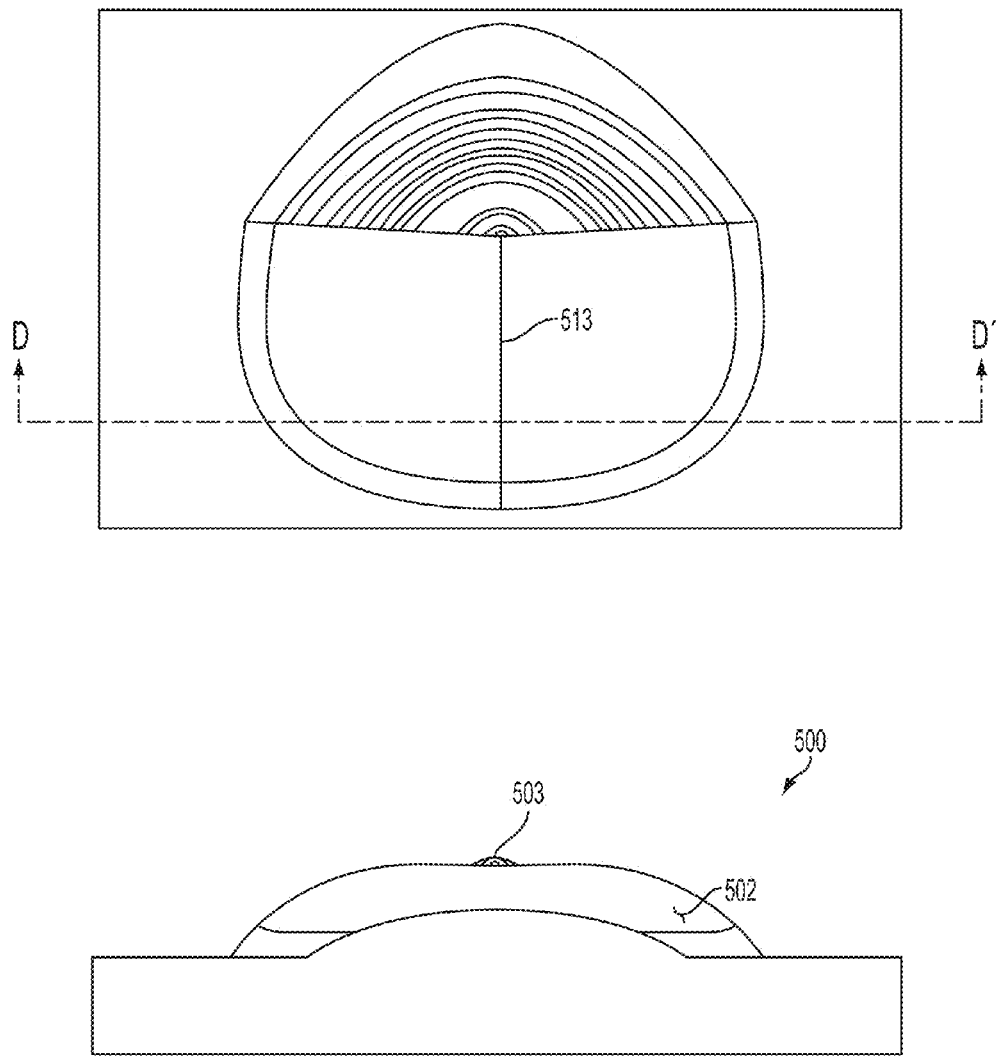
FIG. 79 depicts a planar section of a light directing apparatus, according to an example embodiment.

FIG. 79 depicts an additional planar section of light directing apparatus 500, taken along line D-D'. Line D-D' is perpendicular to centerline 513. As shown, the compound lens outer surface 502 is generally convex at line D-D'.

Figure 80:
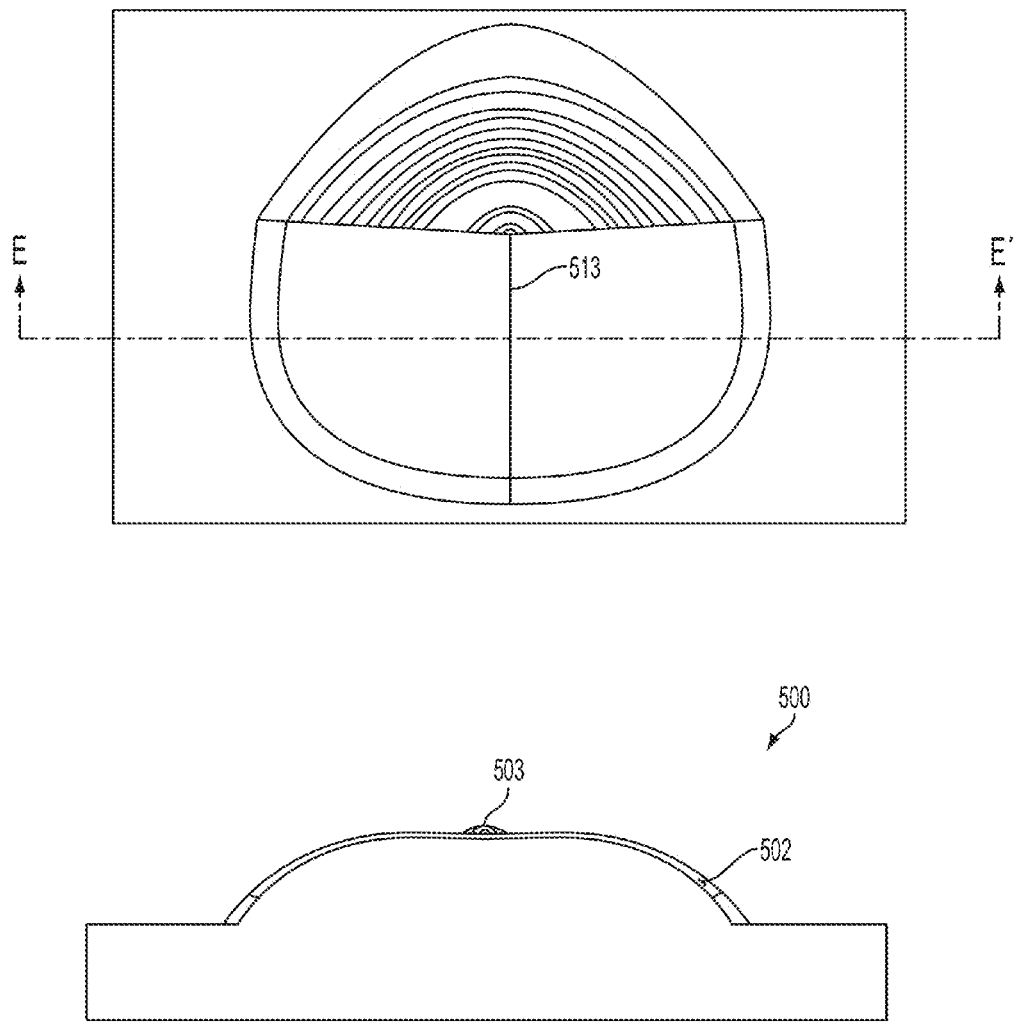
FIG. 80 depicts a planar section of a light directing apparatus, according to an example embodiment.

FIG. 80 depicts an additional planar section of light directing apparatus 500, taken along line E-E'. Line E-E' is perpendicular to centerline 513, and closer to the central axis Y' than is line D-D'. As shown, the compound lens outer surface 502 is generally convex and substantially symmetrical about centerline 513.

Figure 81:
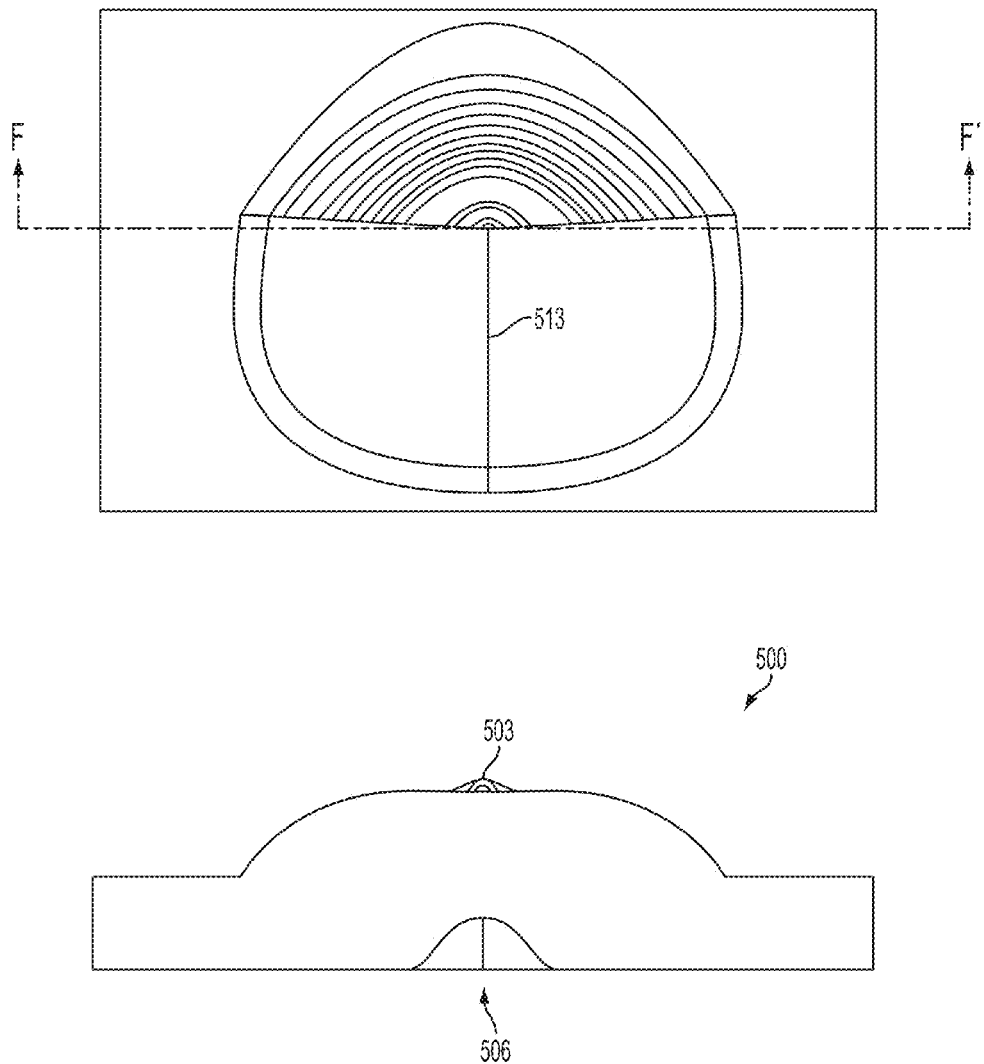
FIG. 81 depicts a planar section of a light directing apparatus, according to an example embodiment.

FIG. 81 depicts an additional planar section of light directing apparatus 500, taken along line F-F'. Line F-F' is perpendicular to centerline 513, and intersects the central axis Y'. As shown, the second edge 520 of the compound lens outer surface 502 is generally convex and substantially symmetrical about centerline 513.

Figure 82:
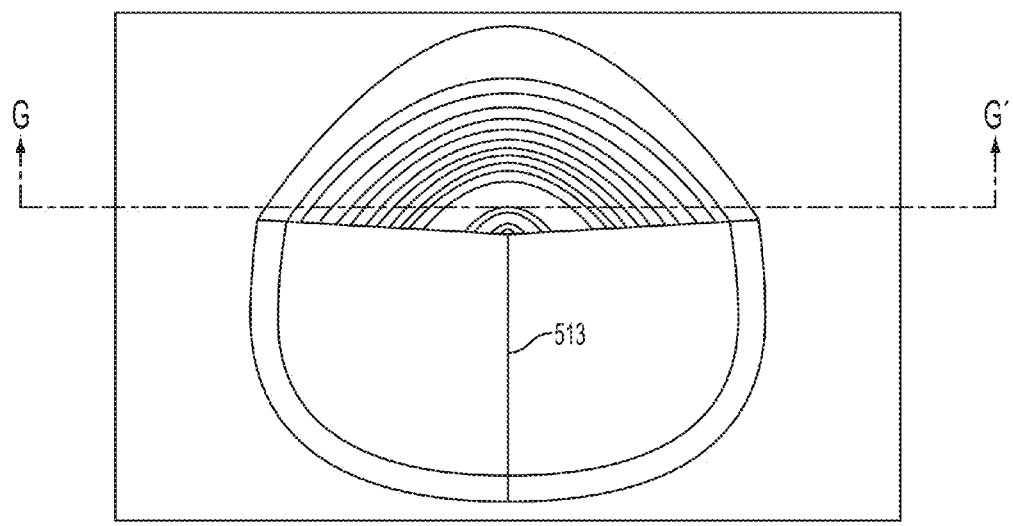
FIG. 82 depicts a planar section of a light directing apparatus, according to an example embodiment.
Figure 82:
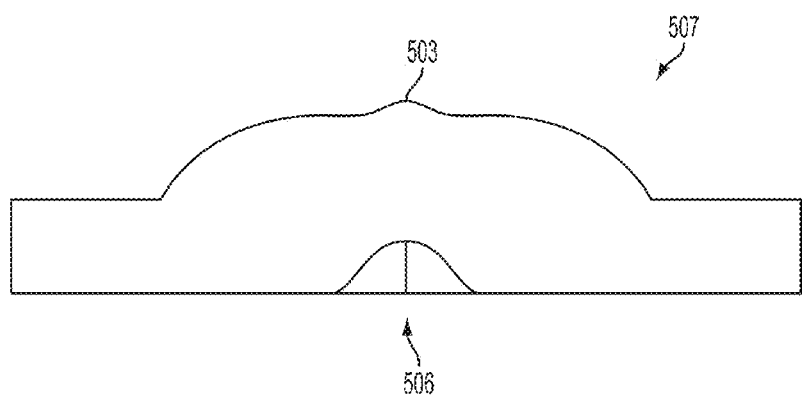

FIG. 82 depicts an additional planar section of light directing apparatus 500, taken along line G-G'. The line G-G' is perpendicular to centerline 513, and passes through the first protrusion 503.

Figure 83:
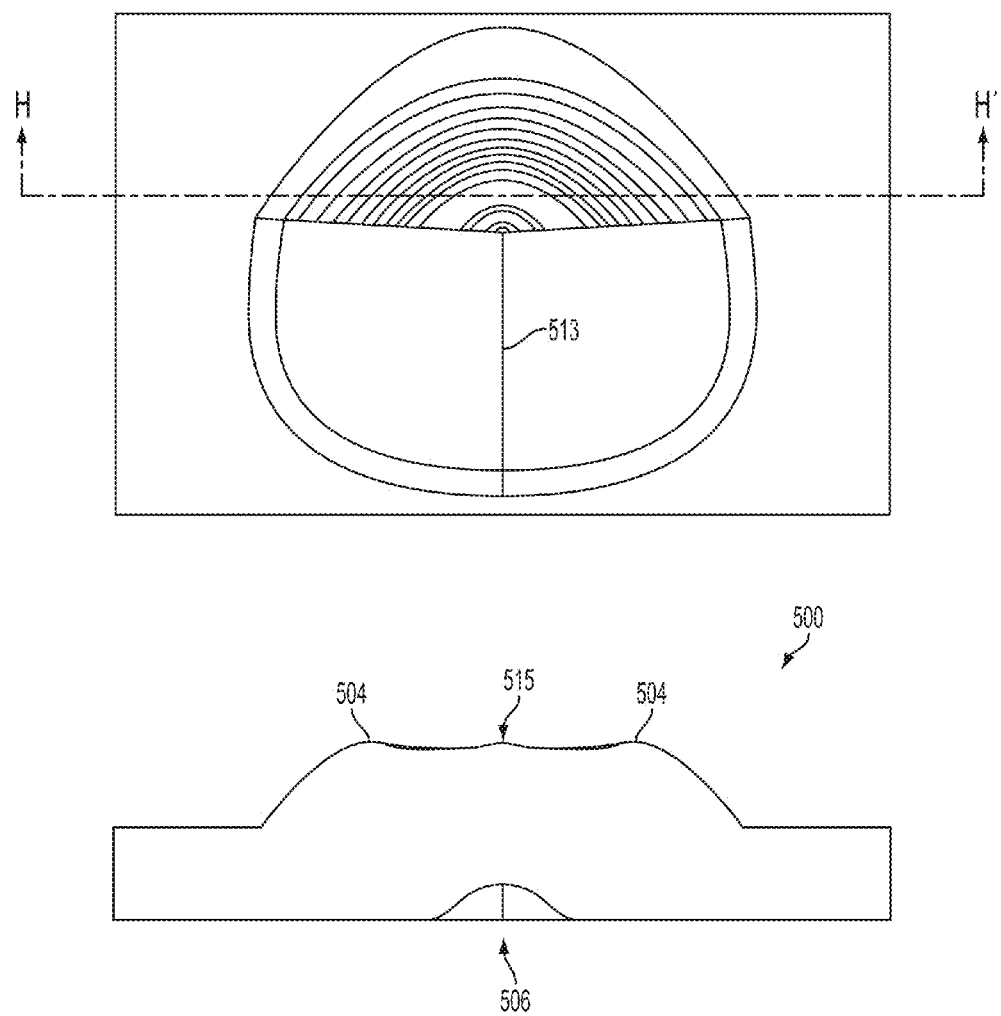
FIG. 83 depicts a planar section of a light directing apparatus, according to an example embodiment.

FIG. 83 depicts an additional planar section of light directing apparatus 500, taken along line H-H'. The line H-H' is perpendicular to centerline 513, and passes through the second protrusion 504 twice at two separate apexes or "peaks," showing the curved natured of the second protrusion 504 and the curved nature of surface 515 between the first protrusion 503 and the second protrusion 504.

Figure 84:
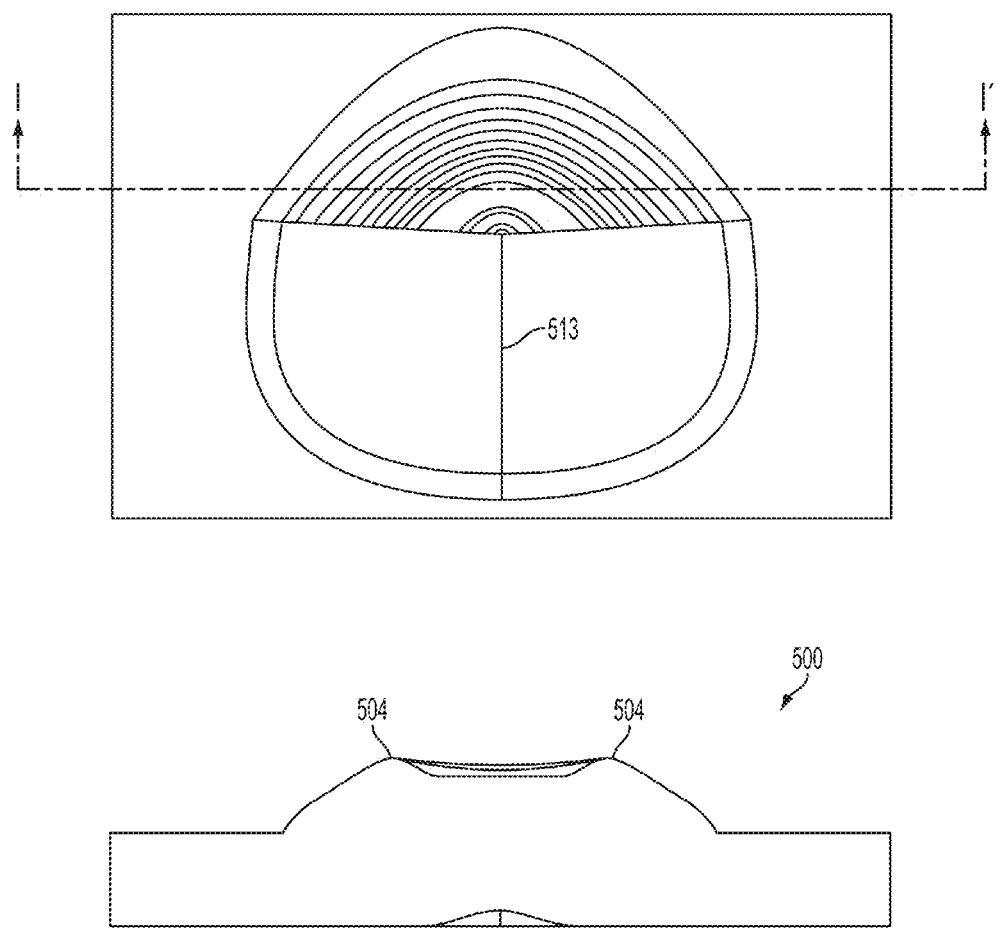
FIG. 84 depicts a planar section of a light directing apparatus, according to an example embodiment.

FIG. 84 depicts an additional planar section of light directing apparatus 500, taken along line I-I'. The line I-I' is perpendicular to centerline 513, and passes through the second protrusion 504 twice at two separate apexes or "peaks," showing the curved natured of the second protrusion 504.

Figure 85:
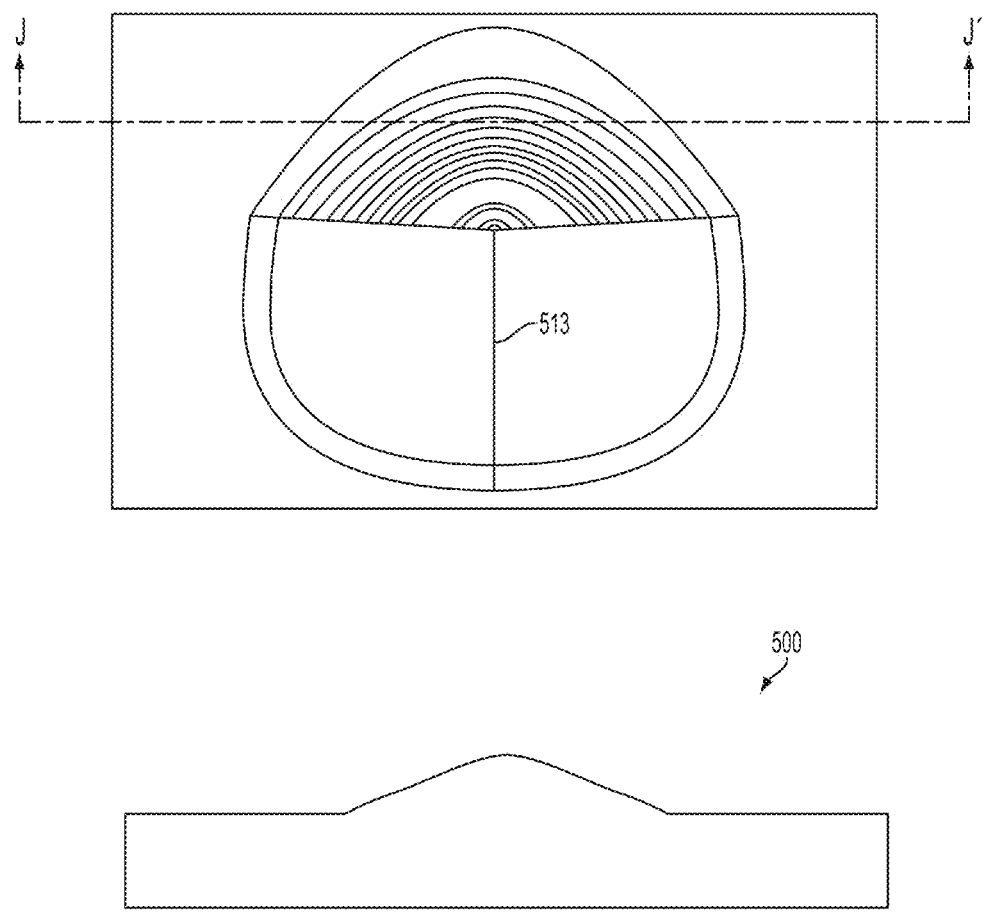
FIG. 85 depicts a planar section of a light directing apparatus, according to an example embodiment.

FIG. 85 depicts an additional planar section of light directing apparatus 500, taken along line J-J'. The line J-J' is perpendicular to centerline 513, and passes through the second protrusion 504 at a single point, showing the curved nature of the second protrusion 504 and the curved nature of the surface 516.

Figure 86:
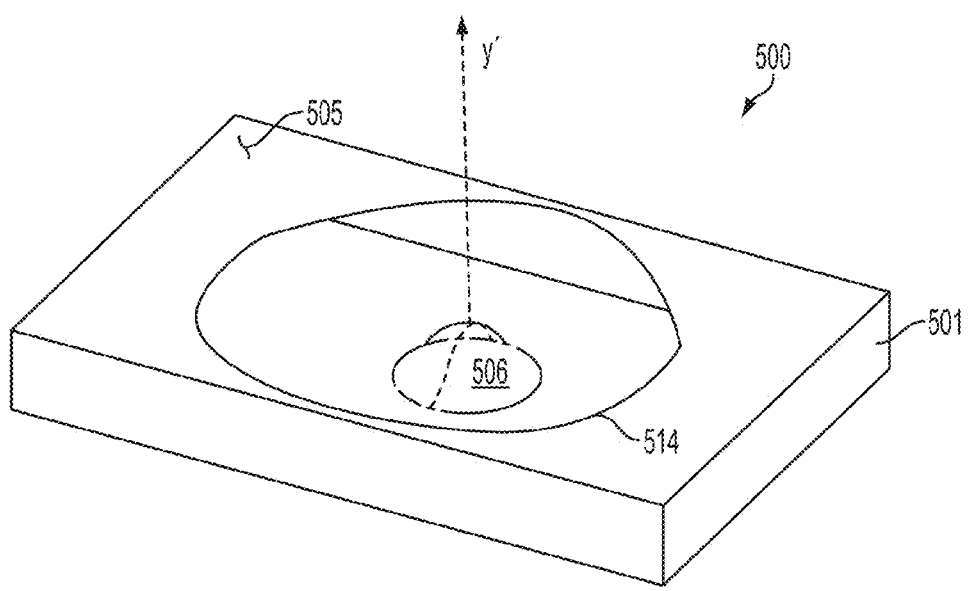
FIG. 86 depicts a perspective view of an interior of a light directing apparatus, according to an example embodiment.

FIG. 86 depicts a perspective view of an interior of light directing apparatus 500. As shown, the light-receiving portion 506 is rotationally symmetrical about central axis Y'.

Although structurally unique, it should be appreciated that the combination of compound lens outer surface 502 and protrusions 503-504 provide for light redirecting properties somewhat similar to those provide by apparatuses 100, 200, 300, and 400. For example, the protrusions 503 and 504 redirect light emitted from a light source generally towards the street side of the apparatus 500.

With regard to light-redirection, rays are reflected internally (i.e., on surfaces internal to the lens 500) towards the street side. For example, as a ray of incident light reacts with an air-surface interface, this ray of incident light is reflected towards the street side of the lens 500 through substantially total internal reflection achieved through a combination of the first and second protrusions 503, 504, similar to that described above with reference to FIG. 18. In this manner, the combination of internal reflections of incident light redirects light emitted from a light source towards the street side of lens 500.

Further, although not illustrated for the sake of clarity, it is appreciated that light not internally reflected tends to be refracted towards the street side as well to be reflected through interaction with surfaces 515 and 516 associated with the first and second protrusions 503 and 504, respectively.

Therefore, as described above, it is apparent that light emitted from a light source substantially coupled to the lens 500 interacts with the first and second protrusions 503, 504 such that this light is redirected towards a street side of the lens 500 through substantially total internal reflection, and partially through refraction. Additionally, it should be appreciated that refraction of light at the compound lens outer surface 502 on the first portion of the lens 500 also occurs such that this light is redirected towards the street side of the lens 500.

Figure 87:
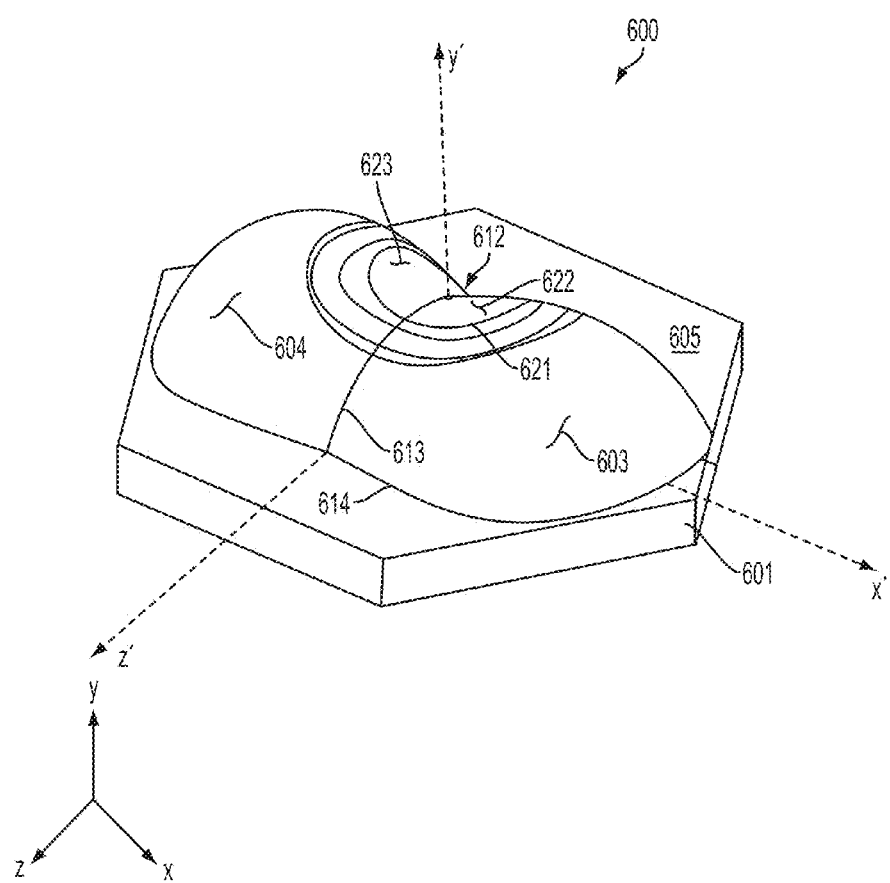
FIG. 87 depicts a perspective view of a light directing apparatus, according to an example embodiment.
Figure 88:
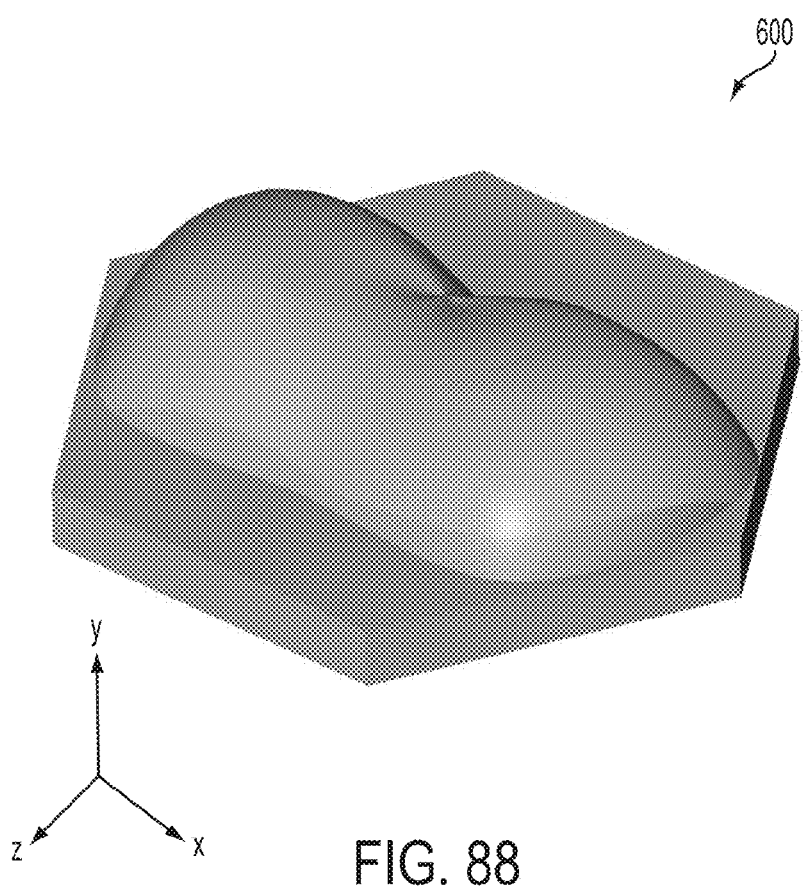
FIG. 88 depicts a perspective view of a light directing apparatus, according to an example embodiment.

Turning to FIGS. 87-88, a perspective view of an additional alternative light directing apparatus 600 is depicted. The light directing apparatus 600 may be formed of a material suitable for light transmission, for example, optically clear acrylic, silicone, or other suitable material. As illustrated, the apparatus 600 includes a base or optical substrate 601. The apparatus 600 further includes a first compound lens outer surface 603 on a first side 605 of the optical substrate 601, the first side 605 of the optical substrate 601 defining a main plane X'-Z'. The apparatus 600 further includes a second compound lens outer surface 604 on the first side 605 of the optical substrate 601. The compound lens outer surfaces 603-604 may be relatively smooth or may include at least a textured portion each, for example through sand-blasting, etching, coating, or similarly texturizing a portion or portions of the compound lens surfaces 603-604. The textured surfaces or portions of the surfaces may reduce color separation and may be configured to blend or mix light for a more uniform color output profile. For example, a grain or coarseness of the texture may be adjusted to promote a desired color-blending profile for any desired application.

As shown, a centerline or valley 613 extends over a boundary of the compound lens outer surfaces 603 and 604, over point 612, across edge line 614. The compound lens outer surfaces 603 and 604 have mirror image symmetry about the Y'-Z' plane (medial plane) containing the centerline 613. Regions 622 and 623, which surround point 612, are defined by lines 621 and 613, and are each individually convex, or substantially convex. Regions 622 and 623 have mirror image symmetry about the medial Y'-Z' plane. The reference axis Y' is orthogonal to the main plane X'-Z', and may be central to the body of the apparatus 600, and collinear with a central axis of a LED mated thereto.

Figure 89:
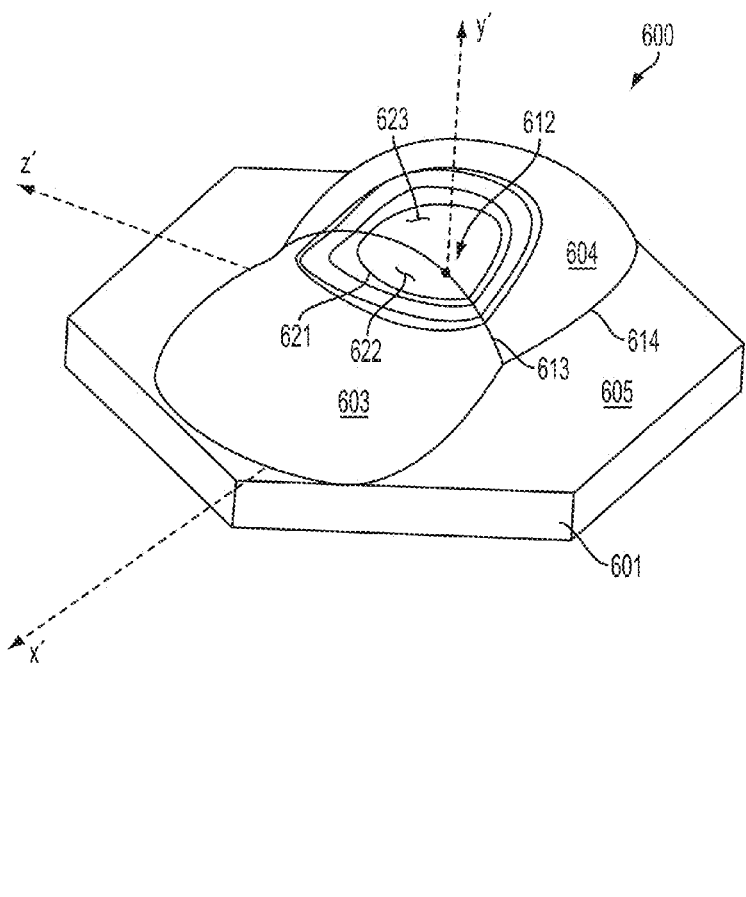
FIG. 89 depicts a perspective view of a light directing apparatus, according to an example embodiment.
Figure 90:
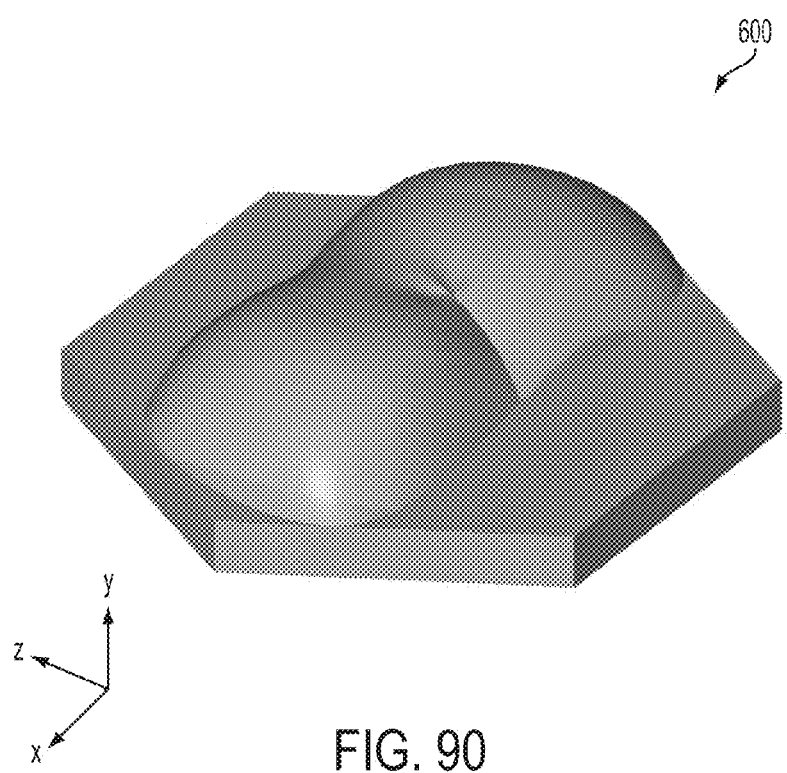
FIG. 90 depicts a perspective view of a light directing apparatus, according to an example embodiment.

FIGS. 89-90 depict an alternate perspective view of light directing apparatus 600. As illustrated, compound lens outer surfaces 603 and 604 are substantially convex.

Figure 91:
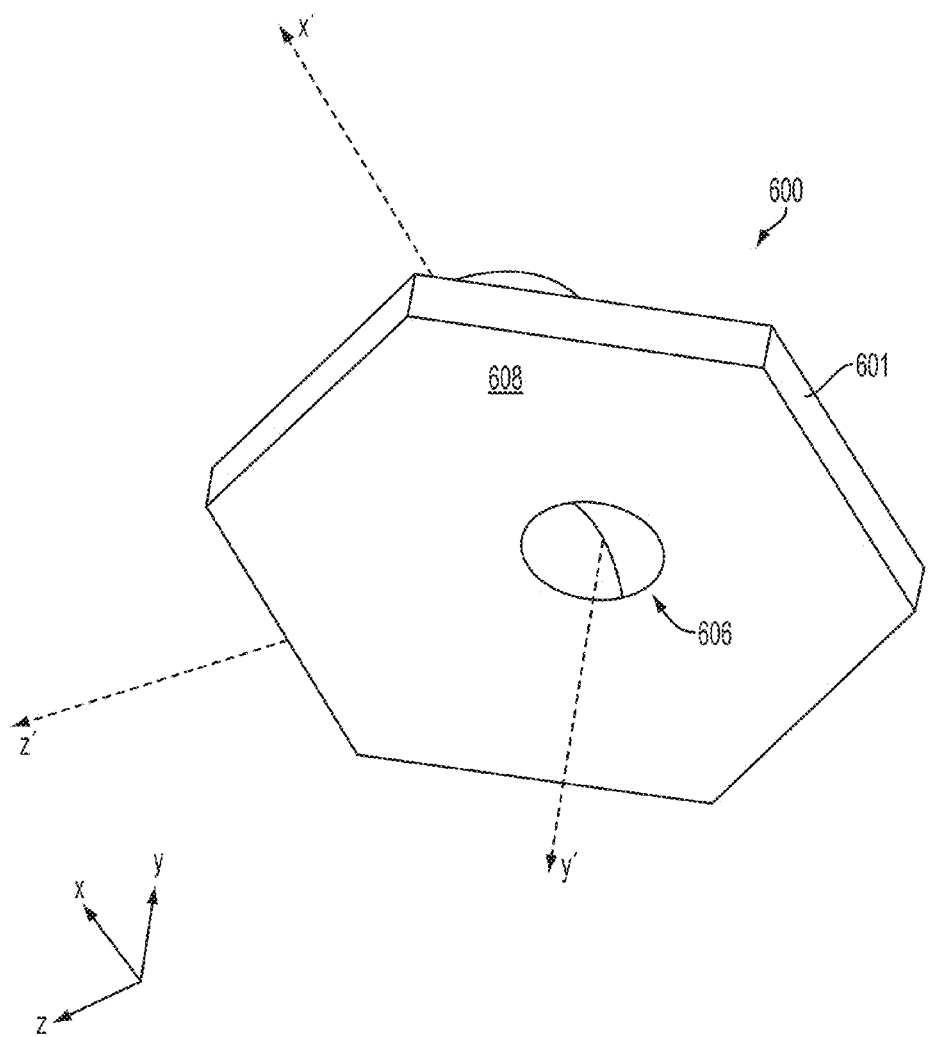
FIG. 91 depicts a perspective view of a light directing apparatus, according to an example embodiment.

FIG. 91 depicts an alternate perspective view of light directing apparatus 600. As shown, the light directing apparatus 600 includes an LED light-receiving portion 606 arranged on a second side 608 of the optical substrate 601. In an embodiment, the light-receiving portion 606 forms a recess in the second side 608 of the optical substrate 601 that receives an LED, thereby forming a mating portion for the LED. The light-receiving portion 606 may be generally hemispherical and rotationally symmetric about the central axis Y'. The light-receiving portion 606 may be disposed to receive an LED or other solid state light source. A surface of the light-receiving portion 606 may be textured (e.g., through sand-blasting, acid-etching, or any other means of texturing) to reduce an interior halo of light emitted from a light source. For example, the light source is an LED or a semiconductor light source, and the surface of the light-receiving portion 606 is textured to reduce an interior halo of the LED. Furthermore, another portion or portions of the second side 608 may additionally/alternatively be textured to aid in reducing halo and/or promote better color-blending.

As described above with reference to FIG. 87-91, according to at least one example embodiment, a light directing apparatus 600 includes an optical substrate 601, two mirror-symmetric compound lens outer surfaces 603-604 on a first side of the optical substrate, wherein a centerline extending over a boundary region formed between the compound lens outer surfaces defines a central point which is collinear to a central reference axis of an LED light-receiving portion. Therefore, a central reference axis of the apparatus 600 is collinear with a central reference axis of an LED mated thereto.

To better understand these and other features and functions of the light directing apparatus 600, detailed illustrations are provided in FIGS. 92-103. All illustrations are presented with coordinate axes matched with the particular orientation of the apparatus 600 illustrated in each figure.

Figure 92:
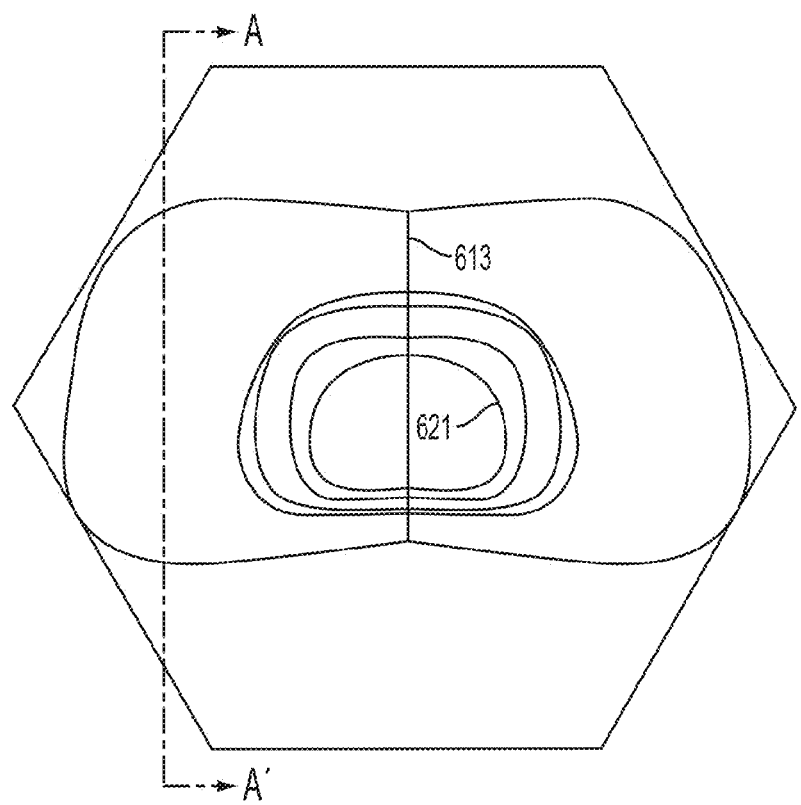
FIG. 92 depicts a planar section of a light directing apparatus, according to an example embodiment.
Figure 92:
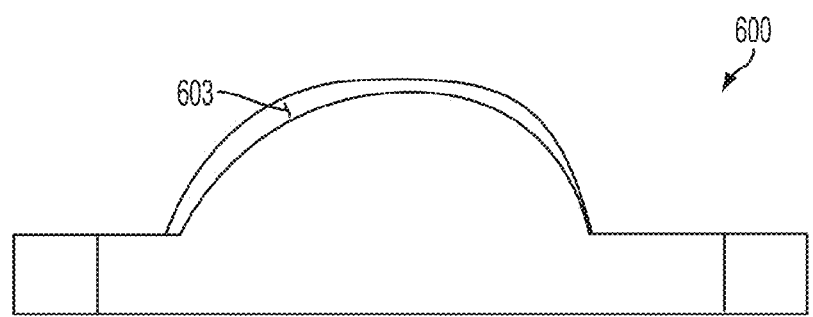

FIG. 92 depicts a planar section of light directing apparatus 600, taken along line A-A'. The line A-A' is parallel to centerline 613. As illustrated, the compound lens outer surface 603 is relatively convex along line A-A'.

Figure 93:
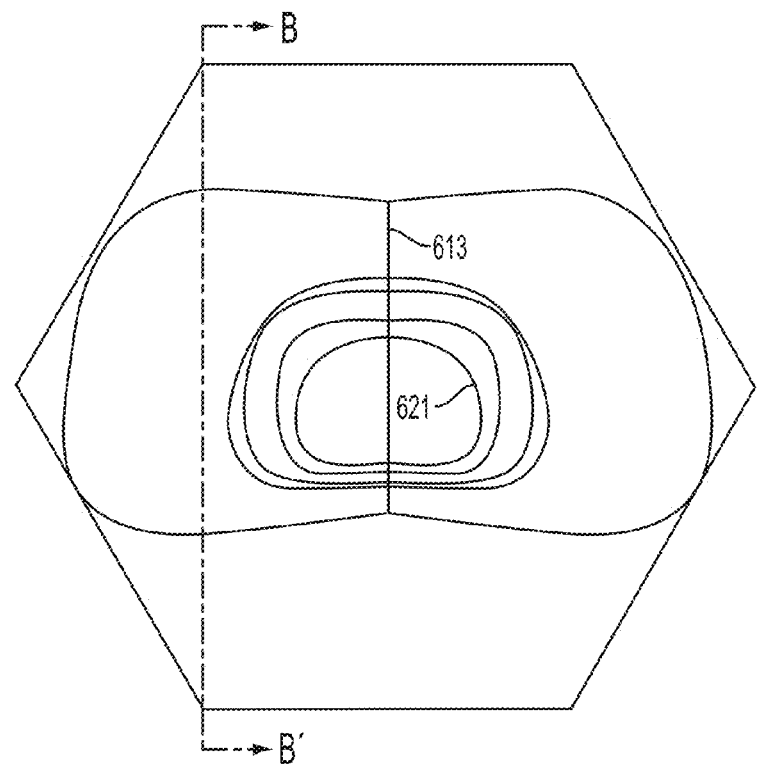
FIG. 93 depicts a planar section of a light directing apparatus, according to an example embodiment.
Figure 93:
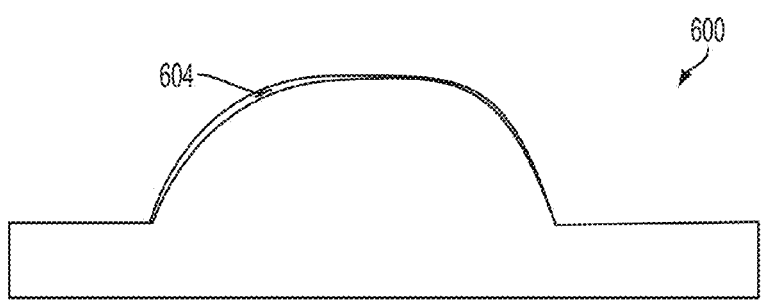

FIG. 93 depicts an additional planar section of light directing apparatus 600, taken along line B-B'. The line B-B' is parallel centerline 613. As illustrated, the compound lens outer surface 603 is relatively convex along line B-B'.

Figure 94:
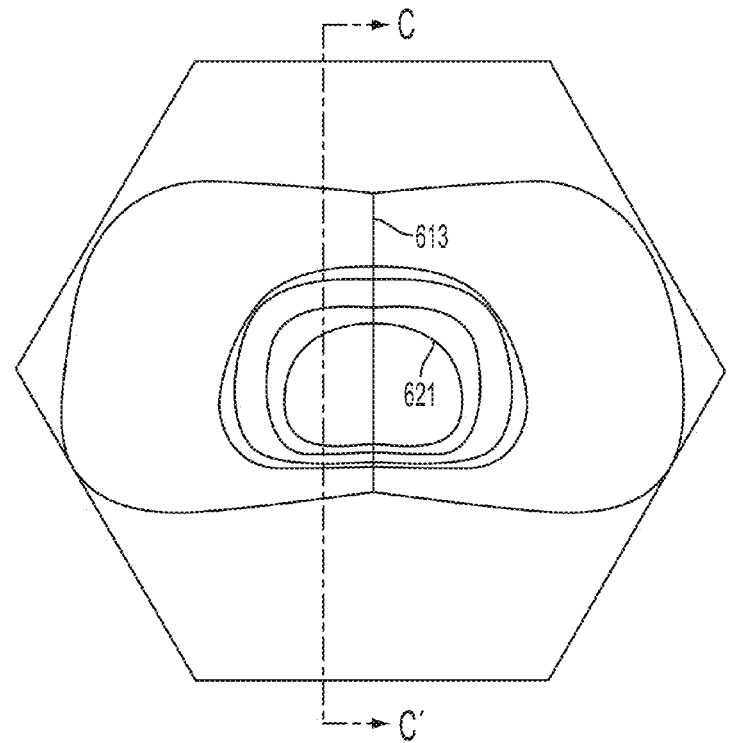
FIG. 94 depicts a planar section of a light directing apparatus, according to an example embodiment.
Figure 94:
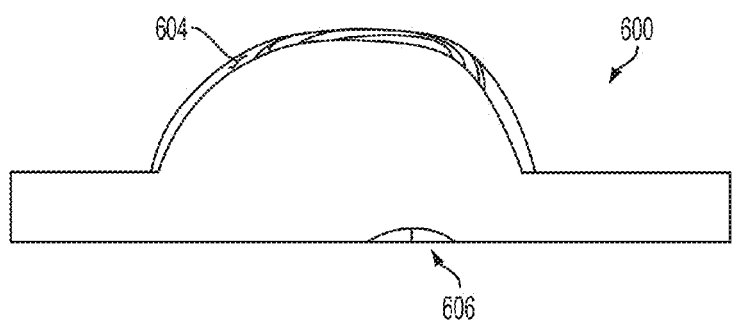

FIG. 94 depicts a planar section of light directing apparatus 600, taken along line C-C'. Line C-C' is parallel centerline 613. As illustrated, the compound lens outer surface 603 is relatively convex along line C-C'.

Figure 95:
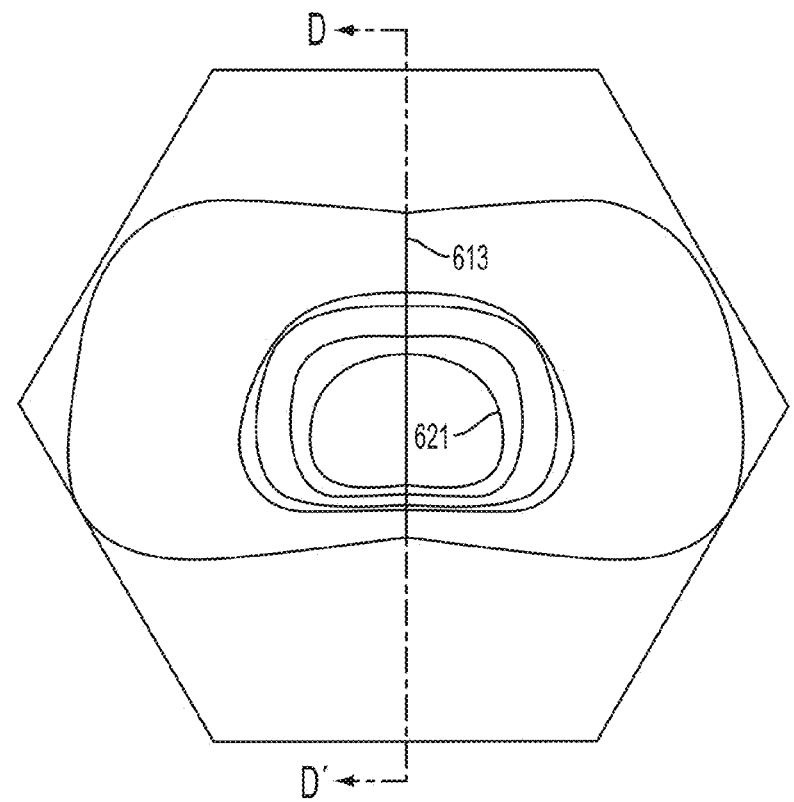
FIG. 95 depicts a planar section of a light directing apparatus, according to an example embodiment.
Figure 95:
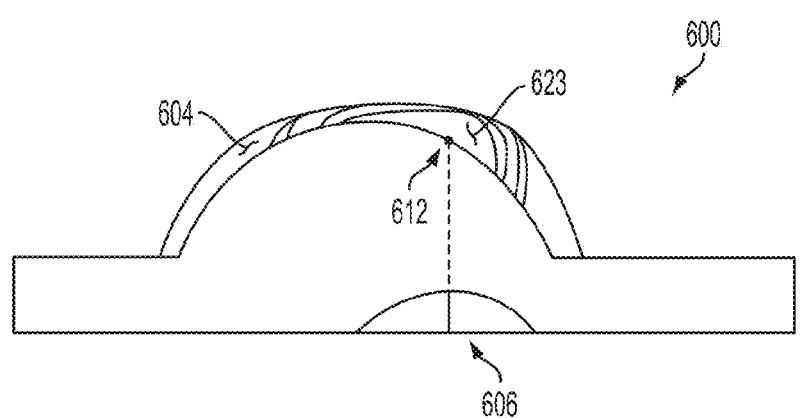

FIG. 95 depicts a planar section of light directing apparatus 600, taken along line D-D'. Line D-D' is collinear with centerline 613. As illustrated, the compound lens outer surface 603 is relatively convex along line C-C', and the reference axis Y' is collinear with a central reference axis of the LED mating portion 606.

Figure 96:
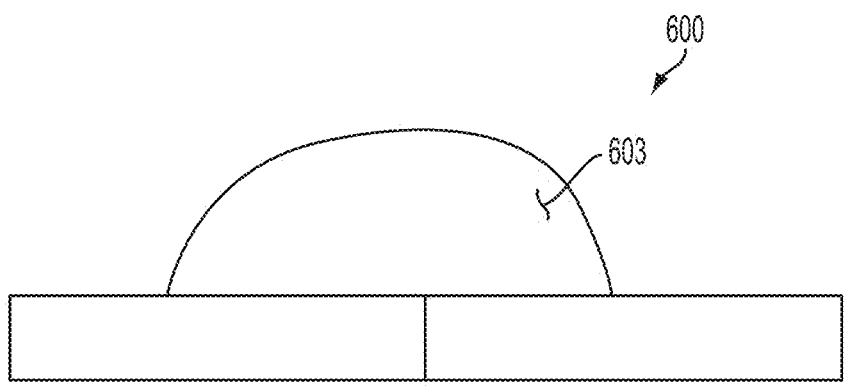
FIG. 96 depicts a planar section of a light directing apparatus, according to an example embodiment.

FIG. 96 depicts a side view of light directing apparatus 600.

Figure 97:
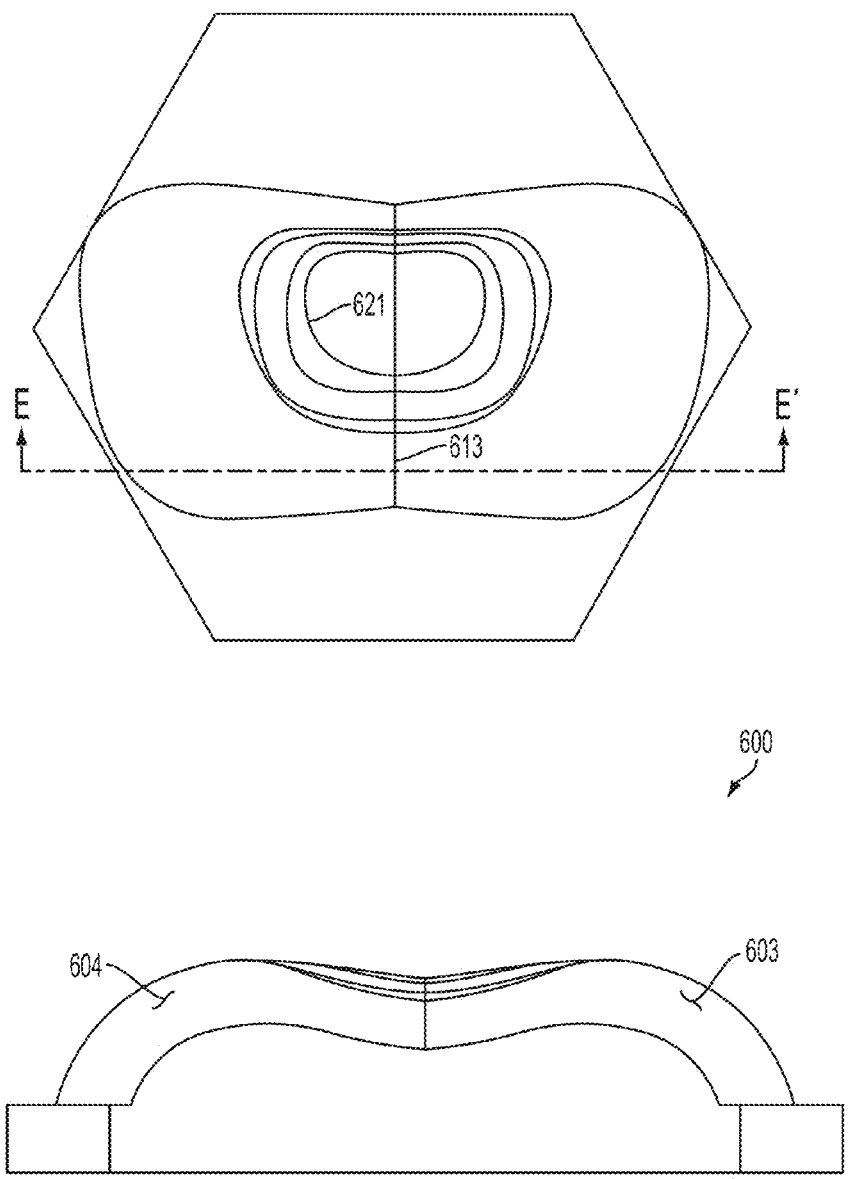
FIG. 97 depicts a planar section of a light directing apparatus, according to an example embodiment.

FIG. 97 depicts an additional planar section of light directing apparatus 600, taken along line E-E'. Line E-E' is perpendicular to centerline 613. As shown, the compound lens outer surfaces 603 and 604 are each generally convex and substantially symmetrical about centerline 613.

Figure 98:
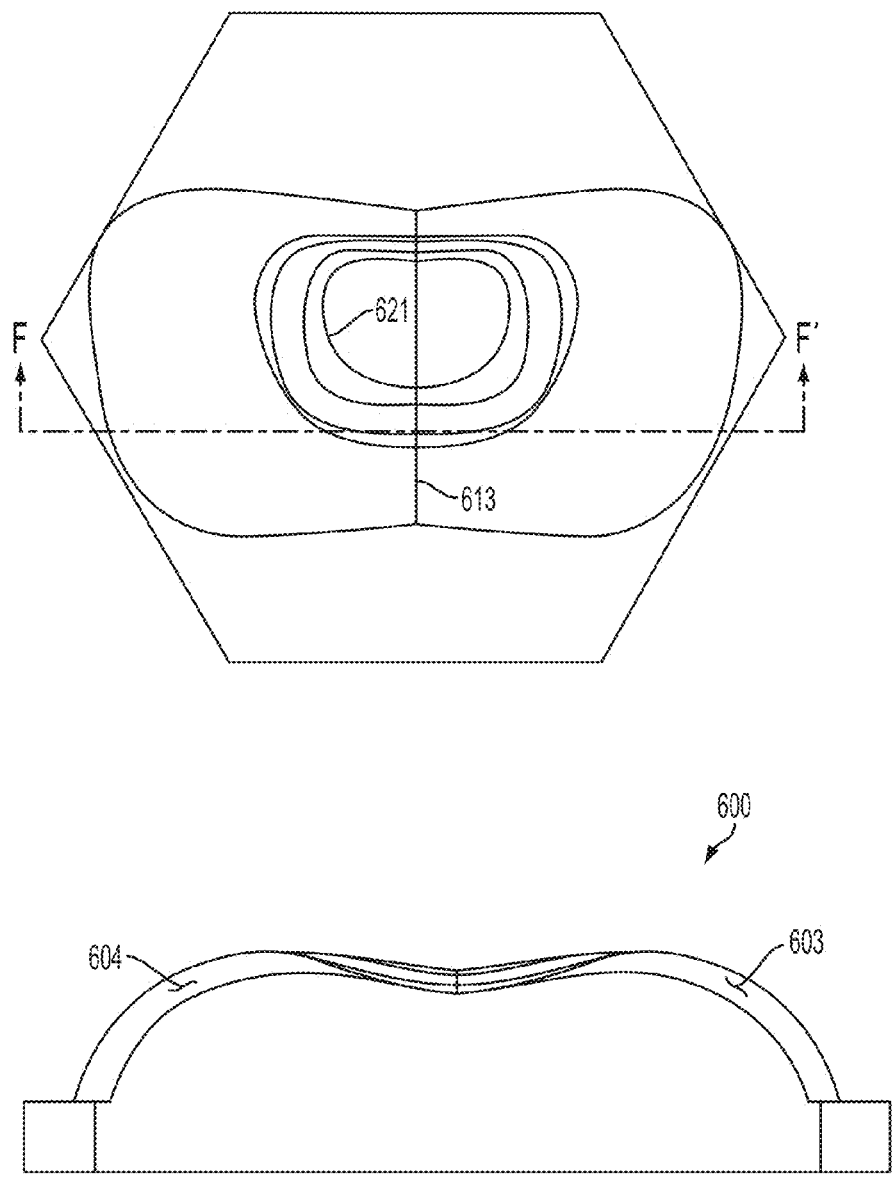
FIG. 98 depicts a planar section of a light directing apparatus, according to an example embodiment.

FIG. 98 depicts an additional planar section of light directing apparatus 600, taken along line F-F'. Line F-F' is perpendicular to centerline 613, and is closer to the central axis Y' than is line E-E'. As shown, the compound lens outer surfaces 603 and 604 are each generally convex and substantially symmetrical about centerline 613.

Figure 99:
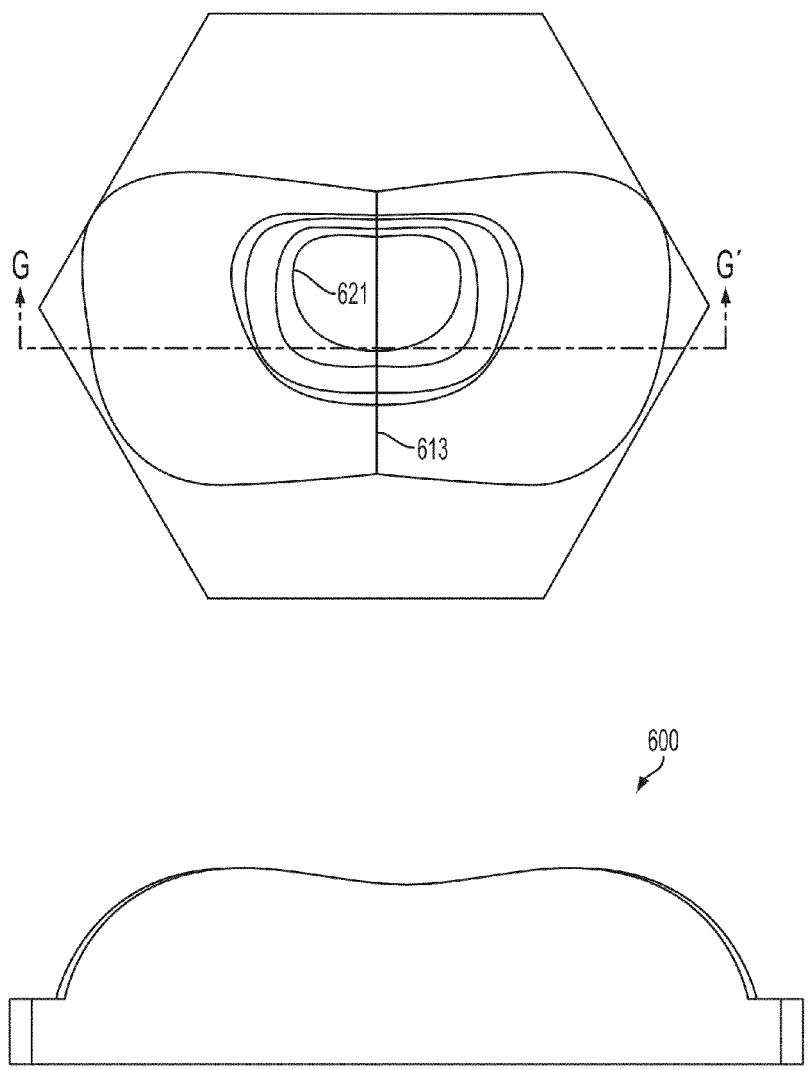
FIG. 99 depicts a planar section of a light directing apparatus, according to an example embodiment.

FIG. 99 depicts an additional planar section of light directing apparatus 600, taken along line G-G'. Line G-G' is perpendicular to centerline 613, and is closer to the central axis Y' than is line F-F'. As shown, the compound lens outer surfaces 603 and 604 are each generally convex and substantially symmetrical about centerline 613.

Figure 100:
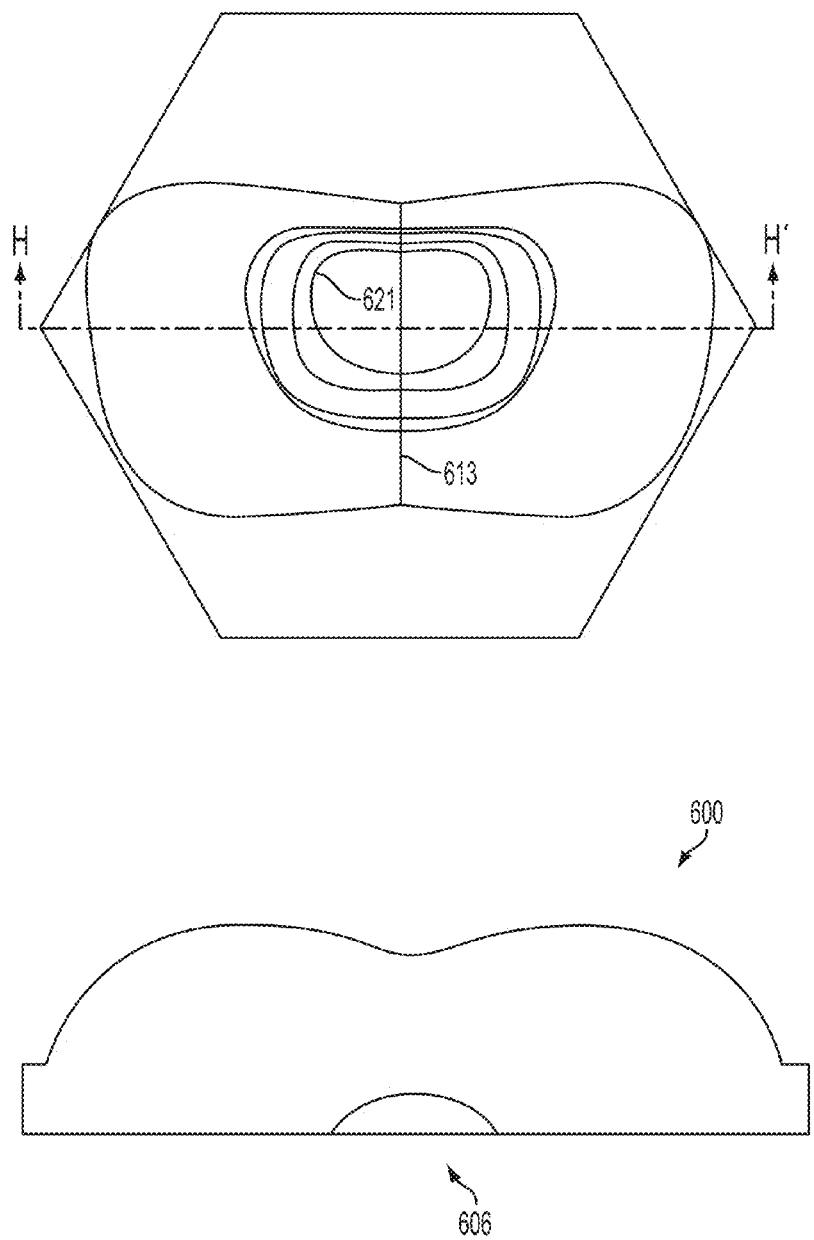
FIG. 100 depicts a planar section of a light directing apparatus, according to an example embodiment.

FIG. 100 depicts an additional planar section of light directing apparatus 600, taken along line H-H'. Line H-H' is perpendicular to centerline 613, and intersects the central axis Y' and point 612. As shown, the compound lens outer surfaces 603 and 604 are each generally convex and substantially symmetrical about centerline 613, and the central reference axis Y' is substantially collinear with a central reference axis of the light-receiving portion 606.

Figure 101:
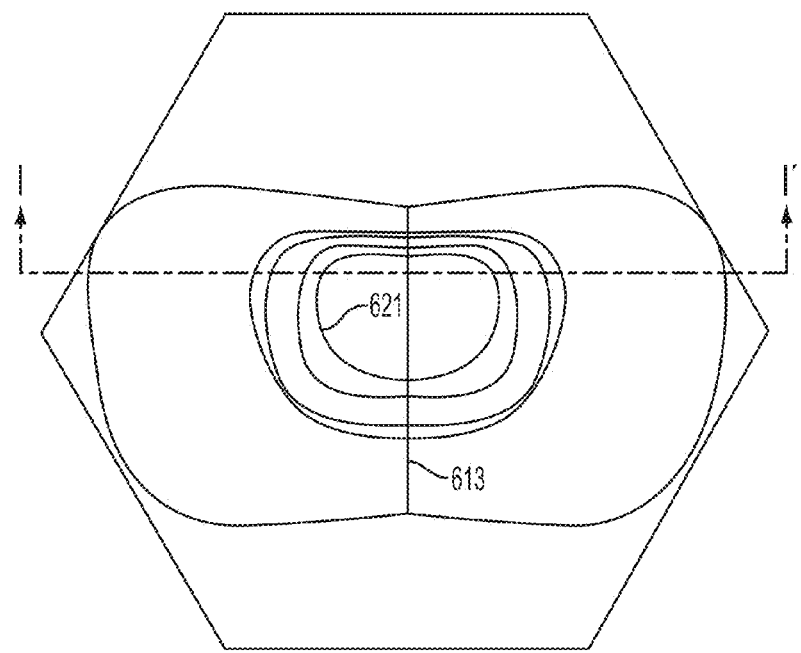
FIG. 101 depicts a planar section of a light directing apparatus, according to an example embodiment.
Figure 101:
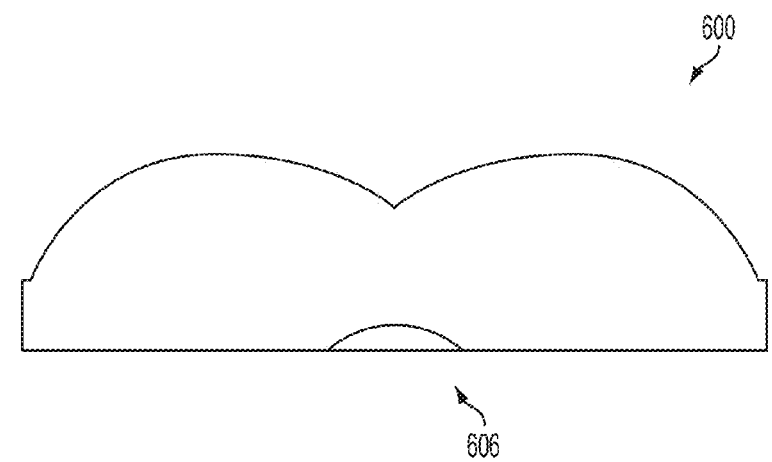

FIG. 101 depicts an additional planar section of light directing apparatus 600, taken along line I-I'. The line I-I' is perpendicular to centerline 613. As shown, the compound lens outer surfaces 603 and 604 are each generally convex and substantially symmetrical about centerline 613.

Figure 102:
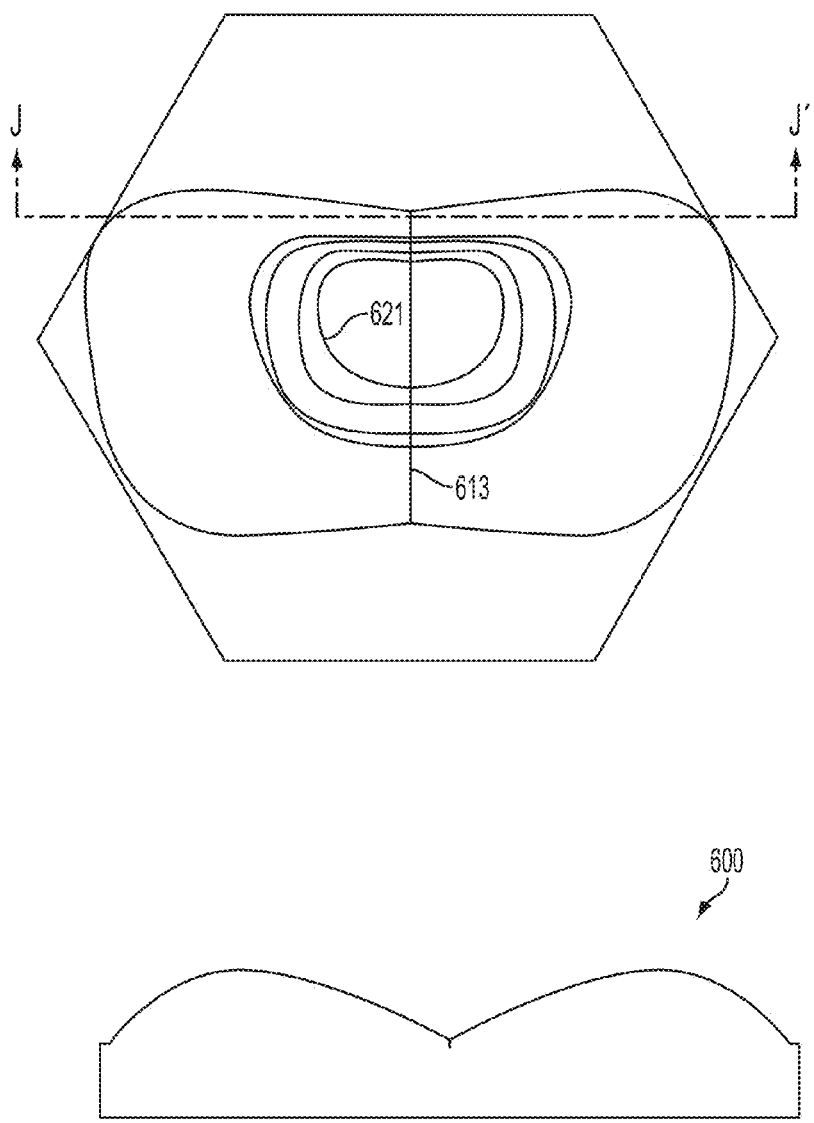
FIG. 102 depicts a planar section of a light directing apparatus, according to an example embodiment.

FIG. 102 depicts an additional planar section of light directing apparatus 600, taken along line J-J'. The line J-J' is perpendicular to centerline 613. As shown, the compound lens outer surfaces 603 and 604 are each generally convex and substantially symmetrical about centerline 613.

Figure 103:
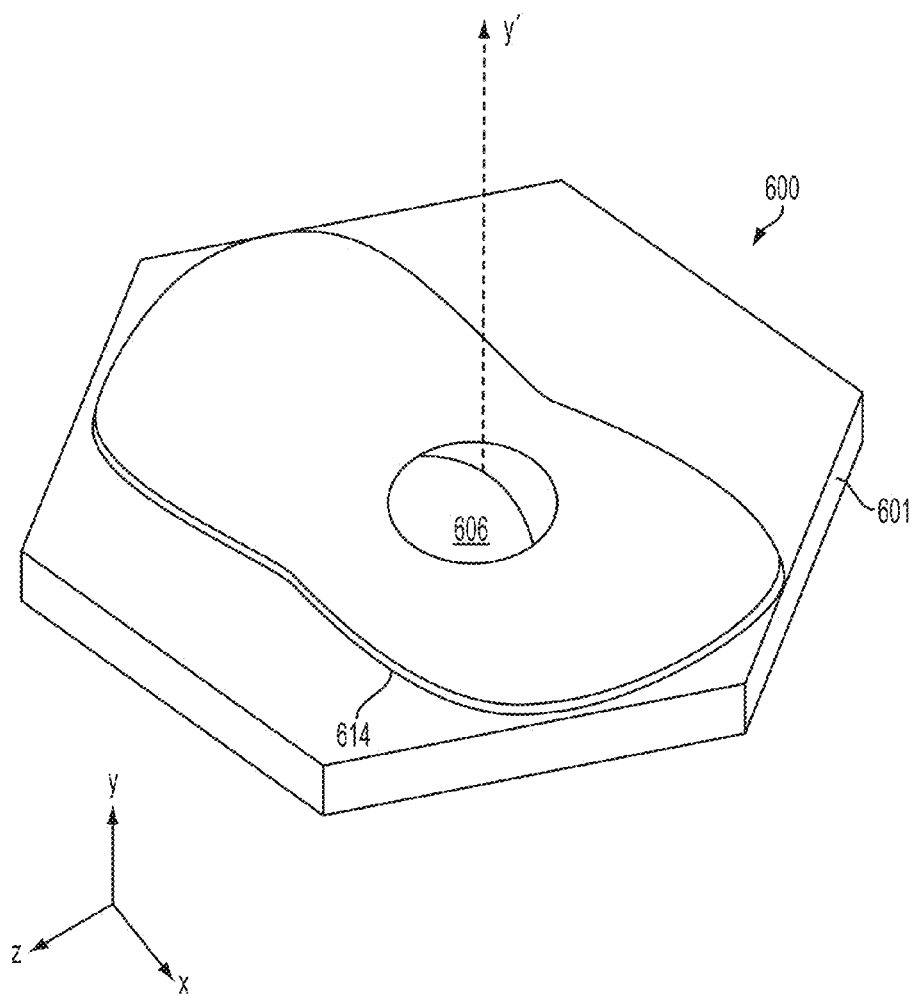
FIG. 103 depicts a perspective view of an interior of a light directing apparatus, according to an example embodiment.

FIG. 103 depicts a perspective view of an interior of light directing apparatus 600. As shown, the light-receiving portion 606 is rotationally symmetrical about central reference axis Y'.

Although structurally unique, it should be appreciated that the combination of compound lens outer surfaces 603 and 604 provide for light redirecting properties through refraction. For example, the surfaces 603 and 604 redirect light emitted from a light source generally towards the street side of the apparatus 600 through refraction and reflection of light coupled therein.

With regard to light-redirection, rays are reflected internally (i.e., on surfaces internal to the lens 600) towards the street side and also refracted. For example, as a ray of incident light reacts with an air-surface interface opposite the street-side, this ray of incident light is reflected towards the street side of the lens 600 through substantially total internal reflection.

Therefore, as described above, it is apparent that light emitted from a light source substantially coupled to the lens 600 interacts with the first and second compound lens outer surfaces 603, 604 such that this light is redirected towards a street side of the lens 600 through partially through reflection, and partially through refraction. Additionally, it should be appreciated that refraction of light at the compound lens outer surfaces 603 and 604 occurs such that this light is redirected towards the street side of the lens 600.

Although described above with reference to multiple compound lens outer surfaces and multiple light directing protrusions, it should be appreciated that example embodiments may also include simplified light directing apparatuses configured to disperse light in a generally symmetrical manner, for example, by directing light emitted from an LED outwards in all directions rather than just a street side. This may result in less intense light about a central axis of a distribution profile as compared to a conventional lighting profile provided by an LED. For example, FIGS. 104-111 illustrate additional example embodiments of light directing apparatuses.

Figure 104:
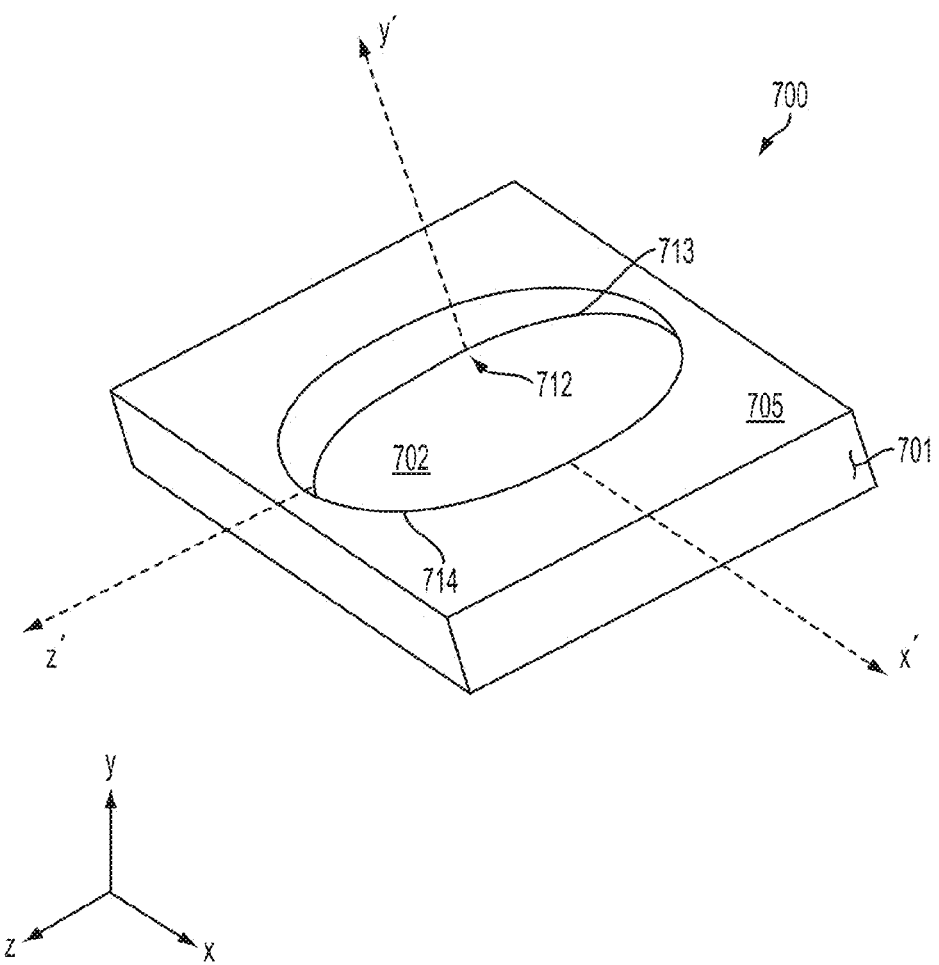
FIG. 104 depicts a perspective view of a light directing apparatus, according to an example embodiment.
Figure 105:
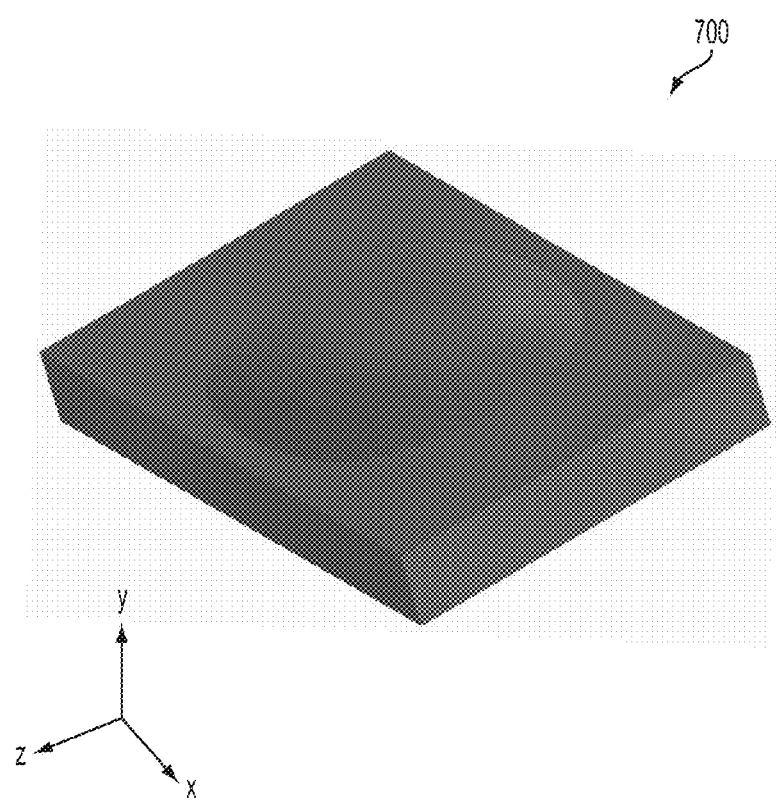
FIG. 105 depicts a perspective view of a light directing apparatus, according to an example embodiment.

Turning to FIGS. 104-105 a perspective view of an alternative light directing apparatus is illustrates, according to an example embodiment. The light directing apparatus 700 may be formed of a material suitable for light transmission, for example, optically clear acrylic, silicone, or other suitable material. As illustrated, the apparatus 700 includes a base or optical substrate 701. The apparatus 700 further includes a compound lens outer surface 702 on a first side 705 of the optical substrate 701, the first side 705 of the optical substrate 701 defining a main plane X'-Z'. The compound lens outer surface 702 may be relatively smooth or may include at least a textured portion, for example through sand-blasting, etching, coating, or similarly texturizing a portion or portions of the compound lens surface 702. The textured surface or portion of the surface may reduce color separation and may be configured to blend or mix light for a more uniform color output profile. For example, a grain or coarseness of the texture may be adjusted to promote a desired color-blending profile for any desired application.

As shown, a centerline 713 extends across a first edge 714 of the compound lens outer surface 702, through center point 712. The compound lens outer surface 702 has mirror image symmetry about the Y'-Z' plane (medial plane) containing the centerline 513, and may be, according to some example embodiments, rotationally symmetric about central reference axis Y'. The reference axis Y' is orthogonal to the main plane X'-Z', and may be central to the body of the apparatus 700, and collinear with a central axis of an LED mated thereto.

Figure 106:
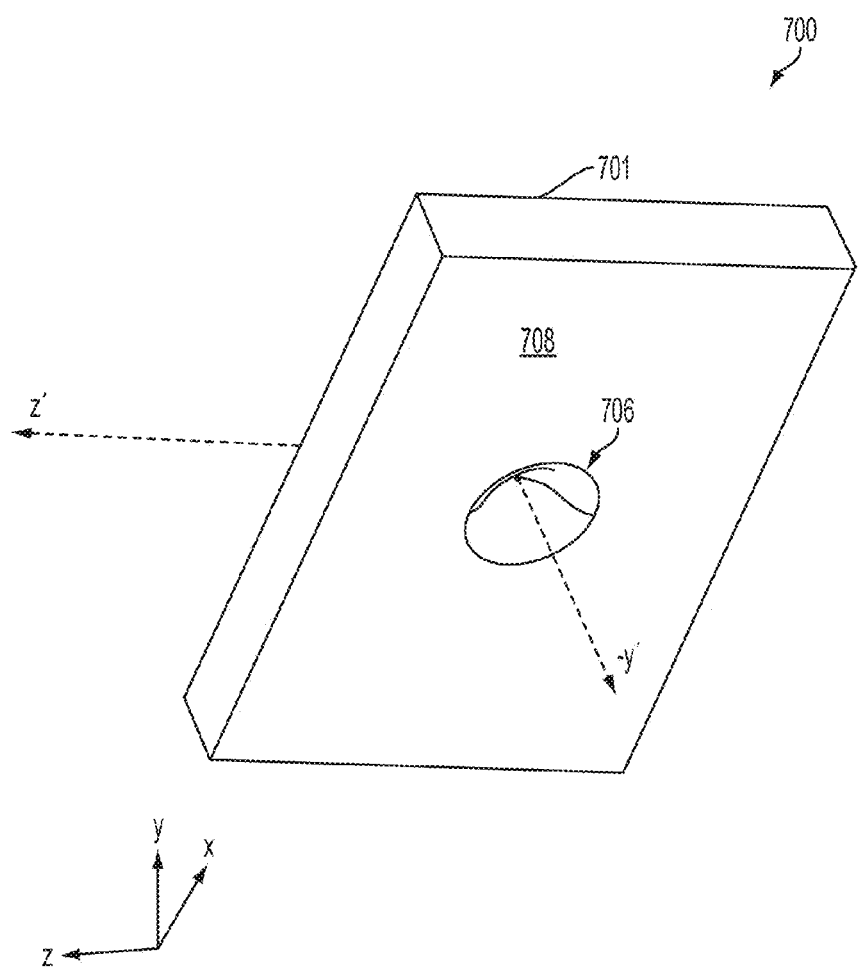
FIG. 106 depicts a perspective view of a light directing apparatus, according to an example embodiment.

FIG. 106 depicts an alternate perspective view of light directing apparatus 700. As shown, the light directing apparatus 700 includes an LED light-receiving portion 706 arranged on a second side 708 of the optical substrate 701. In an embodiment, the light-receiving portion 706 forms a recess in the second side 708 of the optical substrate 701 that receives an LED, thereby forming a mating portion for the LED. The light-receiving portion 706 may be generally hemispherical and rotationally symmetric about the central axis Y'. The light-receiving portion 706 may be disposed to receive an LED or other solid state light source. A surface of the light-receiving portion 706 may be textured (e.g., through sandblasting, acid-etching, coating, or any other means of texturing) to reduce an interior halo of light emitted from a light source. For example, the light source is an LED or a semiconductor light source, and the surface of the light-receiving portion 706 is textured to reduce an interior halo of the LED. Furthermore, another portion or portions of the second side 708 may additionally/alternatively be textured to aid in reducing halo and/or promote better color-blending.

Figure 107:
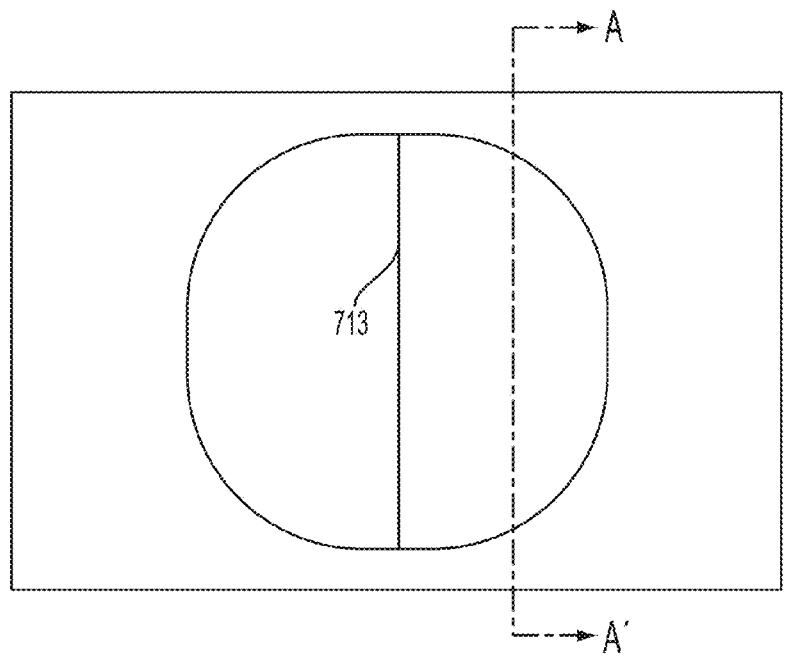
FIG. 107 depicts a planar section of a light directing apparatus, according to an example embodiment.
Figure 107:
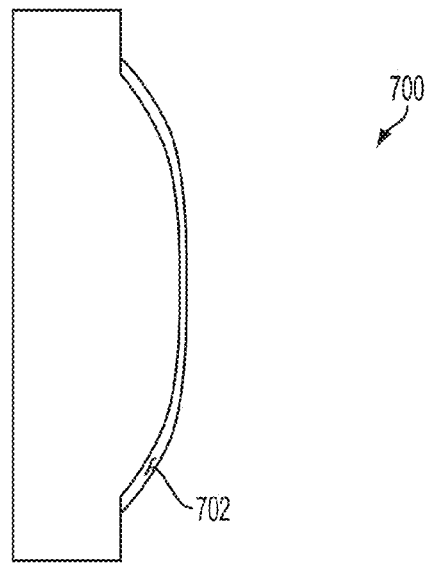
Figure 108:
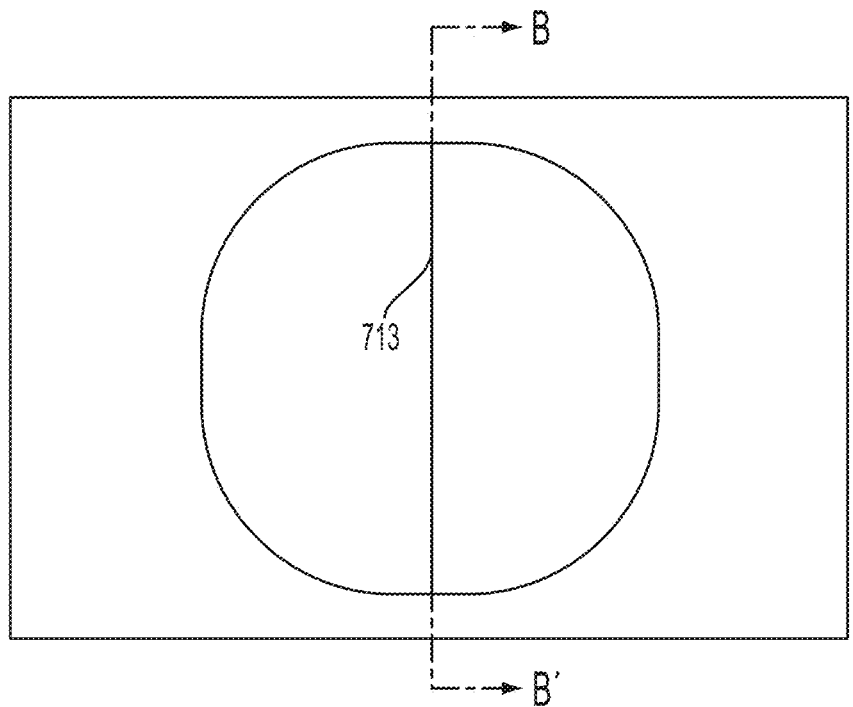
FIG. 108 depicts a planar section of a light directing apparatus, according to an example embodiment.
Figure 108:
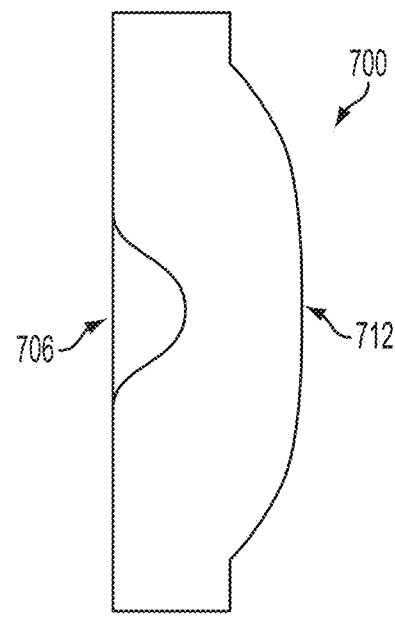
Figure 109:
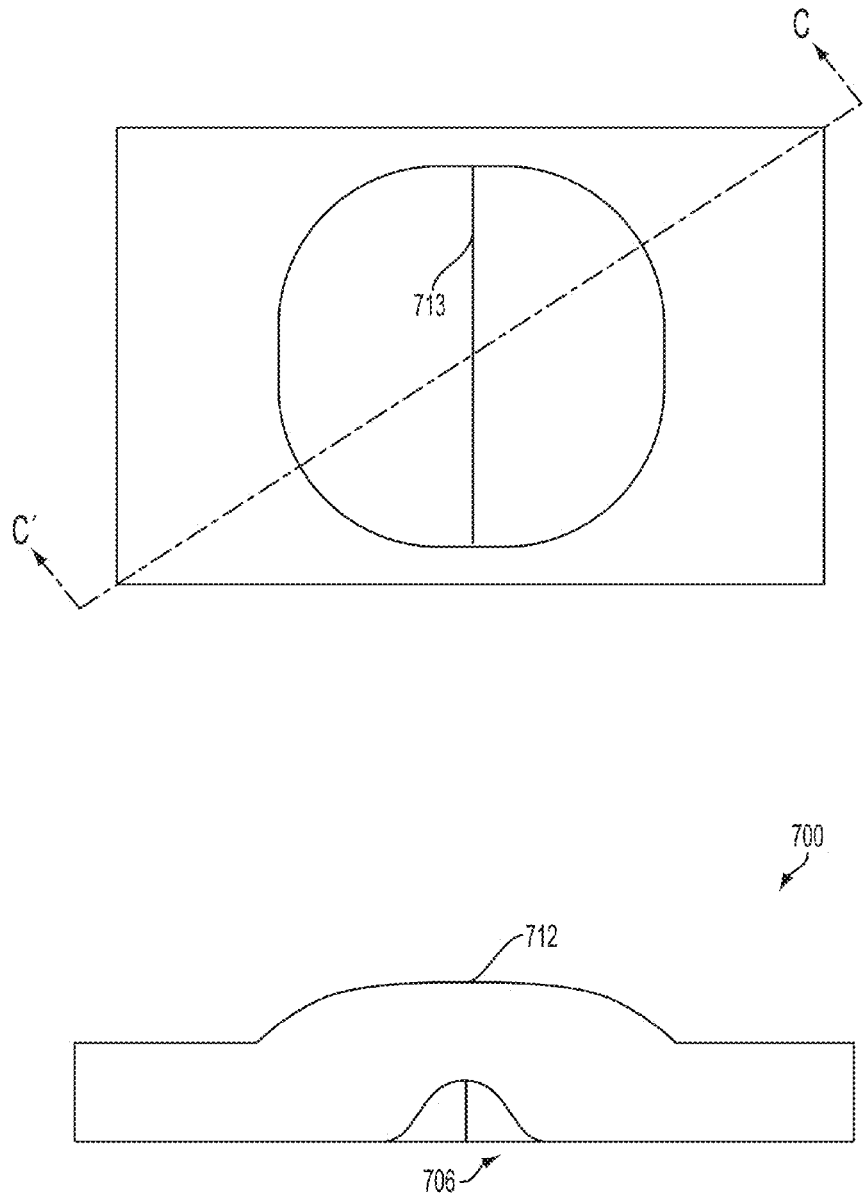
FIG. 109 depicts a planar section of a light directing apparatus, according to an example embodiment.
Figure 110:
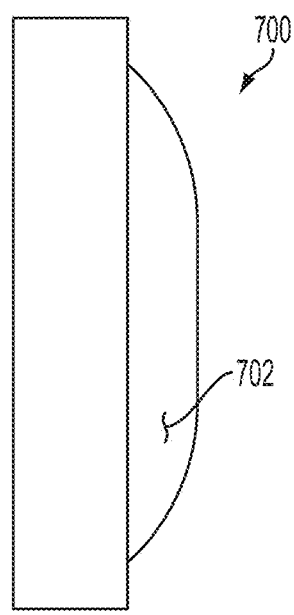
FIG. 110 depicts a planar section of a light directing apparatus, according to an example embodiment.

FIGS. 107-109 depict several planar sections of light directing apparatus 700, clearly showing the symmetry of the compound lens outer surface 702 about the centerline 713 and center point 712;

FIG. 110 depicts a side view of the light directing apparatus 700.

Figure 111:
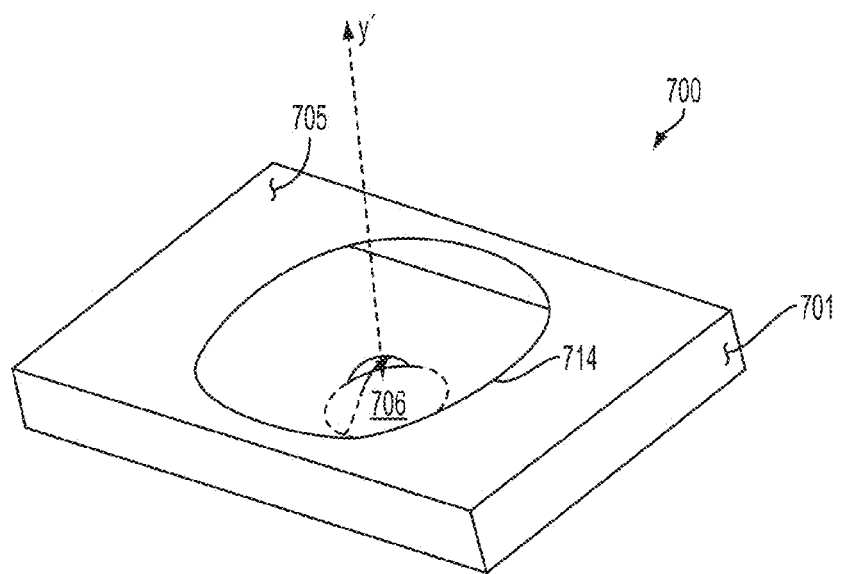
FIG. 111 depicts a perspective view of an interior of a light directing apparatus, according to an example embodiment.

FIG. 111 depicts a perspective view of an interior of the light directing apparatus 700, according to an example embodiment. As shown, the light-receiving portion 706 is rotationally symmetrical about central reference axis Y'.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A light directing apparatus, comprising:
an optical substrate having a first side and a second side;
a compound lens outer surface on a first portion of the first side of the optical substrate, the compound lens outer surface disposed in optical communication with the second side of the optical substrate;
a first protrusion on a second portion of the first side of the optical substrate, the first protrusion disposed proximate the compound lens outer surface, and disposed in optical communication with the second side of the optical substrate;
a second protrusion on the second portion of the first side of the optical substrate, the second protrusion disposed proximate the first protrusion, and disposed in optical communication with the second side of the optical substrate;
wherein the first protrusion is disposed between the second protrusion and the compound lens outer surface; and
wherein a main plane section cut through the optical substrate defines a location of the first portion to be on one side of the main plane and the second portion to be on the opposite side of the main plane.

2. The light directing apparatus of claim 1, wherein the second side of the optical substrate comprises a light-receiving portion disposed and configured to receive light emitted from a light source.

3. The light directing apparatus of claim 2, wherein a central axis of the light-receiving portion is collinear to a central axis of the light source.

4. The light directing apparatus of claim 2, wherein a central axis of the light-receiving portion is orthogonal to a plane formed by the second side of the optical substrate.

5. The light directing apparatus of claim 4, wherein the second side of the optical substrate further comprises a collimator disposed proximate the light-receiving portion.

6. The light directing apparatus of claim 5, wherein:
the collimator comprises a first indentation and a second indentation, the first indentation causing an incident light ray from a light source to be reflected by an internal surface of the first protrusion, and the second indentation causing an incident light ray from the light source to be reflected toward the second protrusion.

7. The light directing apparatus of claim 2, wherein the compound lens outer surface comprises a concave region having mirror image symmetry about a medial plane of the optical substrate, the medial plane containing a central axis of the light-receiving portion.

8. The light directing apparatus of claim 2, wherein the light-receiving portion comprises a textured, substantially hemispherical surface.

9. The light directing apparatus of claim 1, wherein the compound lens outer surface comprises a textured region.

10. The light directing apparatus of claim 1, wherein the compound lens outer surface comprises a valley that extends from a first edge of the compound lens outer surface to a point on a second edge of the compound outer surface, the second edge being coincidental with the main plane, and wherein the compound outer surface has mirror image symmetry about a medial plane of the optical substrate, the medial plane being orthogonal to the main plane.

11. The light directing apparatus of claim 10, wherein the compound lens outer surface comprises an inner concave region having mirror image symmetry about a medial plane of the optical substrate.

12. The light directing apparatus of claim 1, wherein:
the first protrusion comprises a first elongated apex;
the second protrusion comprises a second elongated apex; and
the second elongated apex is disposed parallel with the first elongated apex.

13. A light directing system, comprising:
an optical substrate having a first side and a second side; and
a plurality of light directing apparatuses arranged on the optical substrate, wherein each light directing apparatus comprises:
a compound lens outer surface on a first portion of the first side of the optical substrate, the compound lens outer surface disposed in optical communication with the second side of the optical substrate;

a first protrusion on a second portion of the first side of the optical substrate, the first protrusion disposed proximate the compound lens outer surface, and disposed in optical communication with the second side of the optical substrate;

a second protrusion on the second portion of the first side of the optical substrate, the second protrusion disposed proximate the first protrusion, and disposed in optical communication with the second side of the optical substrate;

wherein the first protrusion is disposed between the second protrusion and the compound lens outer surface;

a light-receiving portion on the second side of the optical substrate, the light-receiving portion disposed in relative alignment with the first protrusion; and wherein a main plane section cut through the optical substrate defines a location of the first portion to be on one side of the main plane and the second portion to be on the opposite side of the main plane.

14. The light directing system of claim 13, wherein each light directing apparatus further comprises a second protrusion on the first side of the optical substrate, the second protrusion disposed proximate the first protrusion, and disposed in optical communication with the second side of the optical substrate.

* * * * *